(12) United States Patent
Rissanen et al.

(10) Patent No.: US 10,565,889 B2
(45) Date of Patent: Feb. 18, 2020

(54) METHOD AND SYSTEM FOR AUTHORING ANIMATED HUMAN MOVEMENT EXAMPLES WITH SCORED MOVEMENTS

(71) Applicant: Ying Chieh Mitchell, Palo Alto, CA (US)

(72) Inventors: Mikko Rissanen, Pulau Pinang (MY); Justin Hanyan Wong, Atherton, CA (US)

(73) Assignee: Ying Chieh Mitchell, Palo Alto, CA (US)

( * ) Notice: Subject to any disclaimer, the term of this patent is extended or adjusted under 35 U.S.C. 154(b) by 278 days.

(21) Appl. No.: 15/462,886

(22) Filed: Mar. 19, 2017

(65) Prior Publication Data
US 2017/0266491 A1  Sep. 21, 2017

Related U.S. Application Data

(60) Provisional application No. 62/390,188, filed on Mar. 21, 2016.

(51) Int. Cl.
*G09B 19/00* (2006.01)
*G09B 5/06* (2006.01)
(Continued)

(52) U.S. Cl.
CPC ......... *G09B 5/065* (2013.01); *G06K 9/00342* (2013.01); *G06T 13/40* (2013.01); *G09B 19/003* (2013.01)

(58) Field of Classification Search
CPC .. G09B 5/065; G09B 19/003; G06K 9/00342; G06T 19/003
(Continued)

(56) References Cited

U.S. PATENT DOCUMENTS 6,718,231 B2   4/2004 Konno et al.
7,492,268 B2   2/2009 Ferguson et al.
(Continued)

*Primary Examiner* — Robert P Bullington
(74) *Attorney, Agent, or Firm* — Kanika Radhakrishnan; Evergreen Valley Law Group

(57) ABSTRACT

A computer-implemented method and system for authoring animated human movement examples with scored movement segments. The computer-implemented method includes pre-processing with pre-segmented movement wherein start and end frames of a movement segment have been defined automatically to create a Standard Movement Library. The computer-implemented method also includes post-processing with pre-segmented routine wherein start and end frames of each individual movement has been defined to produce a virtual exercise class. Further, the computer-implemented method includes segmenting a routine into individual movements to create a timeline of movements that produces a score for the players, wherein the routine is recorded by the instructor. Furthermore, the computer-implemented method includes concatenating a plurality of routines in any order to create a full exercise class and creating score-able virtual exercise classes in the pre-processing and post-processing phases. Moreover, the computer-implemented method includes verifying the virtual exercise with an instructor; and finalizing the virtual exercise.

22 Claims, 69 Drawing Sheets

(51) Int. Cl.
*G06K 9/00* (2006.01)
*G06T 13/40* (2011.01)
(58) Field of Classification Search
USPC .......................................................... 434/257
See application file for complete search history.

(56) References Cited

U.S. PATENT DOCUMENTS

| | | |
|---|---|---|
| 8,284,847 B2 | 10/2012 | Adermann |
| 2014/0234814 A1* | 8/2014 | Krosky ................... G09B 5/02 434/236 |
| 2015/0099252 A1* | 4/2015 | Anderson ............ G09B 19/003 434/257 |

* cited by examiner

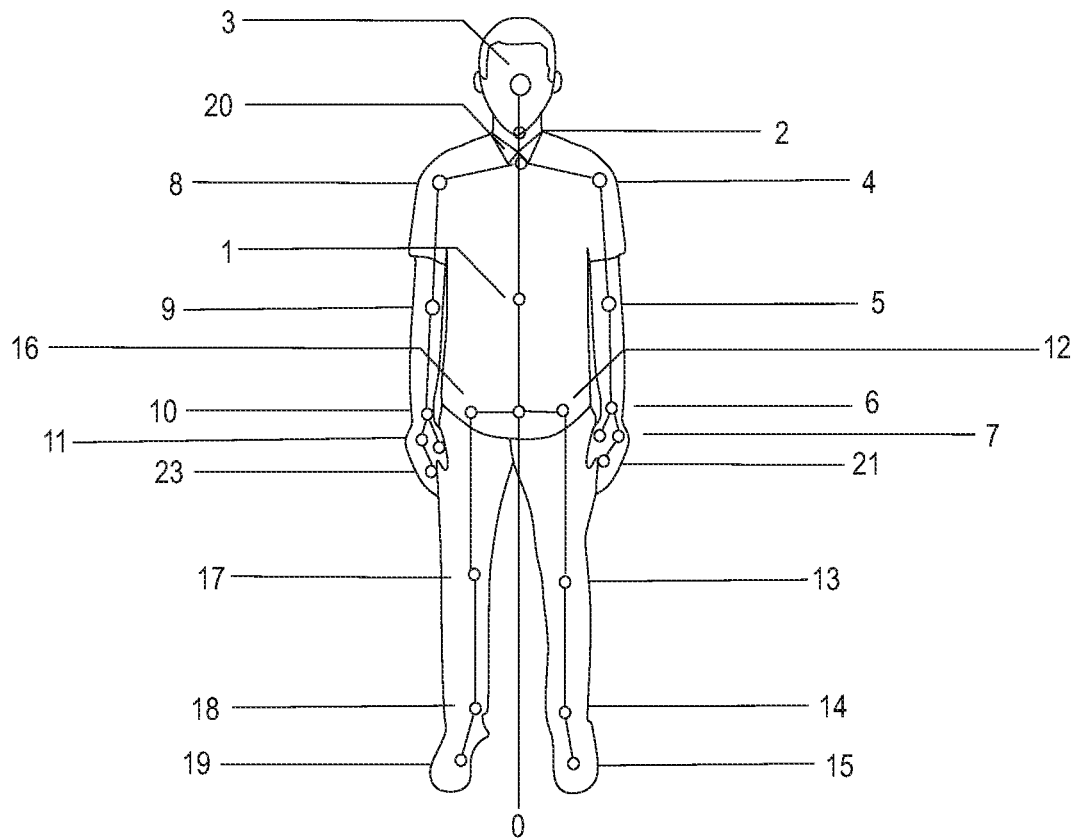

JOINTTYPE_SPINEBASE=0
JOINTTYPE_SPINEMD=1
JOINTTYPE_NECK=2
JOINTTYPE_HEAD=3
JOINTTYPE_SHOULDERLEFT=4
JOINTTYPE_ELBOWLEFT=5
JOINTTYPE_WRISTLEFT=6
JOINTTYPE_HANDLEFT=7
JOINTTYPE_SHOULDERRIGHT =8
JOINTTYPE_ELBOWRIGHT=9
JOINTTYPE_WRISTRIGHT=10
JOINTTYPE_HANDRIGHT=11

JOINTTYPE_HIPLEFT=12
JOINTTYPE_KNEELEFT=13
JOINTTYPE_ANKLELEFT=14
JOINTTYPE_FOOTLEFT=15
JOINTTYPE_HIPRIGHT=16
JOINTTYPE_KNEERIGHT=17
JOINTTYPE_ANKLERIGHT=18
JOINTTYPE_FOOTRIGHT=19
JOINTTYPE_SPINESHOULDER=20
JOINTTYPE_HANDLEFT=21
JOINTTYPE_THUMBLEFT=22
JOINTTYPE_HANDRIGHT=23
JOINTTYPE_THUMBRIGHT=24

FIG. 6

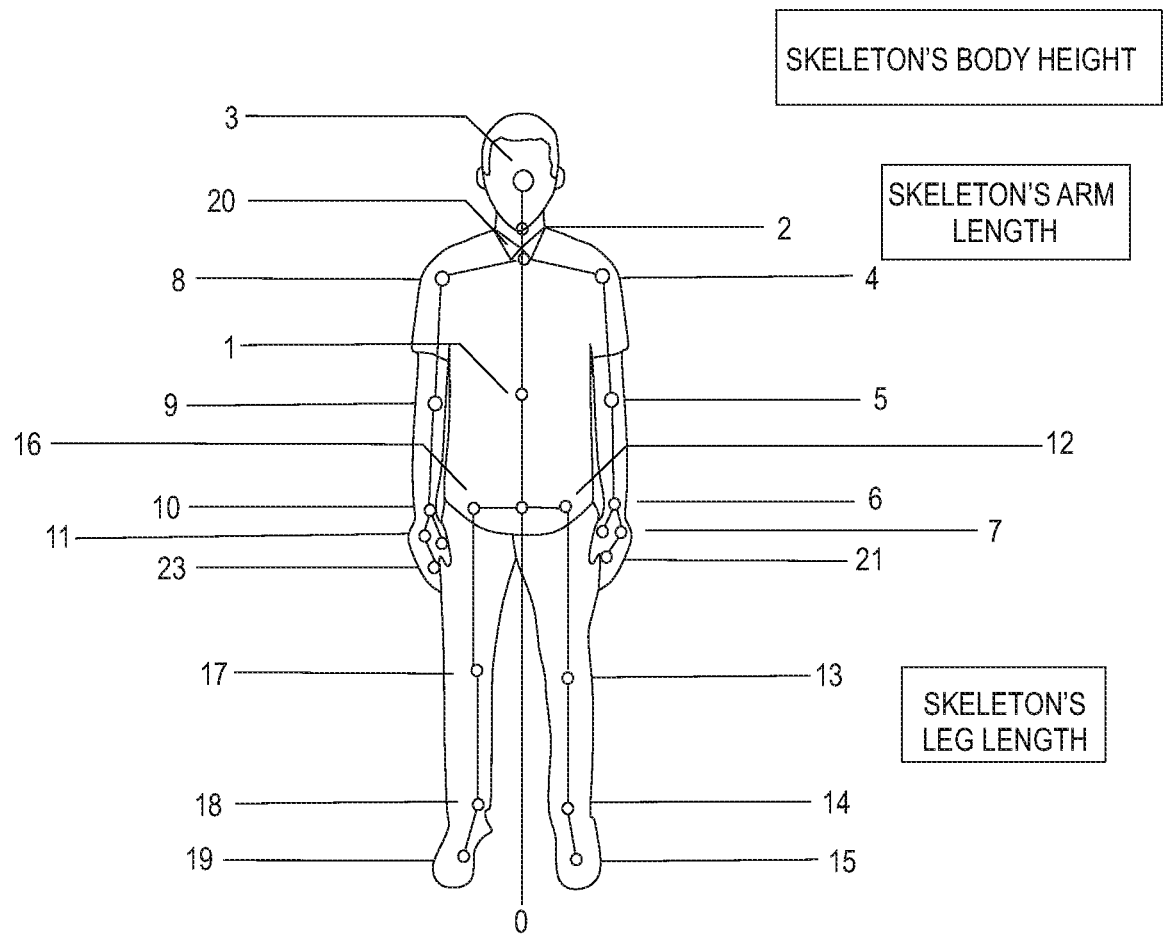

JOINTTYPE_SPINEBASE=0
JOINTTYPE_SPINEMD=1
JOINTTYPE_NECK=2
JOINTTYPE_HEAD=3
JOINTTYPE_SHOULDERLEFT=4
JOINTTYPE_ELBOWLEFT=5
JOINTTYPE_WRISTLEFT=6
JOINTTYPE_HANDLEFT=7
JOINTTYPE_SHOULDERRIGHT =8
JOINTTYPE_ELBOWRIGHT=9
JOINTTYPE_WRISTRIGHT=10
JOINTTYPE_HANDRIGHT=11

JOINTTYPE_HIPLEFT=12
JOINTTYPE_KNEELEFT=13
JOINTTYPE_ANKLELEFT=14
JOINTTYPE_FOOTLEFT=15
JOINTTYPE_HIPRIGHT=16
JOINTTYPE_KNEERIGHT=17
JOINTTYPE_ANKLERIGHT=18
JOINTTYPE_FOOTRIGHT=19
JOINTTYPE_SPINESHOULDER=20
JOINTTYPE_HANDLEFT=21
JOINTTYPE_THUMBLEFT=22
JOINTTYPE_HANDRIGHT=23
JOINTTYPE_THUMBRIGHT=24

FIG. 7

CURRENT MOVEMNET:
"CHI SWAY AND FIST IN HAND
LIST OF AVAILABLE
SML MOVEMENTS
WITH SCORING THAT
CAN BE DRAG 'N' DROPPED
ONTO THE TIMELINE
SELECT MATCHING SML MOVEMENT
"CHI SWAY AND FIST IN HAND"  CREATED 2015-11-21
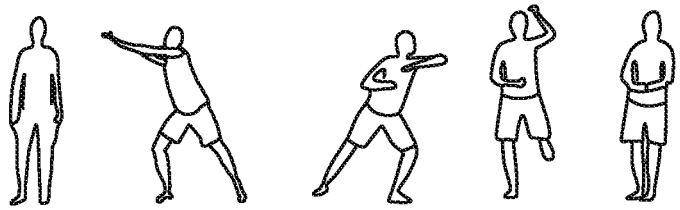
"LUNGE SQUATS BREATHS" CREATED 2015-07-28
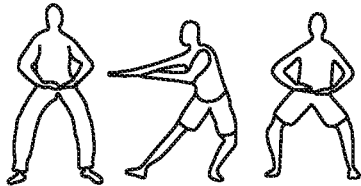
FIG. 8A

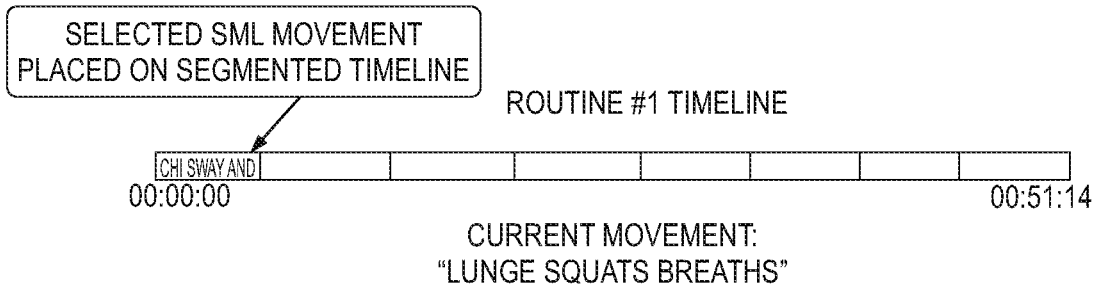
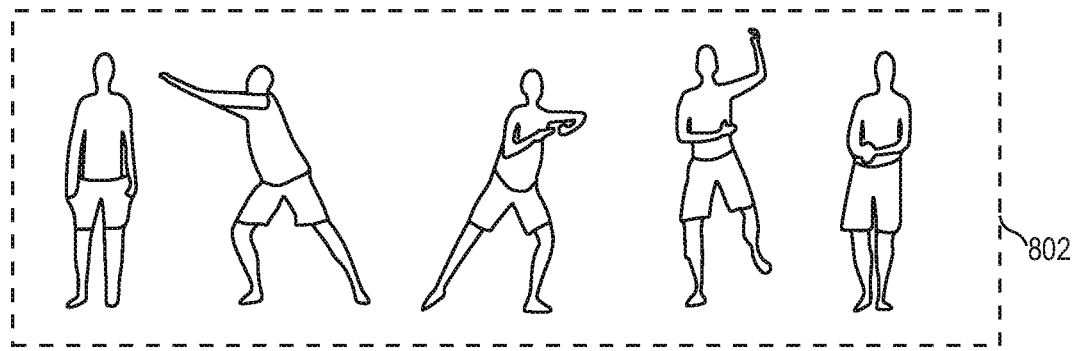
MATCHING SEGMENTS FOUNF
SCORE : 100%
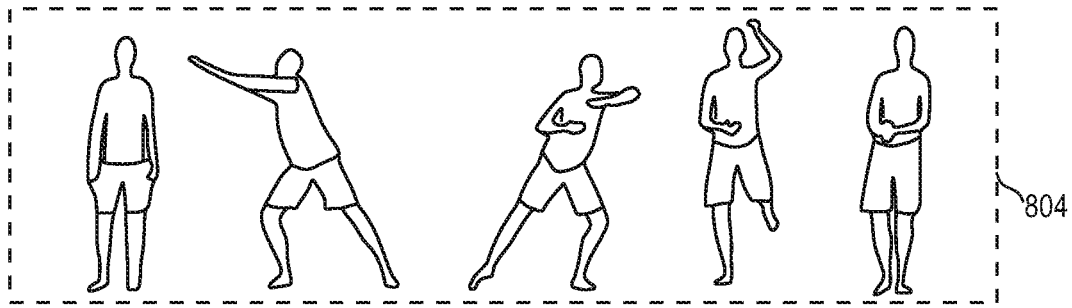
POSE-BY-POSE COMPARISON OF INSTRUCTOR'S
MOVEMENTS AGAINST SML MOVEMENTS
FIG. 8B

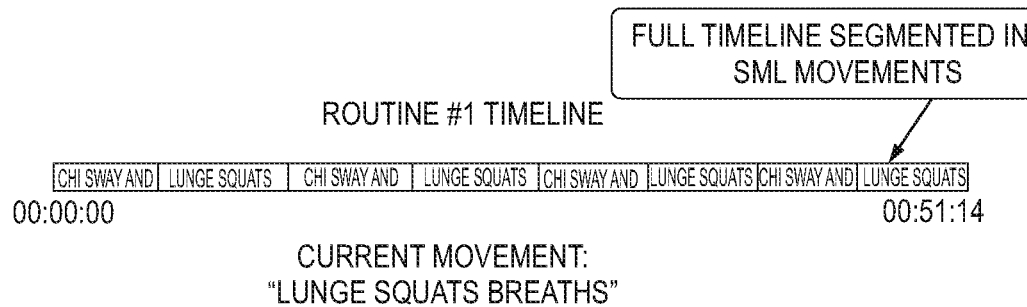
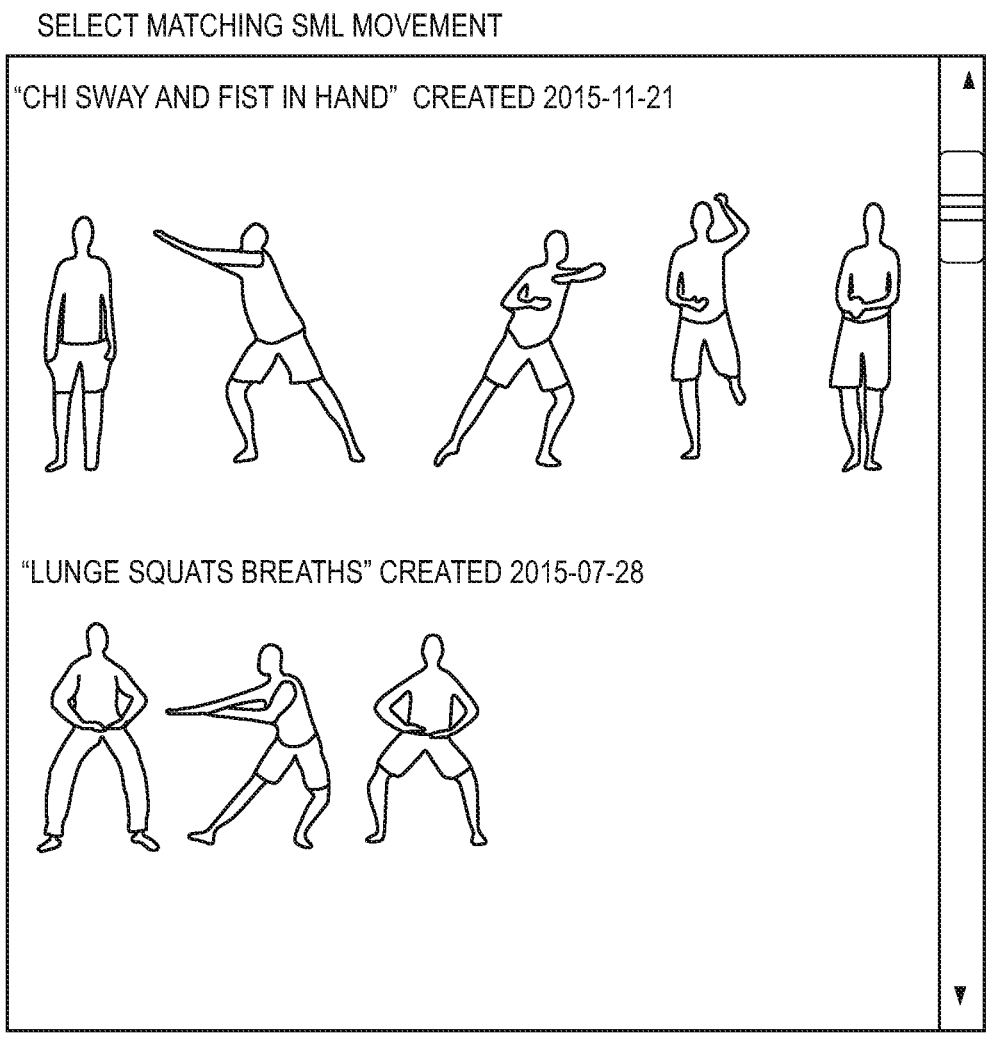
FIG. 8C

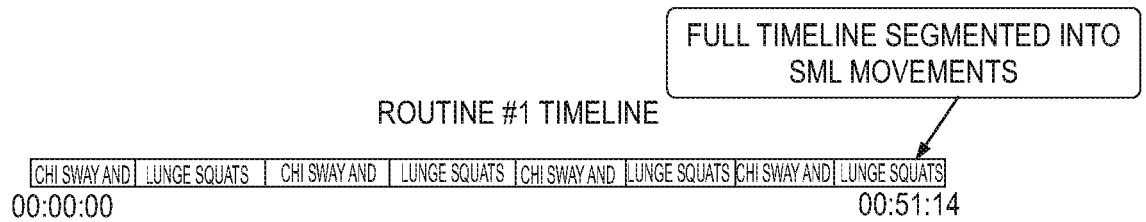
CURRENT MOVEMENT:
"LUNGE SQUATS BREATHS"
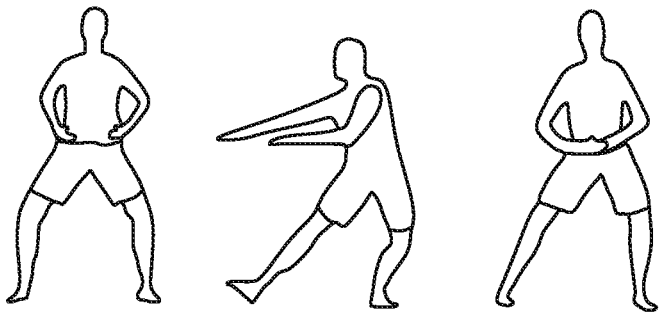
MATCHING SEGMENTS FOUND
SCORE : 100%
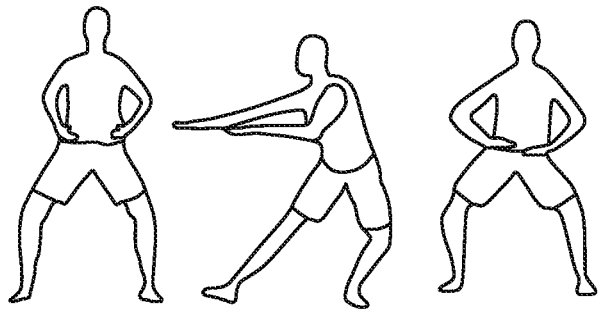
FINISH CLASS
FIG. 8D EDIT AN EXISTING SML MOVEMENT
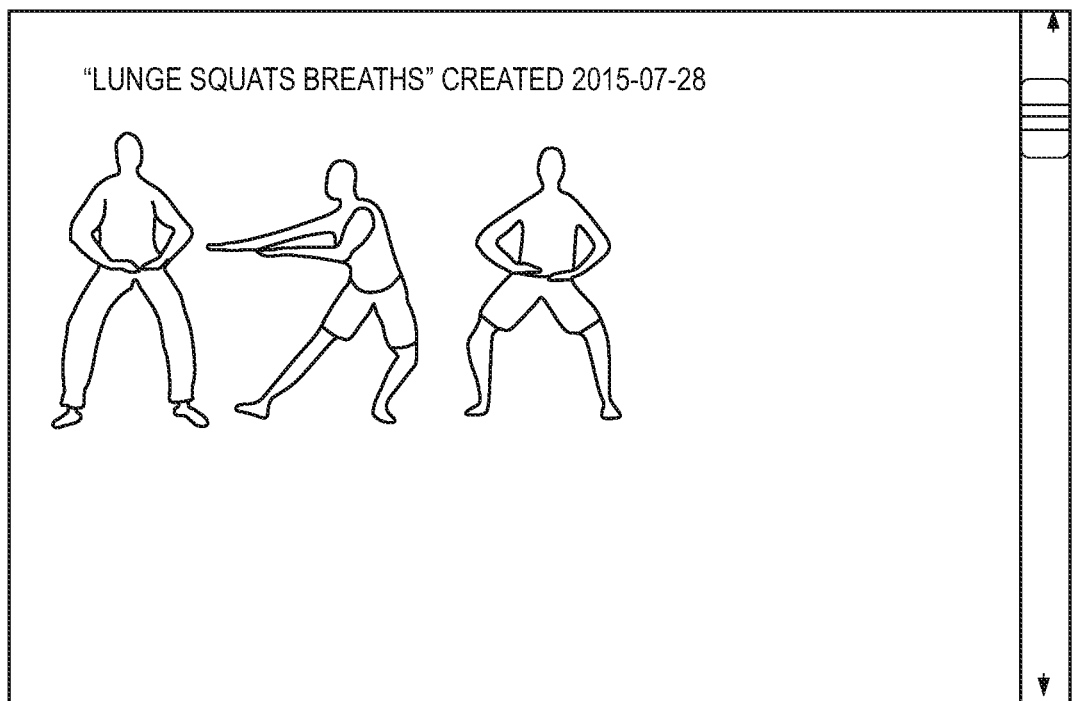
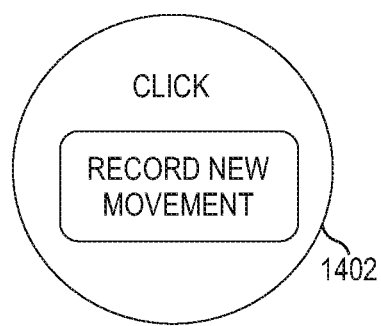
FIG. 14B

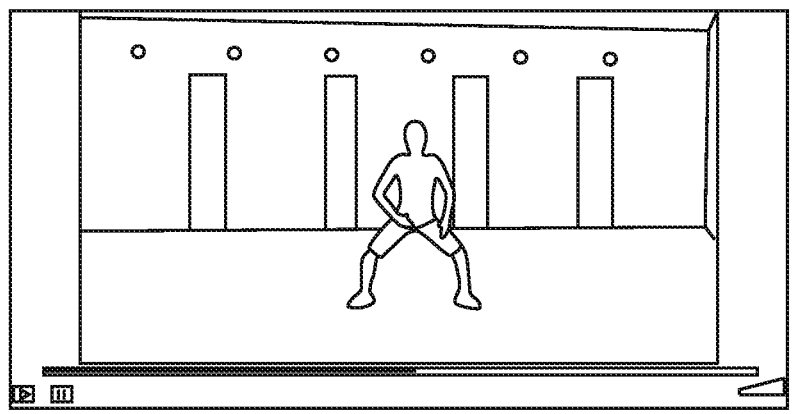
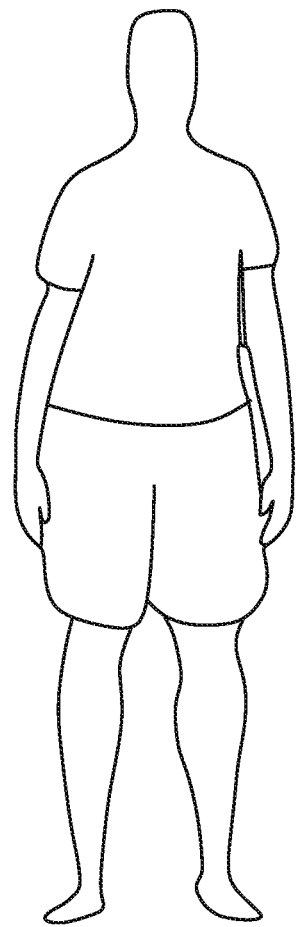
RECORDING
REPITION #1
FIG. 14D

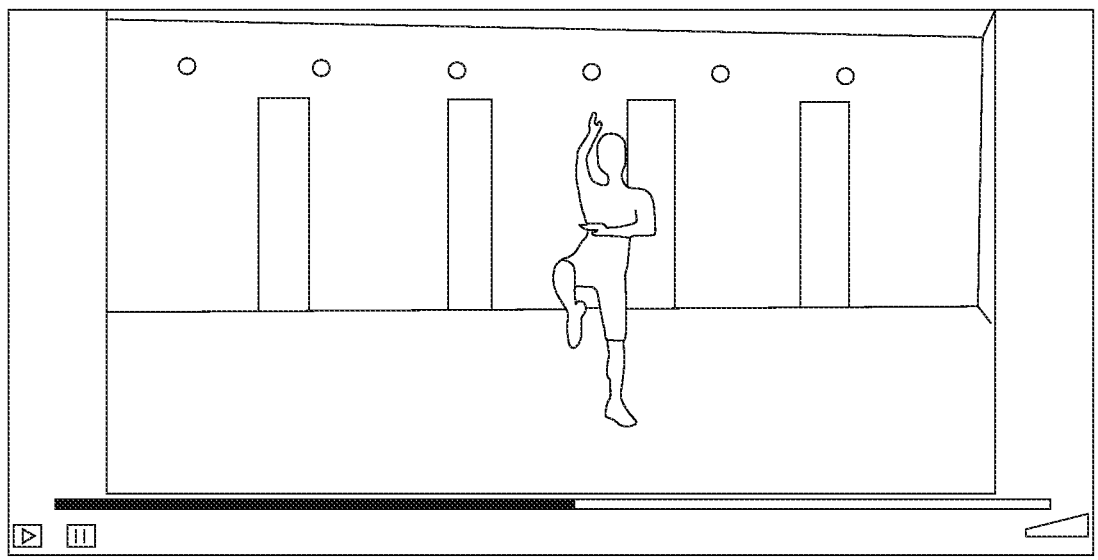
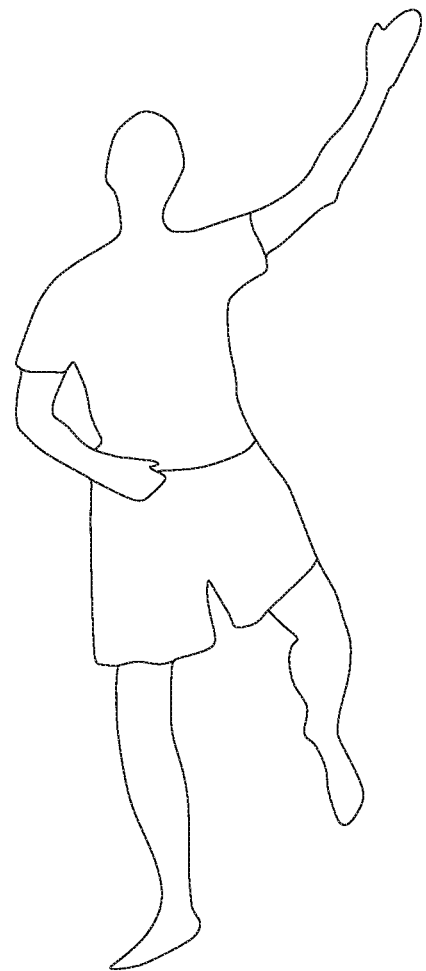
RECORDING
REPITION #1
FIG. 14E

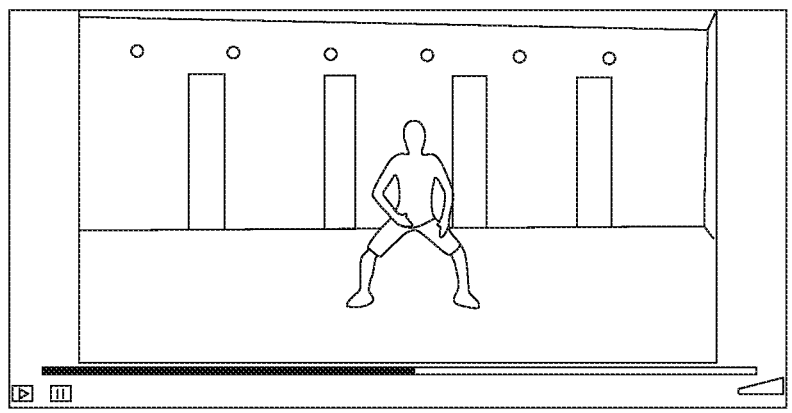
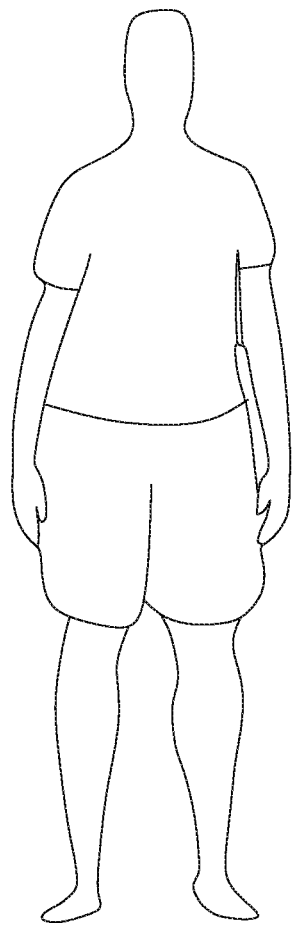
RECORDING
REPITION #1
STOPPED
FIG. 14F

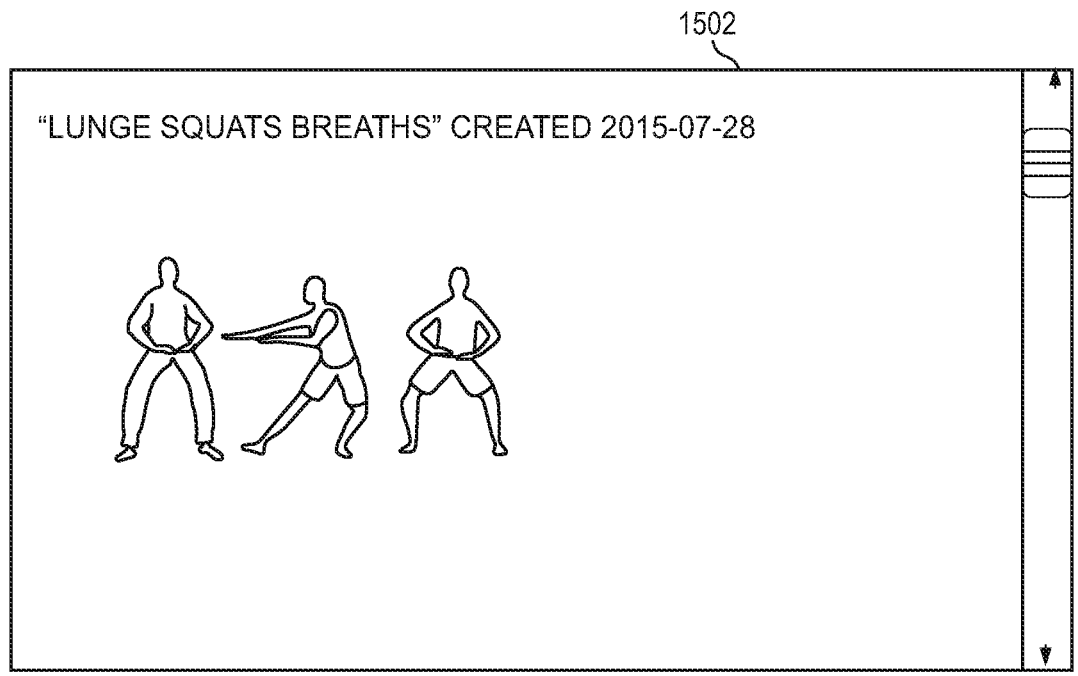
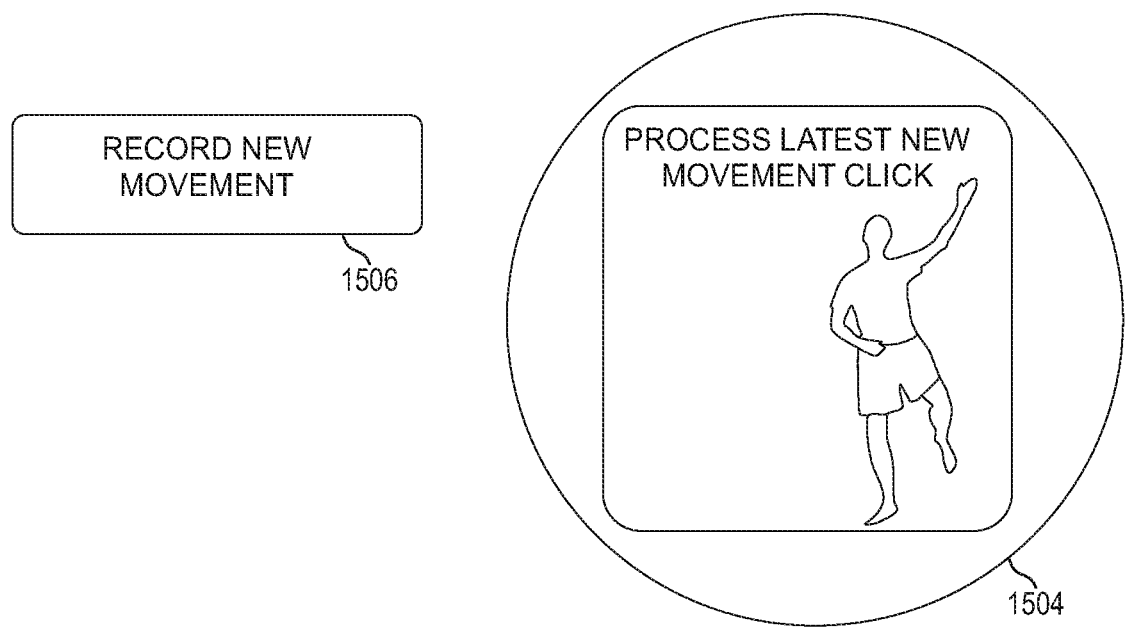
FIG. 15A

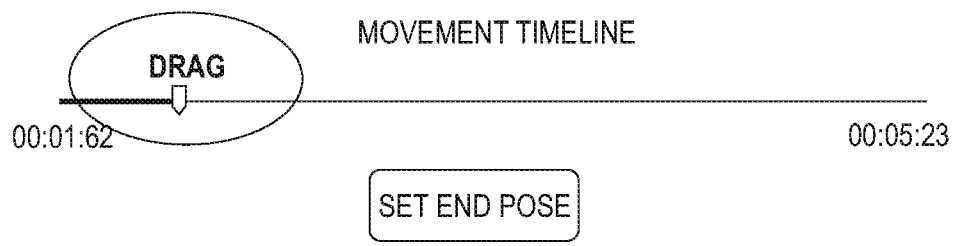
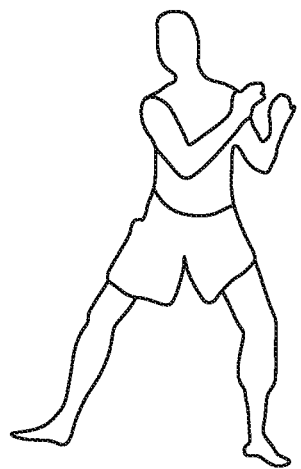
FIG. 15C

MOVEMENT TIMELINE
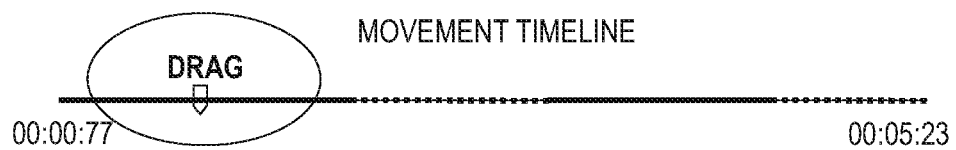
00:00:77                                                              00:05:23
TRACKING QUALITY:
○ TRACKED (OK)
○ INFERRED (POOR)
○ NOT TRACKED
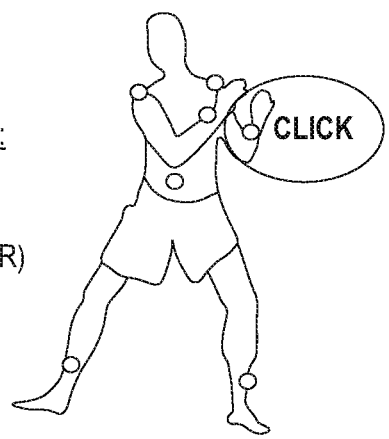
PRECISION:
 HIGH
╭╌╌╮ LOW
FIG. 16A MOVEMENT TIMELINE
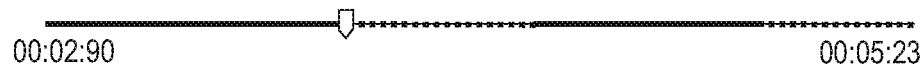
00:02:90                                    00:05:23
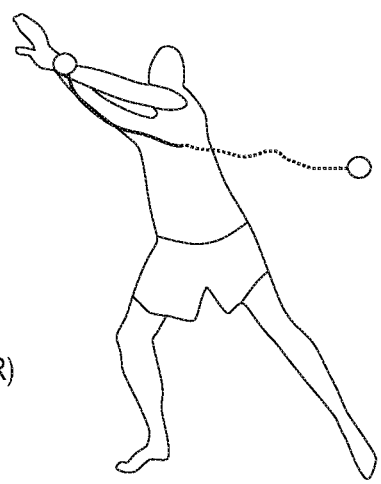
TRACKING QUALITY:
○ TRACKED (OK)
○ INFERRED (POOR)
○ NOT TRACKED
PRECISION:
∼ HIGH
⋯ LOW
FIG. 16C MOVEMENT TIMELINE
00:00:00                                                            00:00:00
CHOOSE RECORDINGS TO VIEW
2015-11-21 AT 18:34 RECORDING SESSION,
ATTEMPT:1,2,3,4,5,6,7,8,9,10,11,12,13,14
2015-11-21 AT 18:01 RECORDING SESSION,
ATTEMPT:1,2,3,4,5,6,7,8,9,10,11,12,13,14
2015-11-21 AT 17:34 RECORDING SESSION,
ATTEMPT:1,2,3,4,5,6,7,8,9,10,11,12,13,14
RECORD MORE TESTS
FIG. 17A MOVEMENT TIMELINE
00:02:90    00:05:23
CHOOSE RECORDINGS TO VIEW
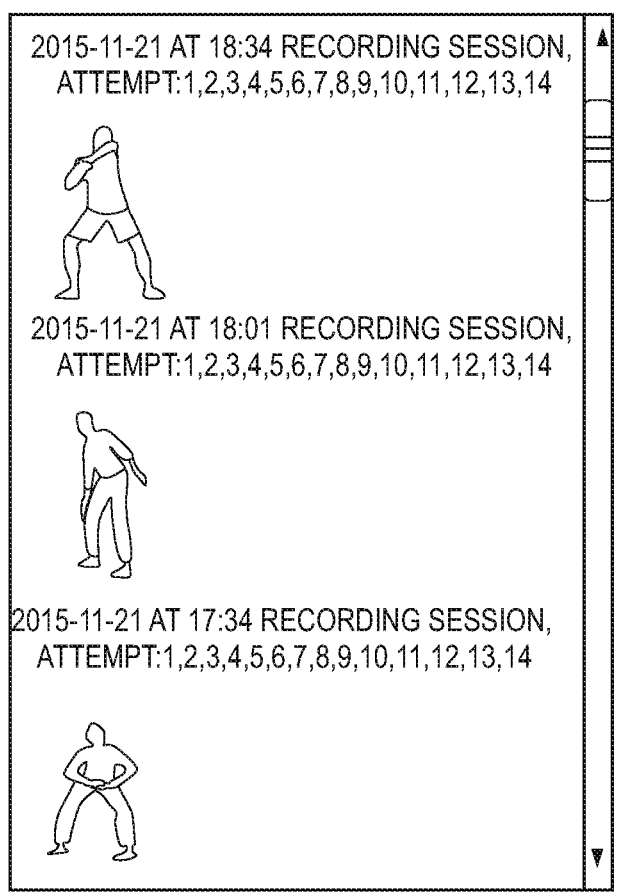
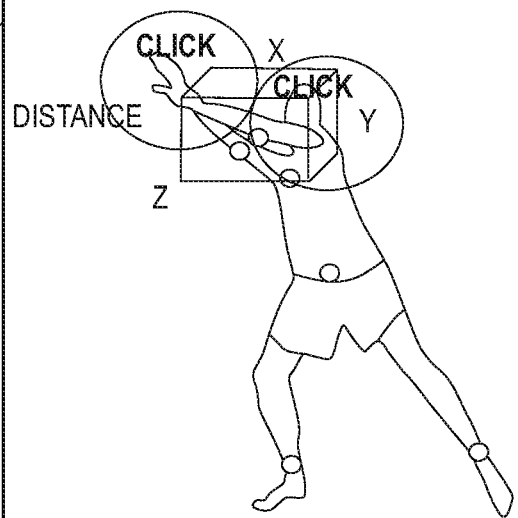
RECORD MORE TESTS
FIG. 17B MOVEMENT TIMELINE
00:02:90 00:05:23
CHOOSE RECORDINGS TO VIEW
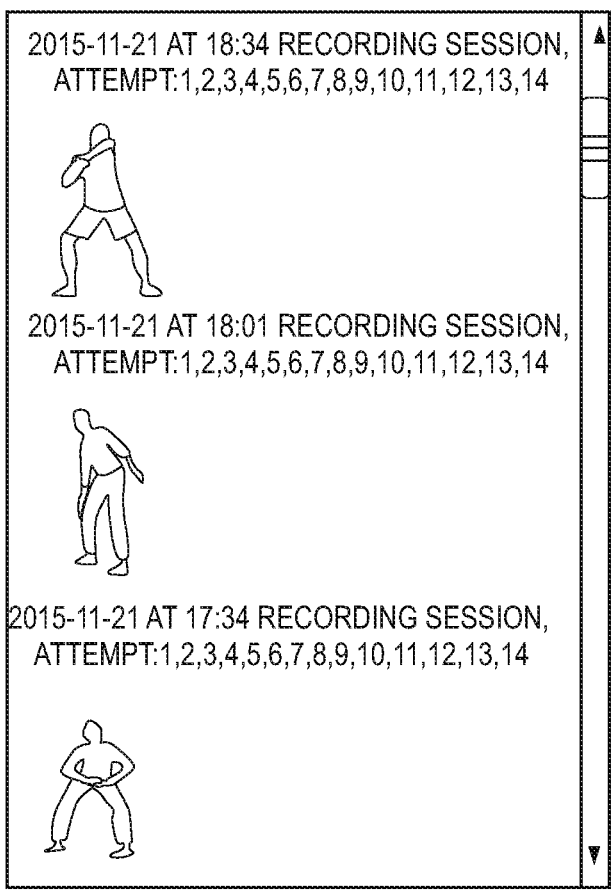
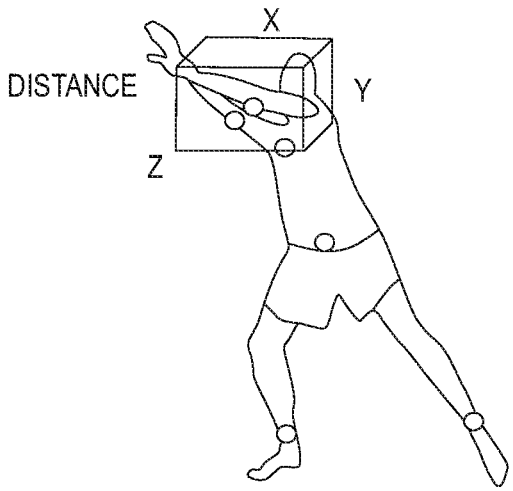
DISTANCE
RECORD MORE TESTS
FIG. 17D MOVEMENT TIMELINE
00:02:90          00:05:23
CHOOSE RECORDINGS TO VIEW
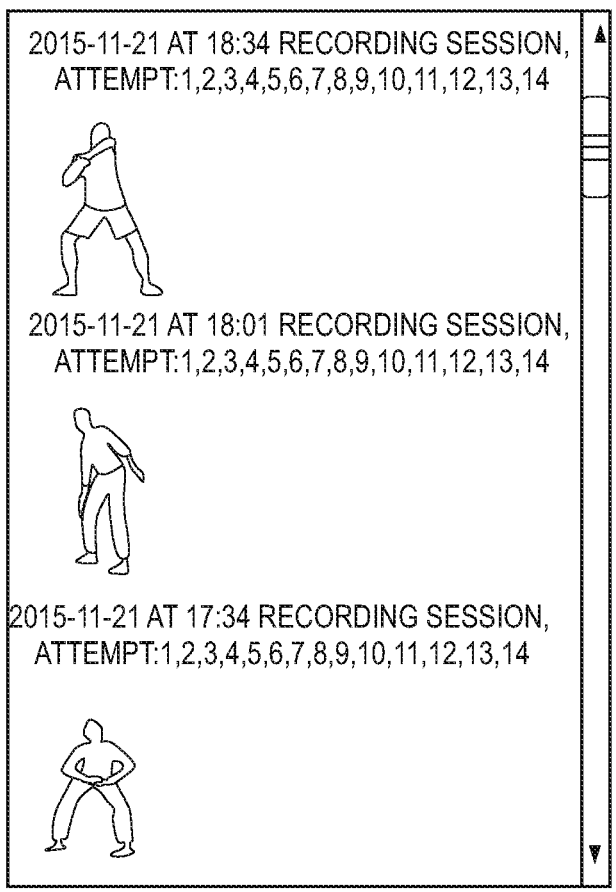
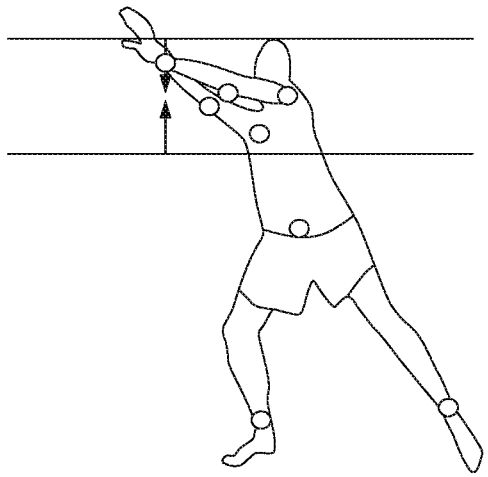
RECORD MORE TESTS
FIG. 17E MOVEMENT TIMELINE
00:02:90                                      00:05:23
CHOOSE RECORDINGS TO VIEW
2015-11-21 AT 18:34 RECORDING SESSION,
ATTEMPT:1,2,3,4,5,6,7,8,9,10,11,12,13,14
2015-11-21 AT 18:01 RECORDING SESSION,
ATTEMPT:1,2,3,4,5,6,7,8,9,10,11,12,13,14
2015-11-21 AT 17:34 RECORDING SESSION,
ATTEMPT:1,2,3,4,5,6,7,8,9,10,11,12,13,14
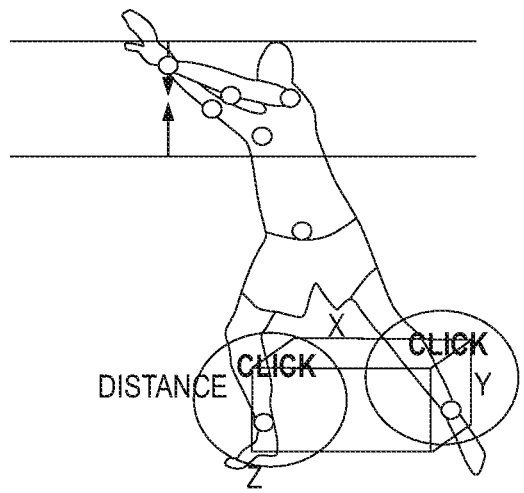
RECORD MORE TESTS
FIG. 17F MOVEMENT TIMELINE
00:02:90   00:05:23
CHOOSE RECORDINGS TO VIEW
2015-11-21 AT 18:34 RECORDING SESSION,
ATTEMPT:1,2,3,4,5,6,7,8,9,10,11,12,13,14
2015-11-21 AT 18:01 RECORDING SESSION,
ATTEMPT:1,2,3,4,5,6,7,8,9,10,11,12,13,14
2015-11-21 AT 17:34 RECORDING SESSION,
ATTEMPT:1,2,3,4,5,6,7,8,9,10,11,12,13,14
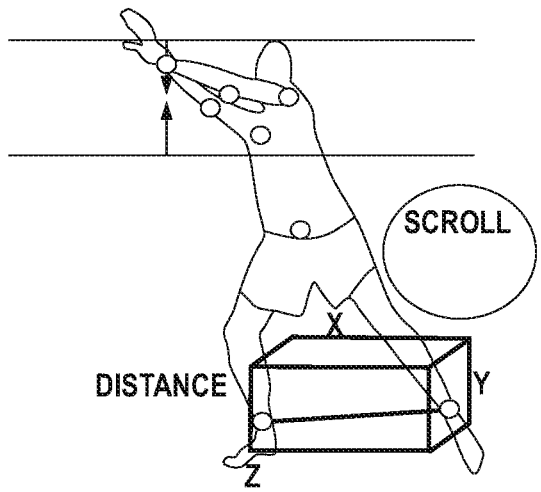
RECORD MORE TESTS
FIG. 17H MOVEMENT TIMELINE
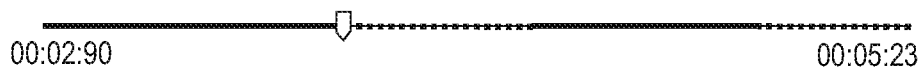
00:02:90                                                00:05:23
CHOOSE RECORDINGS TO VIEW
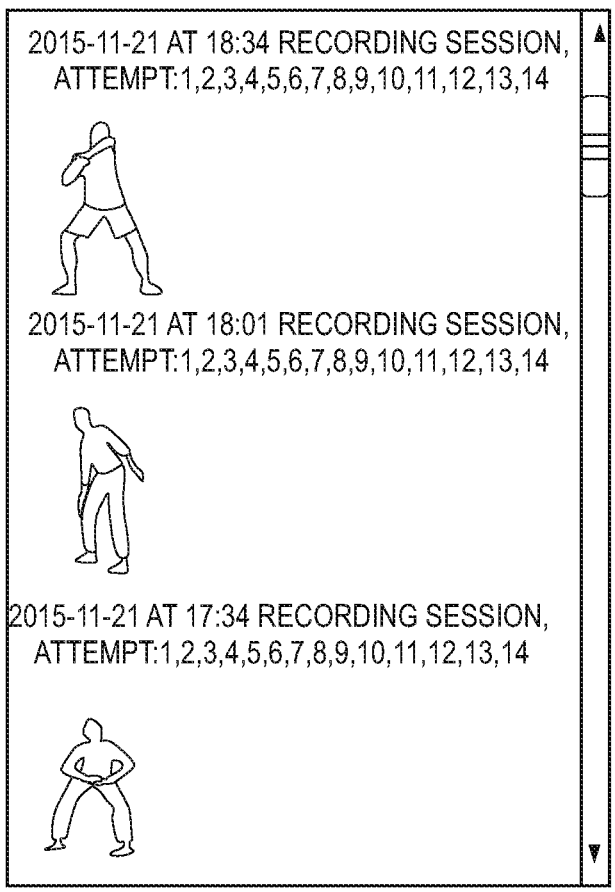
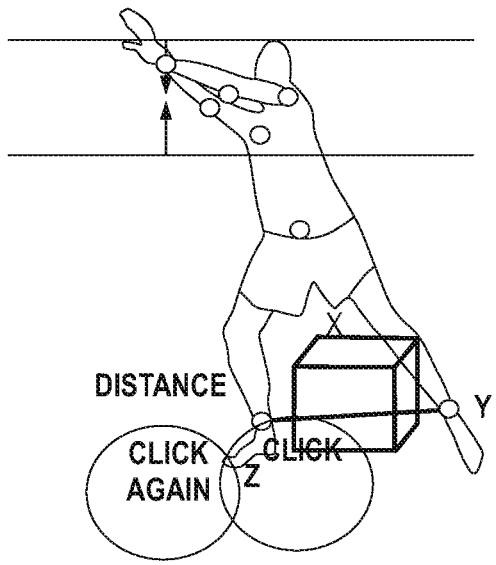
RECORD MORE TESTS
FIG. 17I MOVEMENT TIMELINE
00:02:90                                        00:05:23
CHOOSE RECORDINGS TO VIEW
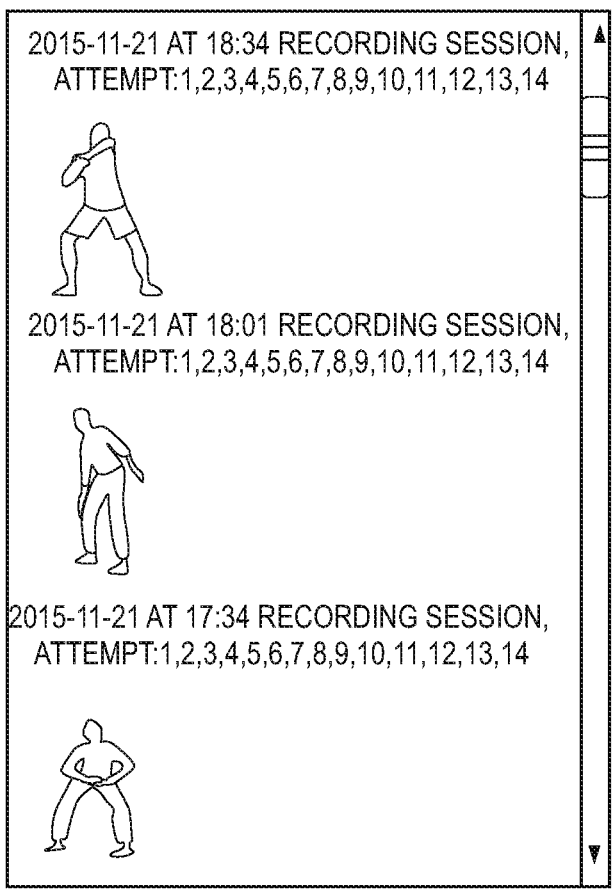
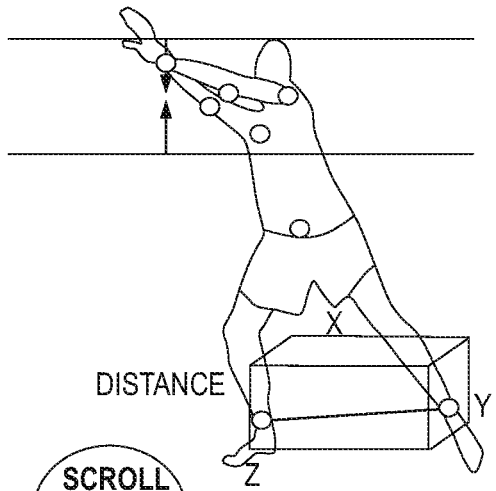
DISTANCE
SCROLL
RECORD MORE TESTS
FIG. 17J MOVEMENT TIMELINE
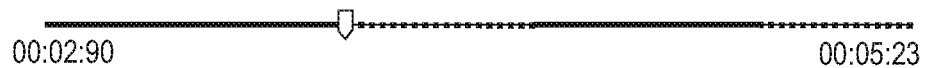
00:02:90                                                                                    00:05:23
CHOOSE RECORDINGS TO VIEW
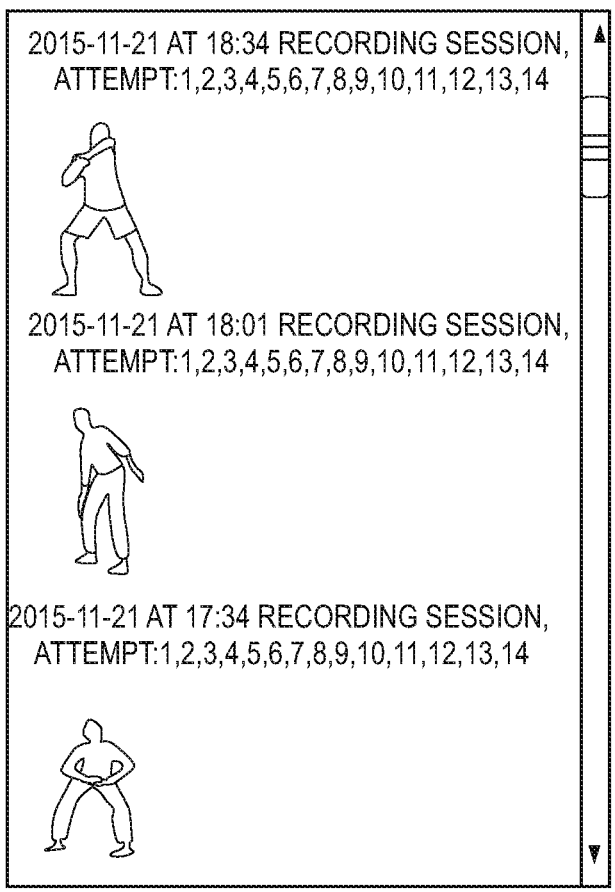
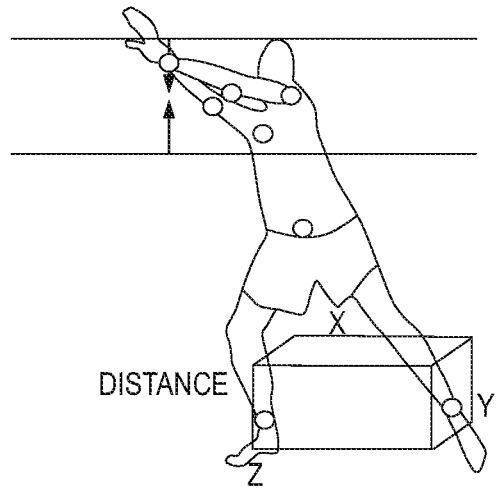
DISTANCE
RECORD MORE TESTS
FIG. 17K MOVEMENT TIMELINE
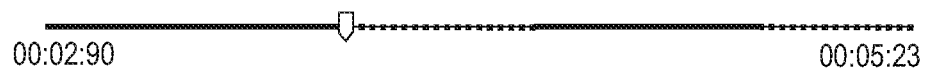
00:02:90                                                            00:05:23
CHOOSE RECORDINGS TO VIEW
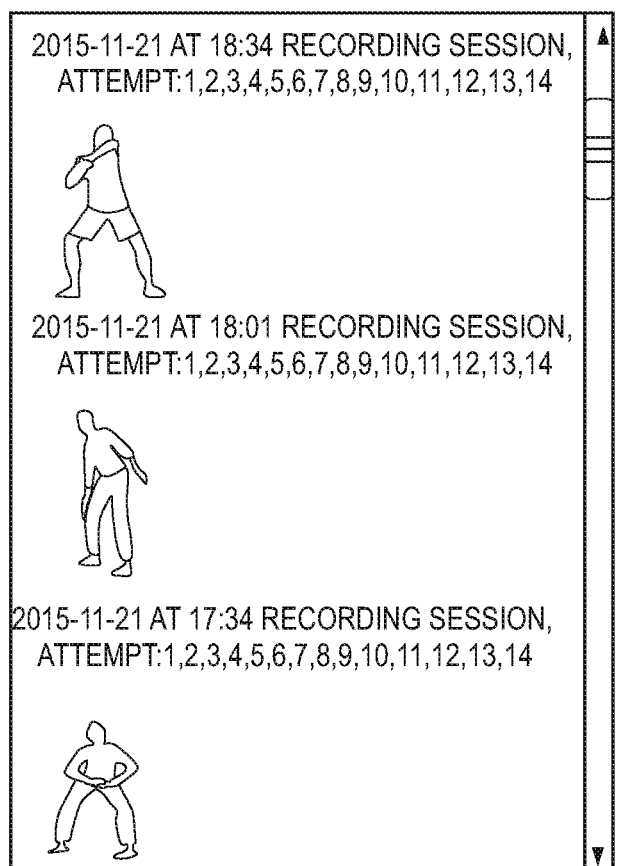
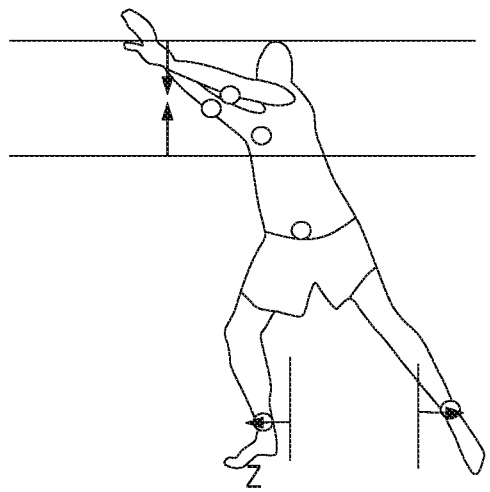
FIG. 17L RECORD NEW
MOVEMENT
EDIT EXISTING SML MOVEMENT
"CHI SWAY AND FIST IN HAND" CREATED 2015-11-21
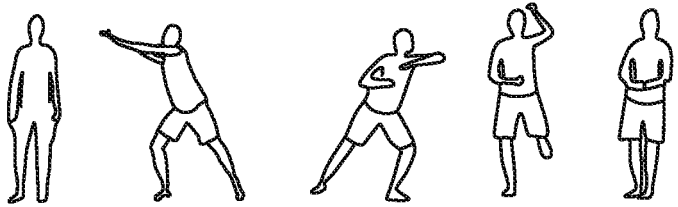
"LUNGE SQUATS BREATHS" CREATED 2015-07-28
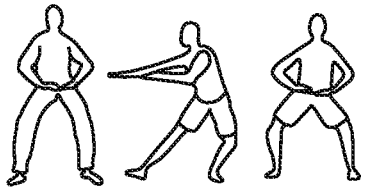
FIG. 18E SELECT NEW CONTENT FOR A CLASS
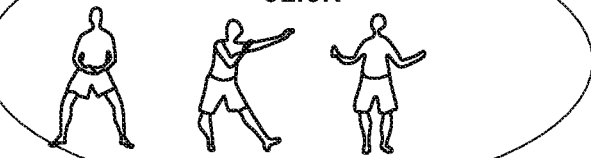
ROUTINE #1 CREATED BY MARK MASTERSON ON 2015-11-30
CLICK
ROUTINE #2 CREATED BY MARK MASTERSON ON 2015-11-30
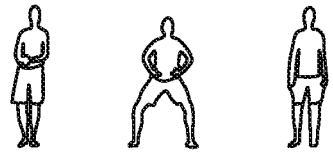
FIG. 19B

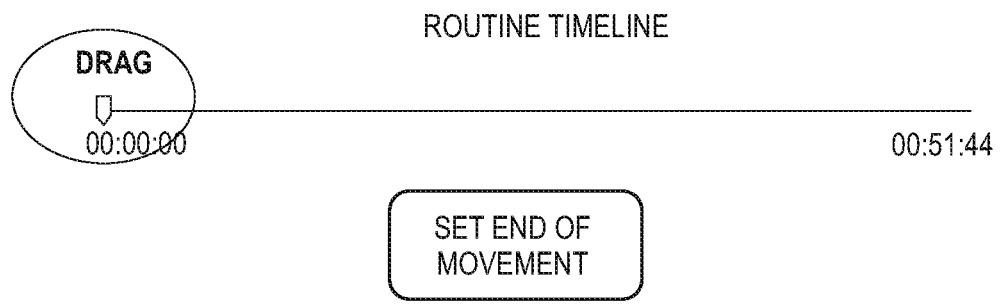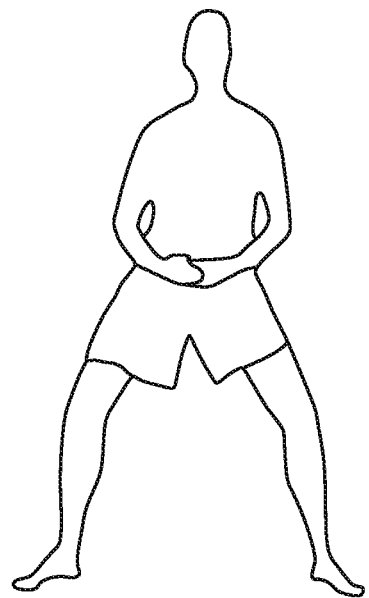
FIG. 19C

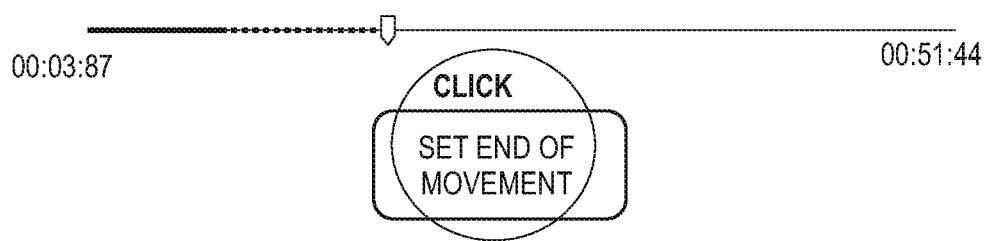
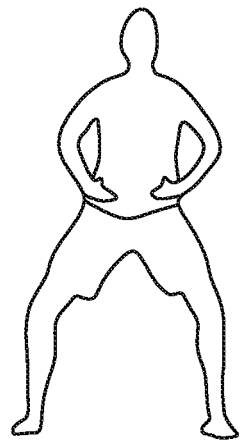
FIG. 19E

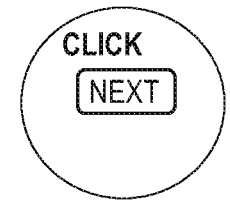
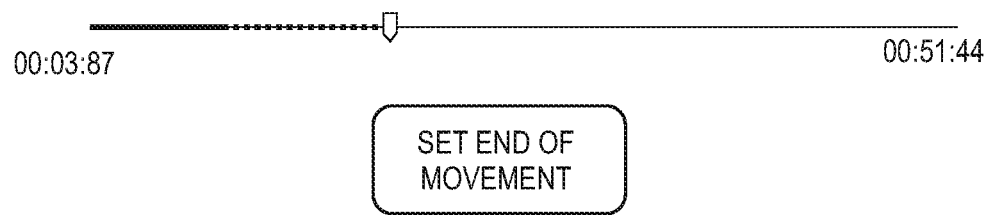
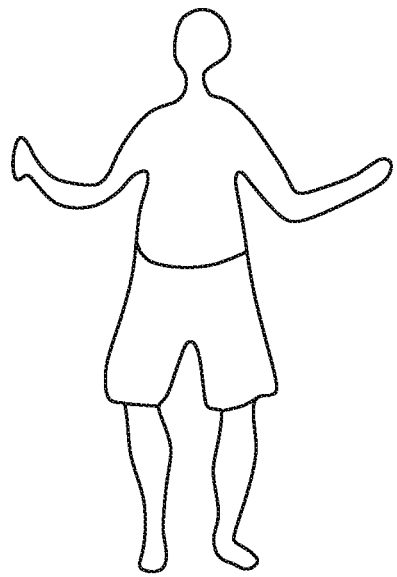
FIG. 19F

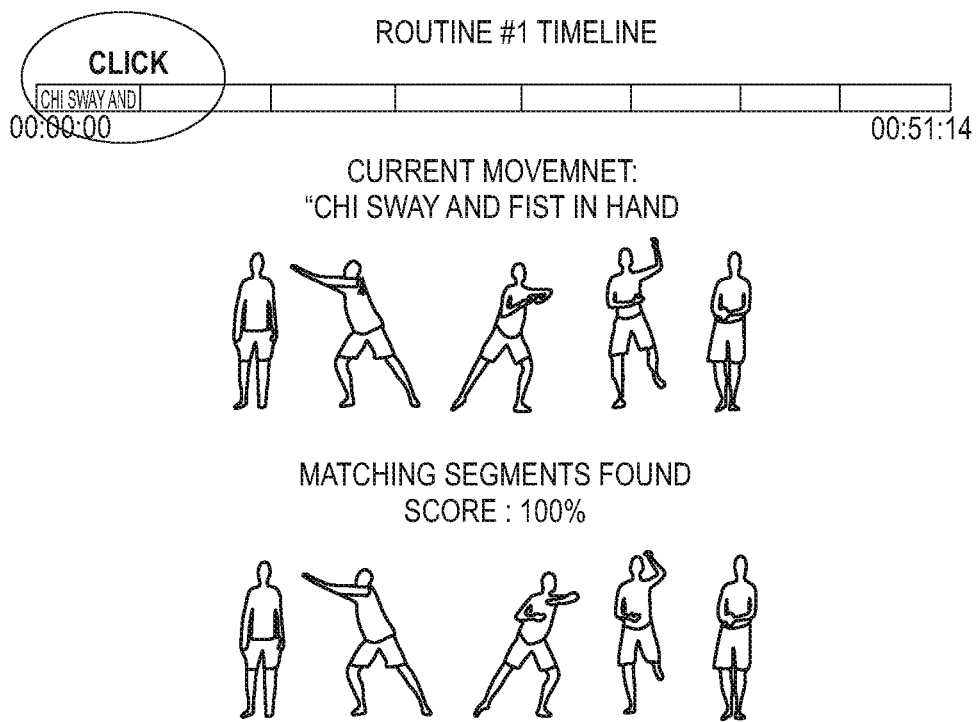
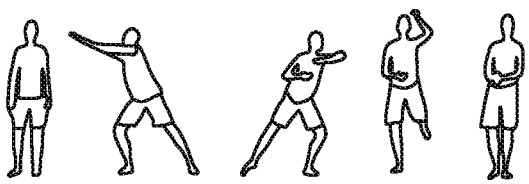
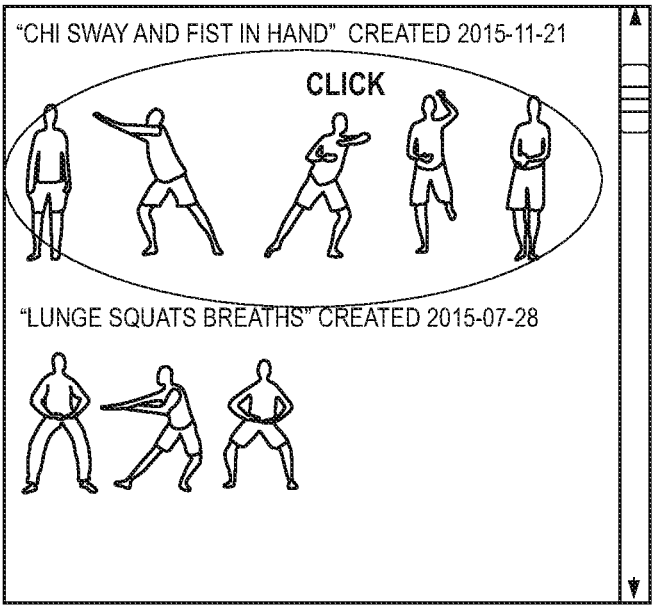
FIG. 20A

ROUTINE #1 TIMELINE
| CHI SWAY AND | LUNGE SQUATS | CHI SWAY AND | LUNGE SQUATS | CHI SWAY AND | LUNGE SQUATS | CHI SWAY AND | LUNGE SQUATS |
00:00:00                                                                                          00:51:14
CURRENT MOVEMENT:
"LUNGE SQUATS BREATHS"
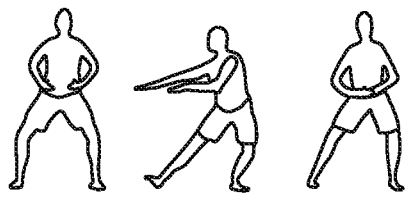
MATCHING SEGMENTS FOUND
SCORE : 100%
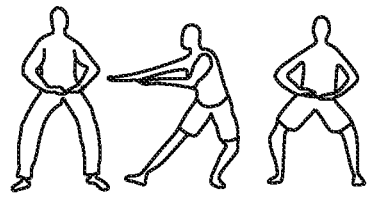
SELECT MATCHING SML MOVEMENT
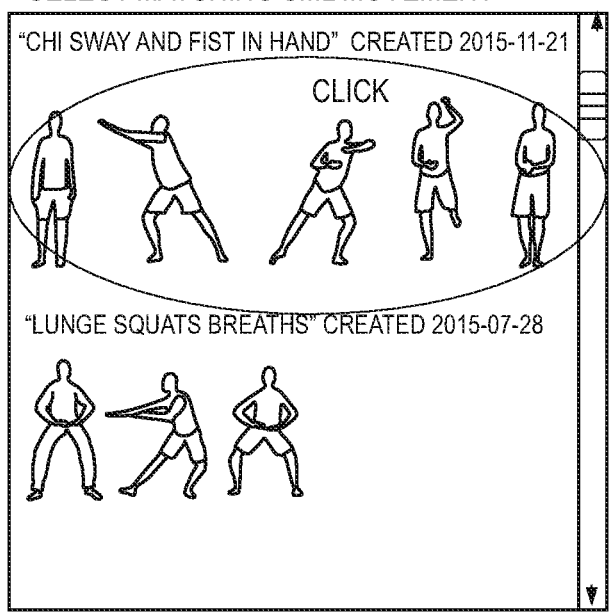
FIG. 20B ROUTINE #1 TIMELINE
| CHI SWAY AND | LUNGE SQUATS | CHI SWAY AND | LUNGE SQUATS | CHI SWAY AND | LUNGE SQUATS | CHI SWAY AND | LUNGE SQUATS |
00:00:00        CURRENT MOVEMENT:        00:45:09
"LUNGE SQUATS BREATHS"
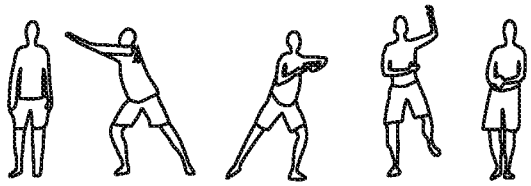
NEXT ROUTINE
OVERALL SCORE
IN ROUTINE : 98%
MATCHING SEGMENTS FOUND
SCORE : 100%
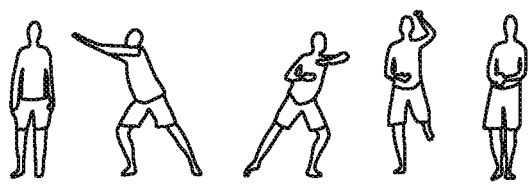
CLICK
COMBINE
ROUTINES
SELECT MATCHING SML MOVEMENT
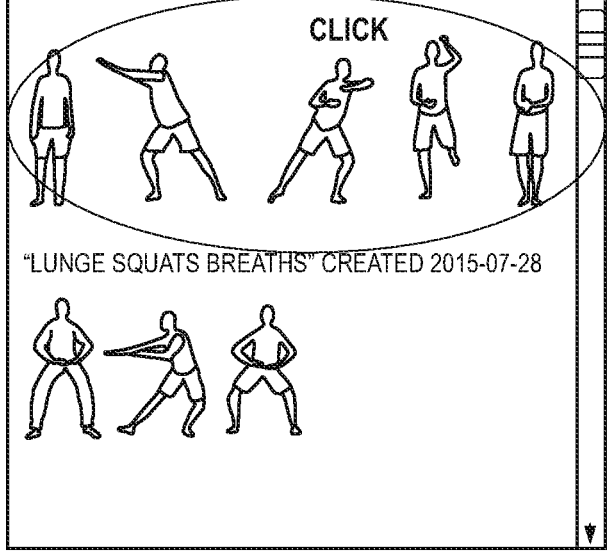
FIG. 20D ROUTINE #1 TIMELINE END    ROUTINE #2 TIMELINE END
LUNGE SQUATS    CHI SWAY AND
00:45:09    00:00:00
 
OVERALL SCORE
IN ALL ROUTINE :
99%
PLAY ANIMATION
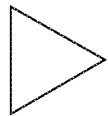
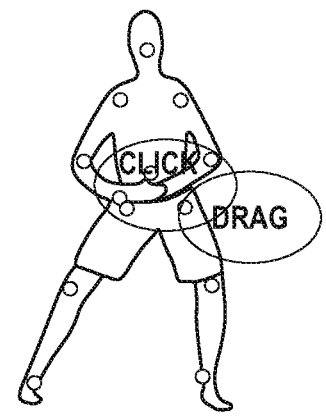
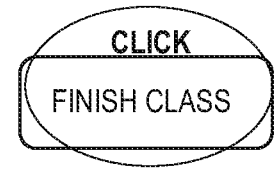
FIG. 21A ROUTINE #1 TIMELINE END  ROUTINE #2 TIMELINE END
LUNGE SQUATS               CHI SWAY AND
00:45:09                   00:00:00
 
OVERALL SCORE
IN ALL ROUTINE :
99%
PLAY ANIMATION
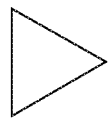
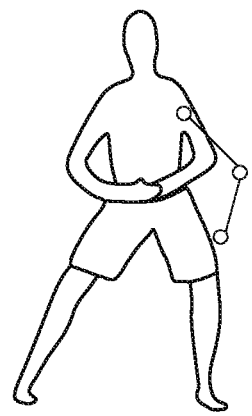
CLICK
FINISH CLASS
FIG. 21B ROUTINE #1 TIMELINE END   ROUTINE #2 TIMELINE END
| LUNGE SQUATS |          | CHI SWAY AND |
00:45:09                  00:00:00
 
OVERALL SCORE
IN ALL ROUTINE :
99%
PLAY ANIMATION
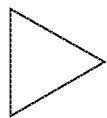
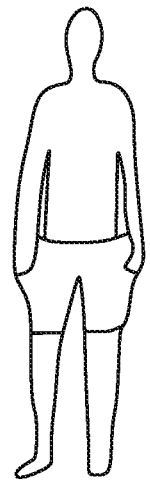
CLICK
FINISH CLASS
FIG. 21E SCORE:
100%
ENTER THE NAME OF THE NEW CLASS
CLICK
PUBLISH PREVIEW
STOPPED
CHOOSE RECORDINGS TO VIEW
2015-11-21 AT 18:34 RECORDING SESSION, ATTEMPT:1,2,3,4,5,6,7,8,9,10,11,12,13,14
CLICK
2015-11-21 AT 18:01 RECORDING SESSION, ATTEMPT:1,2,3,4,5,6,7,8,9,10,11,12,13,14
2015-11-21 AT 17:34 RECORDING SESSION, ATTEMPT:1,2,3,4,5,6,7,8,9,10,11,12,13,14
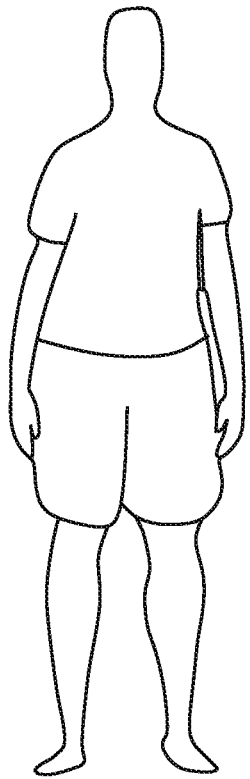
FIG. 22

ROUTINE #1 TIMELINE
SCROLL

| CHI SWAY AND | LUNGE SQUATS | CHI SWAY AND | LUNGE SQUATS | CHI SWAY AND | LUNGE SQUATS | CHI SWAY AND | LUNGE SQUATS |

00:18:32   01:36:23

CURRENT MOVEMENT:
"LUNGE SQUATS BREATHS"

PLAY

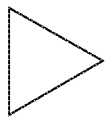

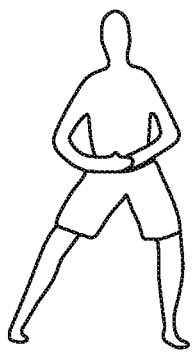

CHOOSE AUDIO CLIP
CLICK
MARK MASTERSON- XXED.MP3
MARK MASTERSON- EXCELLENT.MP3
MARK MASTERSON- HEELS HIGH.MP3
MARK MASTERSON- NOT TOO BAD MAN.MP3
MARK MASTERSON- WONDERFULL.MP3
MARK MASTERSON- GOOD.MP3
CLICK

FIG. 23

METHOD AND SYSTEM FOR AUTHORING ANIMATED HUMAN MOVEMENT EXAMPLES WITH SCORED MOVEMENTS

TECHNICAL FIELD

Embodiments of the disclosure relate generally to exergaming platforms to provide interactive training programs. Embodiments relate more particularly to a computer-implemented method and system for authoring animated human movement examples with scored movements using a 3D sensor.

BACKGROUND

Video games are extremely popular and are enhanced by allowing users to participate in fitness programs, sports programs and gaming programs. Fitness programs may include yoga, tai chi, martial arts and aerobic dance. Sports programs may include baseball, football, tennis and so on. Gaming programs may include adventure scenarios, quests, battle scenarios and so on. Typically, all these programs are interactive and display the users' movements on a screen thereby providing real-time visual feedback to the users.

Specifically, exergaming (also known as fitness game) is an activity that combines fitness programs with game play. The users' movements are incorporated into the flow of action displayed on the screen. Further, during the exergaming program, the user receives real-time feedback and encouragement on his/her progress. Thereby, the user is prompted to work harder and reach personal milestones.

Typically, a human movement can be segmented using a video player, such as in Dartfish sports analysis tool. The start and end frames of the video are marked by the user. Two traditional methods exist for creating human movement scoring system namely, programming of pose recognition rules and by using Microsoft's Visual Gesture Builder (VGB) intelligent development environment (IDE) designed for software developers. Further, there are two main approaches for producing human movement examples for games, namely, animation of 3D avatars and conventional video production. Video production is time-based and it takes a full-scale computer graphics platform to create transitions between end and start poses of a person in different poses at different moments. Further, animation of 3D avatars requires a high amount of effort to specifically animate every move in the system. For instance, in order to produce an animation of "jumping up", an animator would need to record the movement with a motion capture system after which a programmer would need to program and test triggers to recognize the start of the jump in order to produce nearly real-time animation of the jump done by the avatar. This process requires multiple people with technical expertise and takes days to be complete.

Conventional methods for creating exercise classes are complicated and time-consuming as the process involves a significant amount of iterative programming and testing of pose recognition algorithms as well as video production techniques. Until now, it has been difficult and time-consuming to create example movement sets with pose recognition rules that would work well for all users and acceptable for modern games and exergaming systems.

In light of the above discussion, there appears to be a need for an efficient method to enable new content consisting of scored example movements to be authored with reasonable effort and high level of technical expertise.

OBJECT OF INVENTION

The principal object of the embodiments herein is to create exercise classes with minimal post-processing effort for WorldX exergaming platform.

Another objective is to create score-able virtual exercise classes in pre-processing and post-processing phases. The content produced between these two phases can record custom routines that constitute to personal virtual exercise class.

Yet another object of the embodiments herein is to create a virtual exercise class that can be replayed as an example for players whose performance is scored according to pre-defined scoring rules.

Yet another object of the embodiments herein is to create example movement sets with pose recognition rules that work well for everyone and look acceptable for modern games and exergaming systems.

Yet another object of the embodiments herein is to enable new content consisting of scored example movements to be authored with reasonable effort and high level of technical expertise.

SUMMARY

The above-mentioned needs are met by a computer-implemented method, computer program product and system for authoring animated human movement examples with scored movement segments.

An example of a computer-implemented method for authoring animated human movement examples with scored movement segments includes pre-processing with pre-segmented movement wherein start and end frames of a movement segment have been defined automatically to create a Standard Movement Library. The computer-implemented method also includes post-processing with pre-segmented routine wherein start and end frames of each individual movement has been defined to produce a virtual exercise class. Further, the computer-implemented method includes segmenting a routine into individual movements to create a timeline of movements that produces a score for the players, wherein the routine is recorded by the instructor. Furthermore, the computer-implemented method includes concatenating a plurality of routines in any order to create a full exercise class and creating score-able virtual exercise classes in the pre-processing and post-processing phases. Moreover, the computer-implemented method includes verifying the virtual exercise with an instructor; and finalizing the virtual exercise.

An example of a computer program product for authoring animated human movement examples with scored movement segments include pre-processing with pre-segmented movement wherein start and end frames of a movement segment have been defined automatically to create a Standard Movement Library. The computer program product also includes post-processing with pre-segmented routine wherein start and end frames of each individual movement has been defined to produce a virtual exercise class. Further, the computer program product includes segmenting a routine into individual movements to create a timeline of movements that produces a score for the players, wherein the routine is recorded by the instructor. Furthermore, the computer program product includes concatenating a plurality of routines in any order to create a full exercise class and creating score-able virtual exercise classes in the pre-processing and post-processing phases. Moreover, the computer program product includes verifying the virtual exercise with an instructor; and finalizing the virtual exercise.

An example of a system for authoring animated human movement examples with scored movement segments includes a computing device and a 3D sensor to recognize different segments of movements. The system also includes a network and a database store score-able models of a single movement and its segments, score-able routines and score-able classes. Further, the system includes a processor configured within the computing device and operable to perform: pre-process with pre-segmented movement wherein start and end frames of a movement segment have been defined automatically to create a Standard Movement Library; post-process with pre-segmented routine wherein start and end frames of each individual movement has been defined to produce a virtual exercise class; segment a routine into individual movements to create a timeline of movements that produces a score for the players, wherein the routine is recorded by the instructor; concatenate a plurality of routines in any order to create a full exercise class; create score-able virtual exercise classes in the pre-processing and post-processing phases; verify the virtual exercise with an instructor; and finalize the virtual exercise.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the present disclosure.

FIG. 6 is a schematic representation illustrating a subset of tracked joints required for recognizing most fitness movements, according to the embodiments as disclosed herein;

FIG. 7 is a schematic representation illustrating skeletal tracking based measurement sticks that keep definitions of pose recognition rules independent of the player's body size, according to the embodiments as disclosed herein;

FIG. 8a-FIG. 8d illustrates a scoring rule matcher user interface for identifying matching movements of a new routine with scored movements in the Standard Movement Library, according to the embodiments as disclosed herein;

FIG. 14a-FIG. 14f illustrates the recording of new standard movements by the SML creator, according to the embodiments as disclosed herein;

FIG. 15a-FIG. 15g illustrates the segmentation of an SML movement, according to the embodiments as disclosed herein;

FIG. 16a-FIG. 16c illustrates a timeline with several segments, according to the embodiments as disclosed herein;

FIG. 17a-FIG. 17l illustrates adding scoring rules for each segment, according to the embodiments as disclosed herein;

FIG. 18a-FIG. 18e illustrates a process to test the movement with scoring rules, according to the embodiments as disclosed herein;

FIG. 19a-FIG. 19f illustrates the post-processing phase of fitness instructor's class. Each routine is divided into individual movements, according to the embodiments as disclosed herein;

FIG. 20a-FIG. 20d illustrates matching of each fitness instructor's movement with SML movements and adjusting time constraints, according to the embodiments as disclosed herein;

FIG. 21a-FIG. 21e illustrates the process of composing/animating transitions between routines, according to the embodiments as disclosed herein;

FIG. 22 illustrates the process of testing the post-produced class, according to the embodiments as disclosed herein;

FIG. 23 illustrates the process of adding the audio clips to the recording, according to the embodiments as disclosed herein.

DETAILED DESCRIPTION OF THE EMBODIMENTS

The above-mentioned needs are met by a computer-implemented method and system for authoring human movements' examples with scored movement segments. The following detailed description is intended to provide example implementations to one of ordinary skill in the art, and is not intended to limit the invention to the explicit disclosure, as one or ordinary skill in the art will understand that variations can be substituted that are within the scope of the invention as described.

An exergame may be defined as an electronic or video game wherein the user (participant) is involved in physical exercise to burn calories, obtain greater flexibility, or improve posture.

Environment Block Diagram

Figure 1:
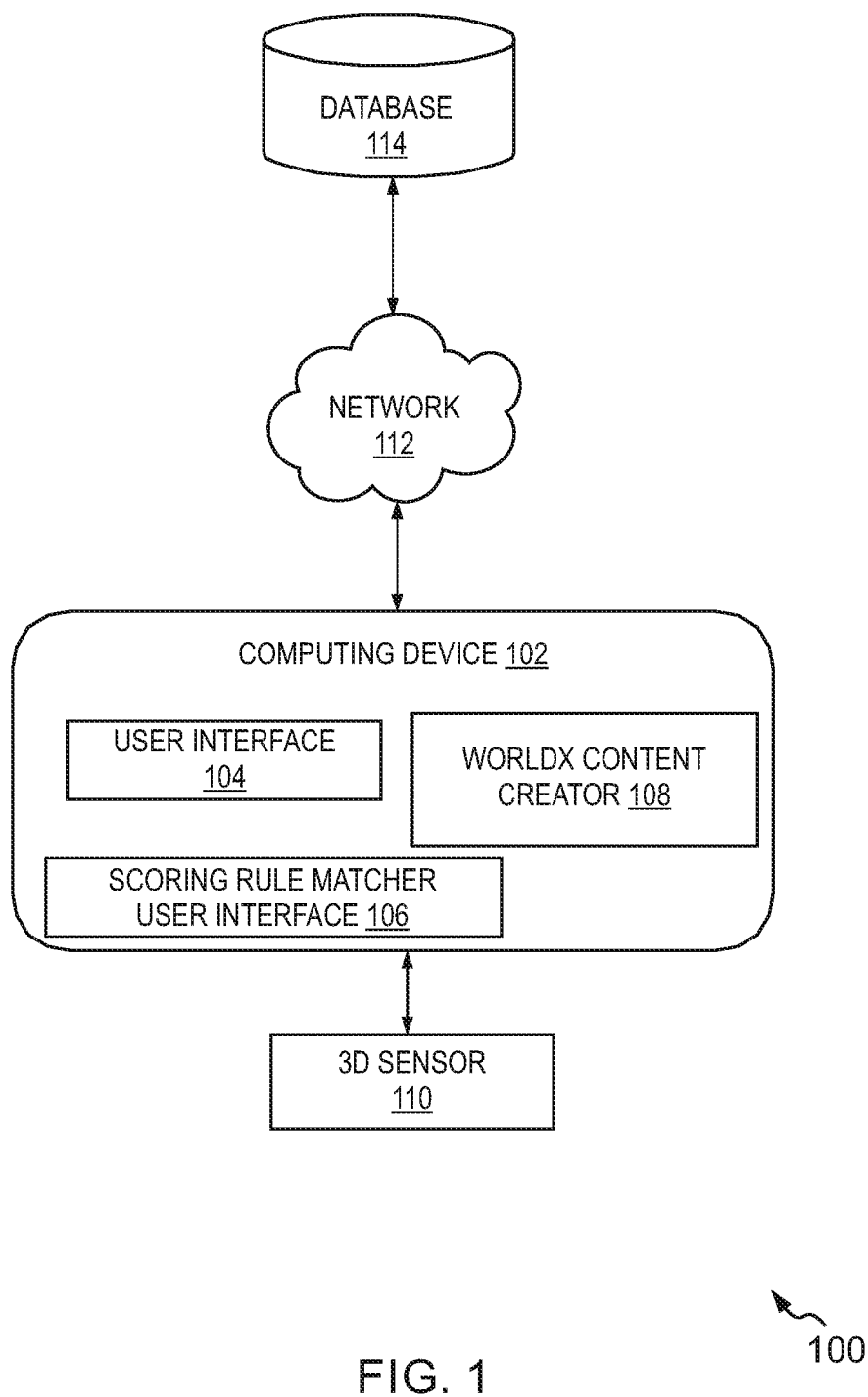
FIG. 1 is a block diagram of the environment, according to the embodiments as disclosed herein.

FIG. 1 is a block diagram of the environment, according to the embodiments as disclosed herein. As depicted in FIG. 1, the components of the environment 100 include a computing device 102, a 3D sensor 110, a network 112 and a database 114. Further, the computing device 102 includes a user interface 104, a scoring rule matcher user interface 106 and a WorldX Content Creator 108.

Typically, the computing device 102 is a portable electronic device configured with a user interface to interact with a user of the computing device 102. Examples of the computing device 102 include, but are not limited to, a personal computer (PC), laptop, a mobile phone, an iPad, a tablet device, and a personal digital assistant (PDA). Examples of the user interface include, but are not limited to, display screen, keyboard, mouse, light pen, the appearance of a desktop, illuminated characters, help messages.

The computing device 102 includes a processor, memory, storage device, a high-speed interface connecting to memory and high speed expansion ports and a low speed interface connecting to low speed bus and storage device. Each of the underlying components are interconnected using various busses and may be mounted on a common motherboard. The processor can process instructions for execution within the user device 102, including instructions stored in the memory or on a network to display graphical information for a graphical user interface (GUI) on an external input/output device such as display coupled to high speed interface. In other implementations, multiple processors and/or multiple buses may be used as appropriate along with multiple memories and types of memory.

The 3D sensor 110 is a device that analyses a real-world object and collects data on the distance between the sensor and various points on the object. The collected data can then be used to construct digital three-dimensional models.

Network link(s) involved in the system of the present invention may include any suitable number or arrangement of interconnected networks including both wired and wireless networks. By way of example, a wireless communication network link over which mobile devices communicate may utilize a cellular-based communication infrastructure. The communication infrastructure includes cellular-based communication protocols such as AMPS, CDMA, TDMA, GSM (Global System for Mobile communications), iDEN, GPRS, EDGE (Enhanced Data rates for GSM Evolution), UMTS (Universal Mobile Telecommunications System), WCDMA and their variants, among others. In various embodiments, network link may further include, or alternately include, a variety of communication channels and networks such as WLAN/Wi-Fi, WiMAX, Wide Area Networks (WANs), and Bluetooth.

The database 114 typically stores the Standard Movement Library (SML) and the Exercise Class Library (ECL). The SML stores the scoring rules whereas the ECL stores the routines exercise classes. In some embodiments, the database 114 may be split into two databases such that SML and ECL are stored in unique databases.

The user interface 104 enables the define pose recognition rules in various movement segments for SML movements. The user interface 104 is also used to mix different movement clips together and make transitions between them. The scoring rule matcher user interface 106 identifies which movements of a new routine recorded by another instructor match with scored movements in the SML.

The WorldX Content Creator 108 includes a visual mouse-driven user interface (not shown in FIG. 1) for making the transitions without and knowledge of 3D animation processes. Typically, the user interface used here allows new routines consisting of many movements to be compared against pose recognition (and scoring) rules in individual movements in the SML. The WorldX Content Creator 108 is responsible for pre-processing thereby creating a SML and for post-processing to produce a virtual Exercise Class. Further, the WorldX Content Creator 108 utilizes a segmentation algorithm that finds the start and end frames of recorded example movements automatically. The segmentation is performed on a 4D recording (x, y, z physical dimensions+time). Furthermore, the WorldX Content Creator 108 includes a semi-automated testing support that enables multiple recordings of human movements to be evaluated against a score-able segment.

A computer program product is tangibly embodied in the computing device 102. The computer program product also contains instructions that when executed perform the method described herein.

The process of creating new human movement examples from a fitness instructor is divided into two main phases namely, pre-processing and post-processing. During pre-processing, scoring rules are produced for the SML. During post-processing, new Exercise Classes are created by instructors. Between these two phases, the instructor records one set of example movements, for instance a one minute routine of seven different individual movements. The end result is a virtual exercise class that can be replayed as an example for players whose performance is scored according to pre-defining scoring rules. The exercise class can include audio tracks such as background music and voice feedback pre-recorded by the instructor, and background imagery appropriate for the type of exercise. Further, the exercise class can also include various real/time visualizations of the player's performance compared to the instructor's example.

The method described herein emphasis on the following aspects:

1. The ability to efficiently produce pose recognition rules that constitute a scoring system for all movements in the SML.
2. The ability to create visual example movements by interpolating transitions between individual movement clips.

It should be appreciated by those of ordinary skill in the art that FIG. 1 depicts the computing device 102 in an oversimplified manner, and a practical embodiment may include additional components and suitably configured processing logic to support known or conventional operating features that are not described in detail herein.

Block Diagram of Setup Process

Figure 2:
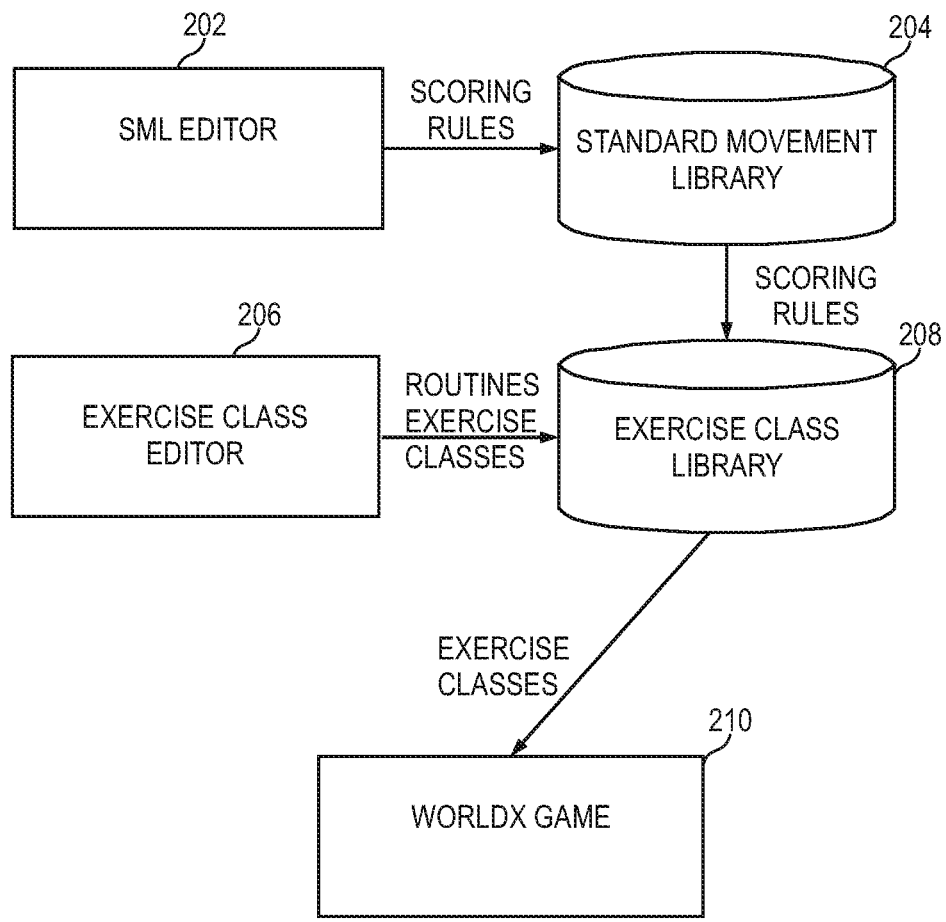
FIG. 2 is a block diagram of the components, according to the embodiments as disclosed herein.

FIG. 2 is a block diagram of the setup process, according to the embodiments as disclosed herein. The setup process (Step 1) begins by creating content by an SML Editor 202. In other words, individual movements (a few seconds each) are created. Consequently, scoring rules are stored in a Standard Movement Library (SML) 204. The purpose of creating content in the SML is to create the scoring rules that define how different joints of the player should relate to each other in order to make a logical score-able pose. The game will then use these scoring rules to count a total score of the player's performance in an exercise class.

The next step (Step 2) involves in creating several routines (less than 2 min) and exercise classes (between 5-30 min) by the Exercise Class Editor 206. The production of these routines delivers fully playable exercise classes. Further, these routine exercise classes are saved in an Exercise Class Library (ECL) 208.

The scoring rules from the Standard Movement Library along with routines from the Exercise Class Library produces "WorldX Game" 210 Exercise classes.

STEP 1: Adding movements to the Standard Movement Library (SML)
1. To start defining Standard Movements, a corresponding button is activated by clicking on the button displayed on the screen (user interface).
2. A button to record new movement is clicked to start recording a movement.
3. Recording process begins:
   a. The user is required to move in front of the sensor.
   b. The user may be asked to stand still normally with hands beside thighs, to measure body size. The measurements would appear on the top of the screen.
   c. A short movement is recorded. The recording may be stopped by walking towards the sensor.
4. The recorded movement can be edited. In other words, the latest unprocessed recording can be opened by clicking "Process Latest Movement" button on the screen. The user can then click on "Latest" folder and make changes.
   a. The movement can be scrolled by clicking "Play", "Stop", "Forward" or "Back".
   b. The user can toggle target and reference joints on the left to display their trajectories in green and blue respectively.
   c. The user can also toggle visualization of the space between the selected joints with a "visualize" checkbox.
   d. The user is then allowed to find a best fit of the movement and click "Set Segment".
   e. Joint tracking metrics are inspected to make sure all joints are green and over 90% smoothness percentage to guarantee good reliability.
   f. The dimensions of the space between the target and the reference joint are inspected. A semi-transparent cube displays the space between the joints as long as "visualize" is toggled on. Numbers at the bottom of the screen signifies an accurate percentage of body height/leg length/arm length and the space between the joints. The user may also change measurement (body height/leg length/arm length).
   g. A threshold percentage is also set. Direction for comparing the joints position is first defined by allowing the user to select one of X/Y/Z radio buttons. Subsequently, the user can click on "change comparison direction" to change right/left, above/below or closer to sensor/farther to sensor. A meaningful threshold percentage is then defined that would describe the movement's end-pose, which can be entered by the user in a text box.
   h. The user can scroll back in the timeline to find a good pose which is not the end of the movement. Subsequently, lower threshold values are produced and thus the rules become easier without the need of manually typing in the lower threshold values.
   i. Upon clicking "Add rule", the current values are set as scoring rules to the segment.
   j. More segments can be added and the scoring rules can be viewed as text lines. Incorrect scoring rules may be removed. Once a good set of scoring rules have been created, the scoring rules may be saved and tested.
5. The recorded movement can be tested.
   a. The user is asked to move in front of the sensor again and stand with hands beside thighs to measure body size.
   b. The user starts to move and tries to produce the pose used in the editing phase. The pose recognition event log is inspected for every move that triggered the scoring rule.
   c. If no text and score appears on the screen, then it means that the scoring rule does not work at all. In such a case, the user needs to move toward the sensor to quit and re-do the SML movement editing process.
   d. Each segment of the movement is checked and tested. The testing can be ended by moving toward the sensor.
   e. The test can be saved to proceed fine-tuning the movement. The SML movement is reloaded immediately.
   f. Additional tests can also be recorded when many users are available for testing.
   g. A "Go back without saving" button is useful when the test session fails due to an external reason.
   h. The number of tests for a specific SML movement can be viewed. The tests typically help in defining best joints for each move and thus support changing and adjusting scoring rules to improve their reliability.
   i. The user can scroll the timeline to one of the segments that includes scoring rules and metrics are calculated from any number of tests.
   j. Joint tracking metrics is calculated for the previous test and shows how tracking of selected joints. Each test recording is displayed in detail on the screen. Further, average metrics of all the tests is also displayed.
   k. The scoring rule is matched with a selected segment in the test recording. If a match is found, the metrics+1 sec is calculated from that frame. A thumbnail is produced to show the matching pose in the test recording.
   l. The original SML movement recording and all recorded tests can be read. Further, the overall tracked state and smoothness results are indicated through specific colors. For instance, green color to signify good (quite reliable to use), yellow color to signify poor (might not be fully reliable to use) and red color to signify bad.
   m. If the tracked state and smoothness look much lower in the test than in the current recording, then it means that the user should try to implement the same logical rule using different Target and/or Reference joints.
   n. General trends can be tracked in the selected joints after recording a plurality of tests.

STEP 2: Adding routines and compiling them to the Exercise Class Library (ECL).
1. Start recording a new routine into which the SML scoring movements are then mapped to.
2. The user can select a background music file to be played. This helps to synchronize the movements with the music's beat.
3. The user is requested to stand still for measurement. The user can later stop the recording by walking towards the sensor.
4. The routine is then segmented to identify when each logical movement starts and ends so that the SML's scoring rules can be matched with the player's performance during the game.
5. The timeline can be scrolled and several options such as Play, Stop, Forward and Back can be performed.

6. When the actual movement begins, the routines start frame is selected. A line appears at that particular frame on the timeline. From the start frame on the entire routine will be cropped from the beginning. This enables removing frames where the person adjusts the pose before starting the routine, walks to the correct position and so on, unwanted parts of the recording that would otherwise show in the final exercise class.
7. When the movement seems to end or turn, the user can mark it on the timeline. This creates a segment with a thumbnail of its end-pose and highlights all the frames in the segment. A line appears at the end frame. Only the frames between the start and end frames will be included in the routine. The other frames would be cropped off from the timeline.
8. The last segment is set such that the person is in a neutral standing position. Those frames where the person walks toward the sensor to auto-stop recording is excluded.
9. The routine is finally saved with a unique name.
10. A plurality of routines can be recorded and segmented.
11. Routines are matched with movements in SML. The purpose of this step is to match the routine with individual movements in the SML so that a total score can be later counted in the Game.
    a. First, the SML movement (in the first segment) wherein the end pose looks like the best match is selected. A score is then calculated for this routine using the selected SML scoring rules. The result is then displayed as a percentage of the movement's segments with the routine's segment.
    b. Step (a) is repeated until every meaningful segment is matched.
    c. Pre-recorded audio can be added which can be an encouragement or an advice for the player. The audio files can be previewed.
12. Now the routines timeline should be complete with scoring and audio feedback. Other recorded routines can be added to form a longer class.
13. Several routines with complete timeline, scoring and audio feedback can be created by repeating the steps described above. These routines put together forms a complete exercise class with a unique name.
14. Background music can also be added to the exercise class.
15. Test Class: First the user moves in front of the sensor and stands still until body measurement is complete. Then as the instructor of the class appears on the screen, the routines begin. The user is required to try and match the example movements that are displayed. Once the exercise class ends, the score is displayed. The class would reset after a specific time (for instance, 15 seconds) so that the test can be repeated by another person.

Operational Flow Chart

Figure 3:
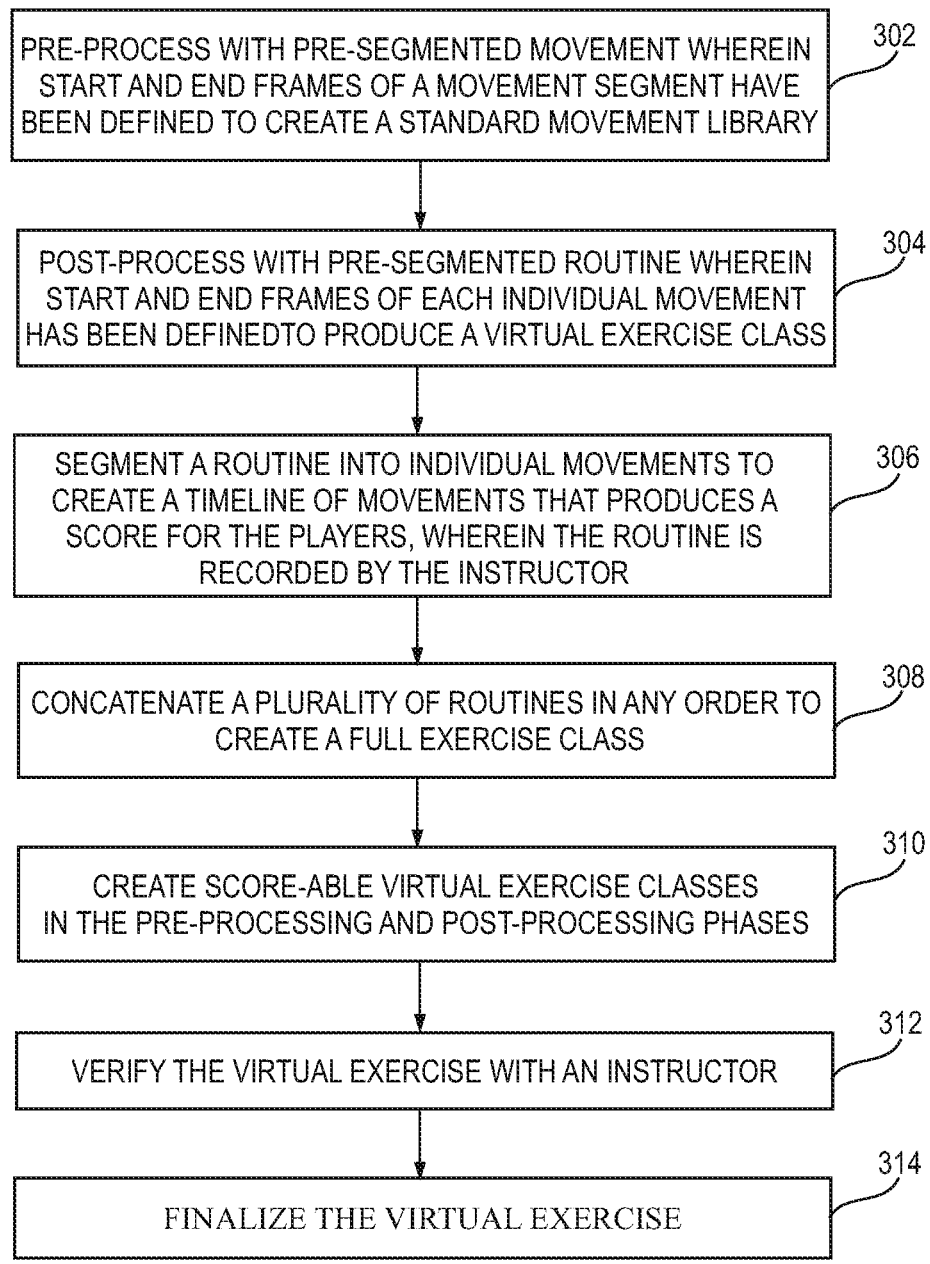
FIG. 3 is a flow chart describing a method for authoring animated human movement examples with scored movement segments, according to the embodiments as disclosed herein.

FIG. 3 is a flow chart describing a method for authoring animated human movement examples with scored movement segments, according to the embodiments as disclosed herein. The flow chart begins at step 302.

At step 302, pre-segmented movements are pre-processed wherein the start and end frames of a movement segment has been defined to create a Standard Movement Library.

This step is referred to as the pre-processing phase. Typically, the pre-processing phase includes the following steps:
1. Recording
    a. Prepare the recording session, start the program
    b. Record movement once by expert by the 3D sensor
2. Editing
    a. Divide movement into individual segments
    b. Design scoring rules for each segment
    c. Add scoring rules for each segment
    d. Test the movement with scoring
    e. (Iterate multiple times: steps 2b-d).
3. Testing—Test the movement several times by several people of different size, movement capability and so on.
4. Refining—Iterate steps 2b-d. Each iteration adds to better understanding of how to implement the most reliable scoring rule set.
5. Re-testing—Test the refined movement by multiple people of different size, movement capability and so on.

When creating scoring rules for a movement, the 3D sensor recognizes the position of every joint while the person creating the scoring rules decides how the movement is segmented into logical component parts. Segments may be defined as end-poses and the movement is just the process of transitioning from one pose to another in the correct sequence.

At step 304, pre-segmented routines are post-processed wherein the start and end frames of each individual movement has been defined to produce a virtual exercise class. A virtual exercise class can be defined as a 6-level hierarchy:
1 Class, consists of
    1-n (typically n=4) unique Routines, consists of
        1-n (typically n=5) unique Movements, consists of
            1-n (typically n=4) unique Segments, contains
                3-n Joint Thresholds (tracked by the system) describing a Pose
0-n Scoring Rules (a numerical score translatable to for example, percentage of successfully repeated segment vs. all segments in all the example movements).

This step is referred to as the post-processing phase. Typically, the post-processing phase includes the following steps:
1. Movement routines are recorded using the 3D sensor
2. Each routine is segmented into movements
3. Scorable movements are matched in a database with each routine
4. Compose/animate transitions between routines
5. Routines are selected to construct exercise class timeline
6. 4D frames are synthesized between routines At step 306, a routine is segmented into individual movements to create a timeline of movements that produces a score for the players. The routine is recorded by the instructor.

Further, pose recognition rules are produced that constitute a scoring system for all movements in the Standard Movement Library.

Visual example movements are created by interpolating transitions between individual movement clips.

Velocity peaks are recognized. These velocity peaks indicate direction of a limb change through signal processing.

New routines are compared against pose recognition and scoring rules from the SML.

At step 308, a plurality of routines is concatenated in order to create a full exercise class. New exercise classes are created by instructors subsequent to the post-processing phase.

At step 310, a score-able virtual exercise class is created in the pre-processing and post-processing phases.

At step 312, the exercise class is verified with an instructor. An online session is organized with the instructor. The post-produced class is shown and validated with the instructor.

At step 314, the exercise class is finalized. Audio clips are included in the recording. The finalized class is tested by a plurality of people and subsequently the finalized class is published to the WorldX server.

The flow chart ends at step 314.

The method described herein is beneficial for several reasons such as:
1. Reliable scoring without using complex technical process
2. The human movement examples look natural in the virtual exercise class. The players' movements are represented visually in real-time.
3. Previous scoring rules are reused as part of the exercise classes thereby making content authoring process much more efficient.
4. Time efficient and requires less expertise.

Schematic Representation of Exergaming Platform

Figure 4:
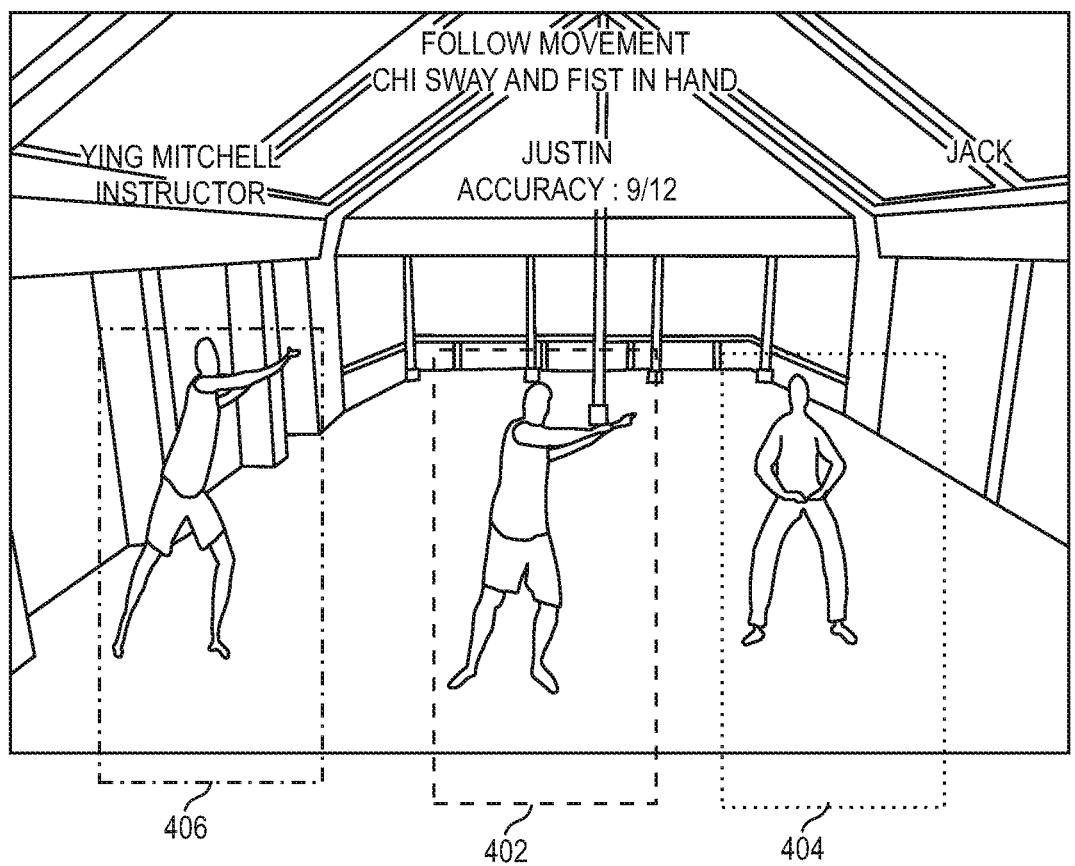
FIG. 4 illustrates the exergaming virtual exercise class, according to the embodiments as disclosed herein.

FIG. 4 illustrates the exergaming virtual exercise class, according to the embodiments as disclosed herein. The WorldX exergaming platform is shown in this figure.

Two WorldX players 402 and 404 are shown in the figure along with a virtual instructor 406.

Block Diagram of Overall Process

Figure 5:
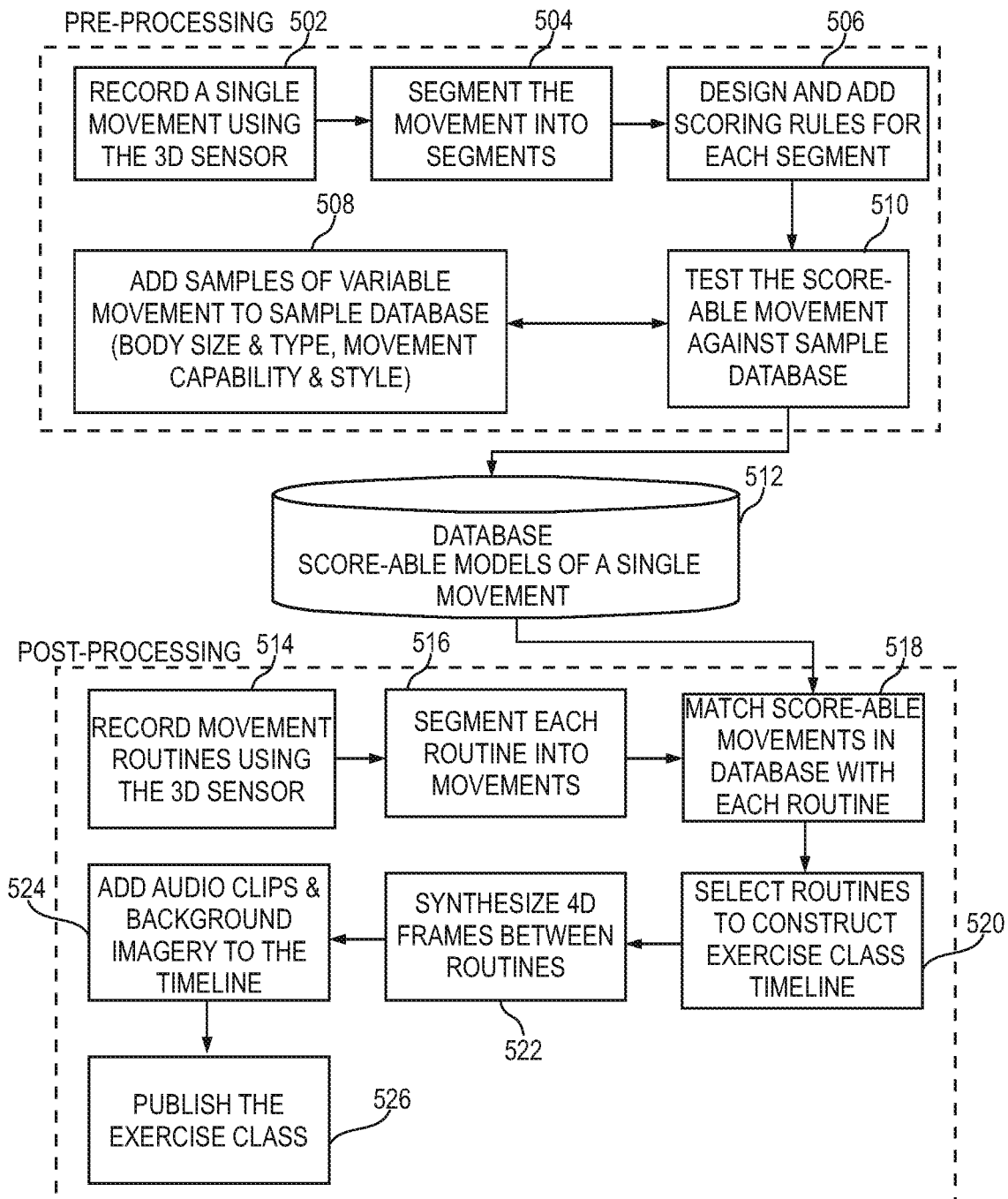
FIG. 5 is a block diagram illustrating the overall process for creating a virtual exercise class, according to the embodiments as disclosed herein.

FIG. 5 is a block diagram illustrating the overall process for creating a virtual exercise class, according to the embodiments as disclosed herein.

The figure describes the two phases of pre-processing and post-processing to create a score-able virtual exercise class. Between the two phases, content is produced. For instance, a fitness instructor can record custom routines that constitute to his/her personal virtual exercise class.

The pre-processing phase begins by recording a single movement using the 3D sensor 502. The movement is then segmented into segments 504. Each segment is added with scoring rules 506. The score-able movement is tested 510 against a database 512. Further, samples of variable movement are added 508 to a database 512.

The post-processing phase includes the following steps. At first, movement routines are recorded using the 3D sensor 514. Each routine is then segmented into movements 516. Score-able movements from the database 512 are matched with each routine 518. The routines are selected to construct an exercise class 520. 4D frames are then synthesized between routines 522. Audio clips and background imagery can be further added 524 and finally the exercise class is complete and is published 526.

The end result is a virtual exercise class that can be replayed as an example for players whose performance is scored according to pre-defined scoring rules.

Schematic Representation of Tracked Joints

FIG. 6 is a schematic representation illustrating a subset of tracked joints required for recognizing most fitness movements, according to the embodiments as disclosed herein.

Typically, the number of individual joints needed for recognizing a human pose is minimized to achieve high reliability. The figure shows only a subset of joints (normally 12 in number) that are needed. For instance, position of the head is rarely essential for most fitness moves.

To minimize the number of pose recognition rules, joint position thresholds are used instead of thresholds of angles between joints. To calculate an angle, 3 joint positions must be known where as a pose recognition rule using only 2 joints can be created as a distance threshold.

Schematic Representation of Skeletal Tracking

FIG. 7 is a schematic representation illustrating skeletal tracking based measurement sticks that produce multiple benefits for creating and using movement scoring rules, according to the embodiments as disclosed herein.

To keep calculations independent of body size and individual differences of body proportions, body measurements are used to create three types of measurement sticks that can be applied. The body sizes are measured for each player in a still pose and averaged from several samples of measurements.

FIG. 7 illustrates the skeletal tracking based measurement sticks that keep definitions of pose recognition rules independent of the player's body size.

Thus, by using a measurement stick and a distance factor a pose recognition rule can be expressed without any absolute measurements of distance (centimeters or meters) or angle ranges (radians or degrees), and by minimal number of joints (two). The pose recognition rule created this way improves reliability of scoring the player's movements by reducing the negative impact of random errors in tracking the joints. It also requires minimal amount of user interactions when creating the rules. The general formula for creating pose recognition rules using 3D vector graphics pseudo code is:–

|TargetJoint.Dim–ReferenceJoint.Dim|>MeasurementStick*DistanceFactor where Dim is any of the axes of the 3D space X, Y, or Z.

Scoring Rule Matcher User Interface

FIG. 8a-FIG. 8d illustrate a scoring rule matcher user interface for identifying matching movements of a new routine with scored movements in the Standard Movement Library, according to the embodiments as disclosed herein.

The scoring rule matcher user interface allows new routines consisting of many movements to be compared against pose recognition (and scoring) rules in individual movements in the SML.

FIG. 8a displays a list of available SML movements with scoring is displayed on the screen. Each segment of the movement is here represented as a thumbnail of the end pose. Thumbnail is created automatically from the data. These movements can be dragged and dropped onto the timeline.

FIG. 8b illustrates the instructor's movements 802 and the SML movements 804. Each pose between the instructor's movements and SML movements is compared to derive the score. For instance, the overall score in the routine is 13 percent.

FIG. 8c illustrates the selected matching SML movements.

FIG. 8d illustrates the matching segments. The score is calculated from the instructor's movements against the specified SML movement. For instance, the overall score in this routine is 100 percent.

Block Diagram of Data Processing

Figure 9:
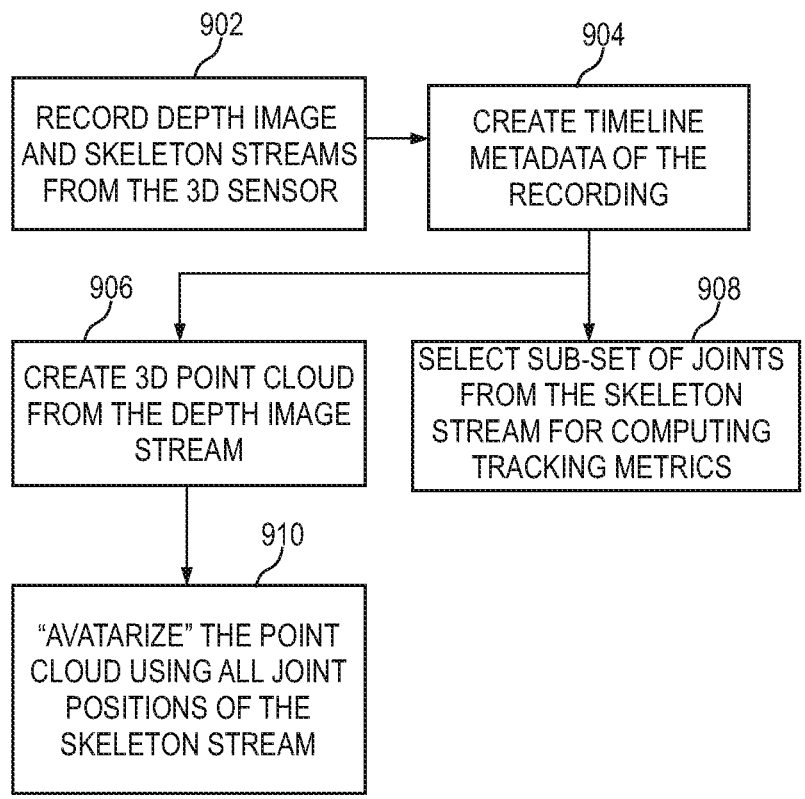
FIG. 9 is a block diagram illustrating data processing for making 4D models for editing SML movements and composing Exercise Classes, according to the embodiments as disclosed herein.

FIG. 9 is a block diagram illustrating data processing for making 4D models for editing SML movements and composing Exercise Classes, according to the embodiments as disclosed herein.

It is difficult to interpolate human movement between two image frames of a video. Thus, WorldX Content Creator includes functions that calculate the interpolations automatically and a visual mouse-driven user interface for making the transitions without any knowledge of 3D animation processes. In order to do this, the system is able to "avatarize" momentarily any recorded frame of the 3D depth data and turn it into 3D presentation that is modifiable as in animation programs. Synthetic frames are created between user-defined start and end frames that would otherwise show discrepancies in the final result. The process is defined as:
1. System "avatarizes" the depth image stream.
   a. A 3D point cloud is constructed from the depth image data of user-selected interpolation's start frame.

b. Skeleton joints are mapped to the 3D point cloud and virtual bones created between the joints according to human anatomy, e.g. leg bone covers an area from the knee down to the ankle.
c. Each depth image pixel is mapped to the bones of the avatar using skeleton joint positions and border detection algorithms on the depth image.

A drag doll avatar is created which joints can be moved in 3D.

2. The user inspects the system's suggested end frame for the interpolation function.
3. If needed, the user moves joints one by one to define each joint's positions in desired end frame for the interpolation function.
4. The interpolation function produces synthetic frames between the start frame and the end frame from the original "avatarized" depth stream. The following process is repeated until all frames are produced:
  a. Deviations between all key joints in the start and in the end frame are computed.
  b. Trajectories for all joints are computed from the start frame to the end frame using the deviation information.
  c. Each virtual bone and its related depth pixels are moved and rotated to create a synthetic interpolated frame.
  d. Borders around each virtual bone's depth pixels are extrapolated to keep the avatar's body shape intact according to the human anatomy.
  e. Any holes within the avatar's borders are filled using hole filling algorithms and properties of nearby depth pixels.
  f. The "avatarized" frame is turned back in to original depth image stream, which allows it to be treated as part of the original data stream in any part of the platform.

FIG. 9 typically illustrates this process. Depth image and skeleton streams are recorded from the 3D sensor 902.

A timeline metadata is created of the recording 904. Further, a 3D point cloud from the depth image stream is created 906. A subset of joints is selected from the skeleton stream for computing tracking metrics 908.

Finally, the point cloud using all joint positions of the skeleton stream is "avatarized" 910.

Block Diagram of Data-Driven Testing Process

Figure 10:
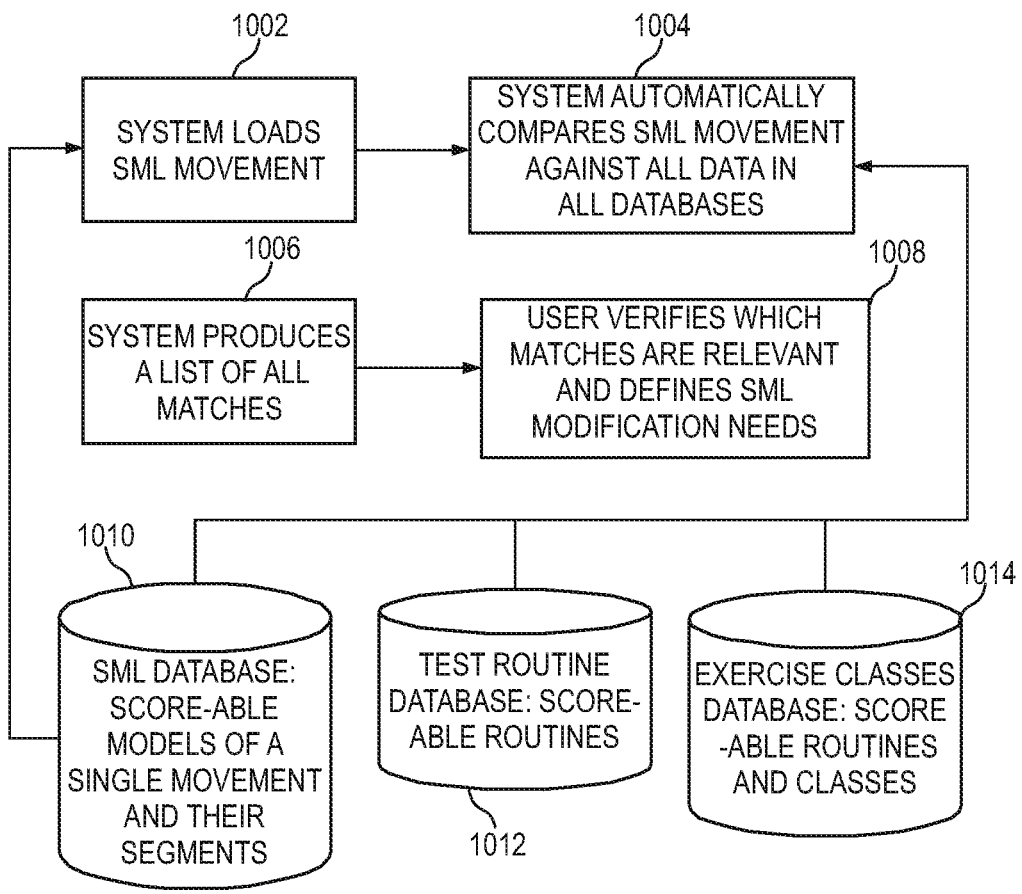
FIG. 10 is a block diagram illustrating automated data-driven testing process, according to the embodiments as disclosed herein.

FIG. 10 is a block diagram illustrating automated data-driven testing process, according to the embodiments as disclosed herein. A testing process developed around the database is portrayed.

The automated testing is supported by using a database of all movements used for defining SML movements as well as all the routines that have been recorded.

Typically, the method disclosed herein uses a search algorithm to traverse through the entire database and identify moves that match with each new SML movement.

FIG. 10 includes a SML database 1010, a test routine database 1012 and an exercise class's database 1014. The SML database 1010 stores score-able models of a single movement and their segments. The test routine database 1012 stores the score-able routines and the exercise classes database 1014 stores the score-able routines and classes.

The system typically loads the SML movements 1002 retrieved from the SML database. The system automatically compares SML movements against all data in all databases 1004. Subsequently, the system produces a list of all matches 1006. The user verifies which matches are relevant and defines SML modification needs 1008.

Block Diagram of Reliability

Figure 11:
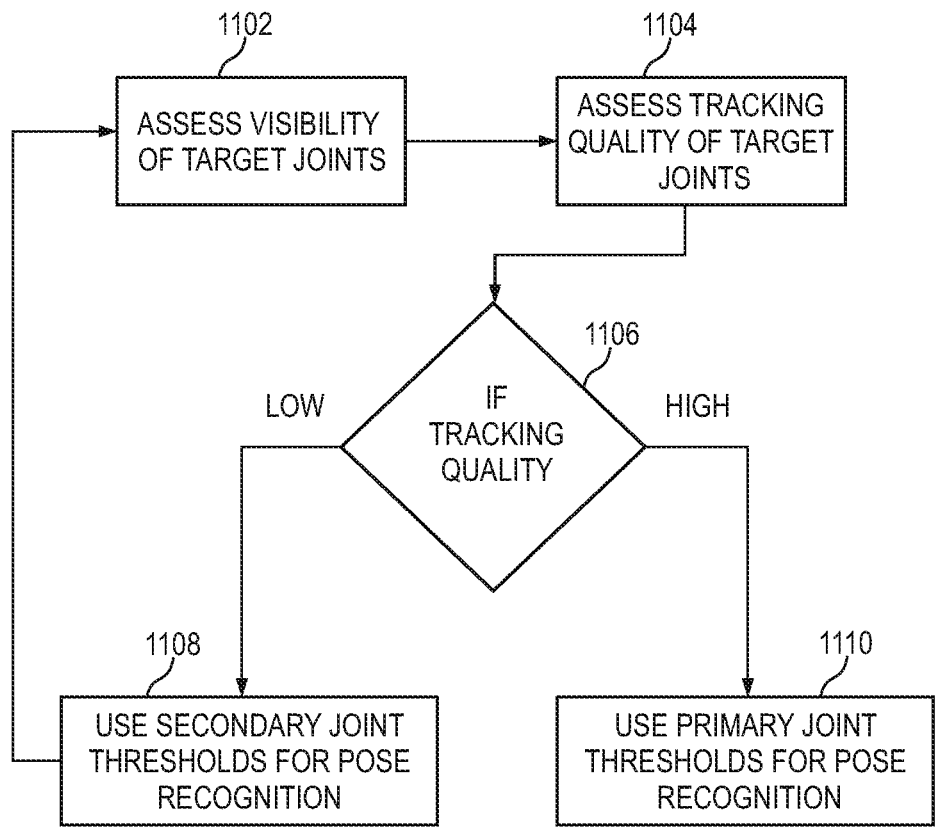
FIG. 11 is a block diagram illustrating an overview of reliability estimation pipeline and use of secondary joint thresholds, according to the embodiments as disclosed herein.

FIG. 11 is a block diagram illustrating an overview of reliability estimation pipeline and use of secondary joint thresholds, according to the embodiments as disclosed herein.

The system ensures that the movement segment can be recognized with high level of confidence by using a "failsafe approach". The failsafe approach uses redundancy of joint threshold rules and prioritizes the conventional thresholds defined by the user to be the primary ones. Additionally, based on joint tracking quality metrics, a secondary joint threshold set is produced automatically to act as a backup.

The visibility of target joints 1102 and tracking quality of target joints 1104 are assessed. The tracking quality is checked 1106. If the tracking quality is high, then primary joint thresholds are used for pose recognition 1110. If the tracking quality is low, secondary joint thresholds are used for pose recognition 1108.

Block Diagram of General Architecture

Figure 12:
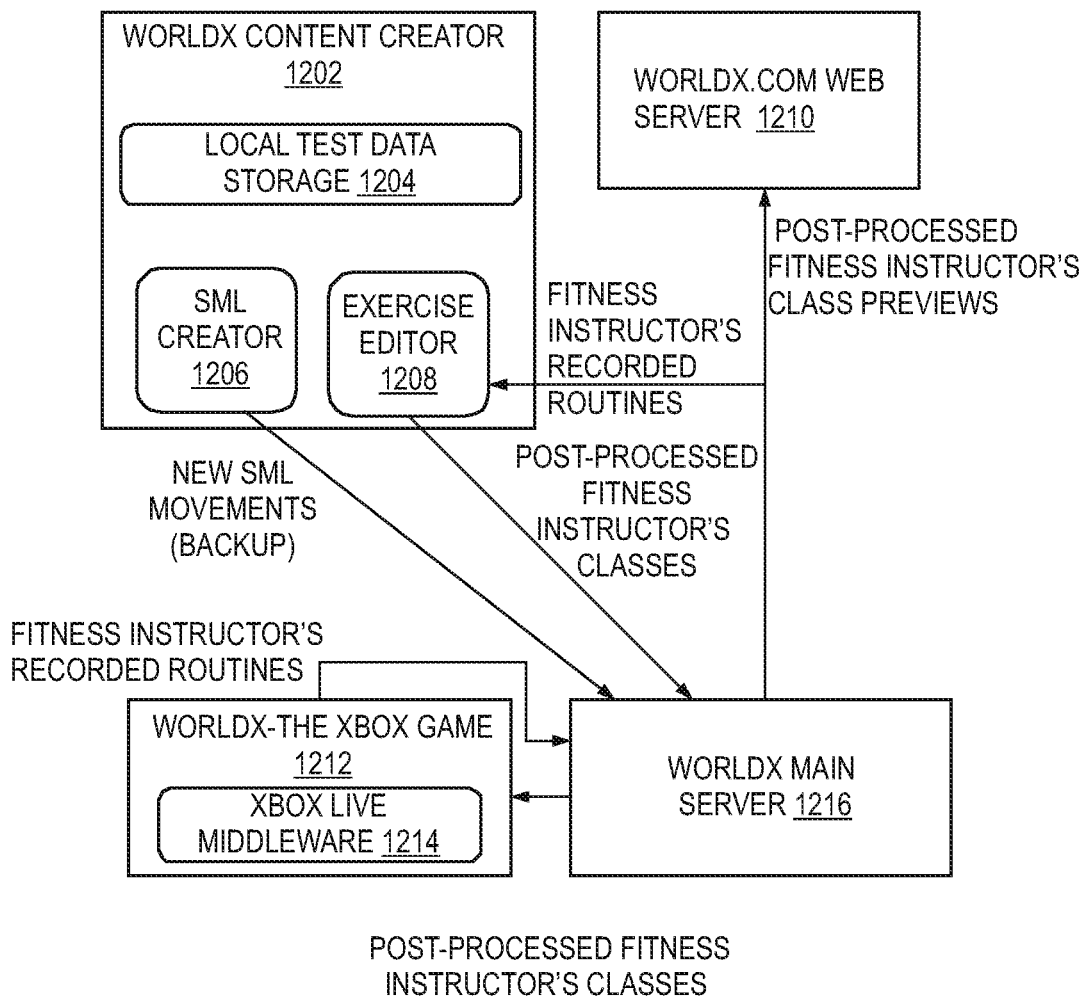
FIG. 12 is a block diagram illustrating a general architecture of the components and data flow of Content Creator and the rest of the exergaming platform, according to the embodiments as disclosed herein.

FIG. 12 is a block diagram illustrating a general architecture of the components and data flow of Content Creator and the rest of the exergaming platform, according to the embodiments as disclosed herein.

Basically, the architecture includes the WorldX Content Creator 1202, Xbox Game 1212, WorldX Main Server 1216 and Web Server 1210.

The WorldX Content Creator 1202 includes a local test data storage 1204, a SML creator 1206 and an Exercise Editor 1208. New SML movements from the SML creator 1206 are stored in the WorldX Main Server 1216. Further, post-processed fitness instructor's classes from the Exercise Editor 1208 are stored in the WorldX Main Server 1216.

The Xbox Game 1212 includes the Xbox Live middleware 1214. Further, the fitness instructors recorded routines are saved in the WorldX Main Server 1216. The post-processed fitness instructor's class previews are saved in the Web Server 1210. The WorldX Main Server 1216 saves the fitness instructor's recorded routines in the Exercise Editor 1208.

Schematic Representation of User Interface

Figure 13A:
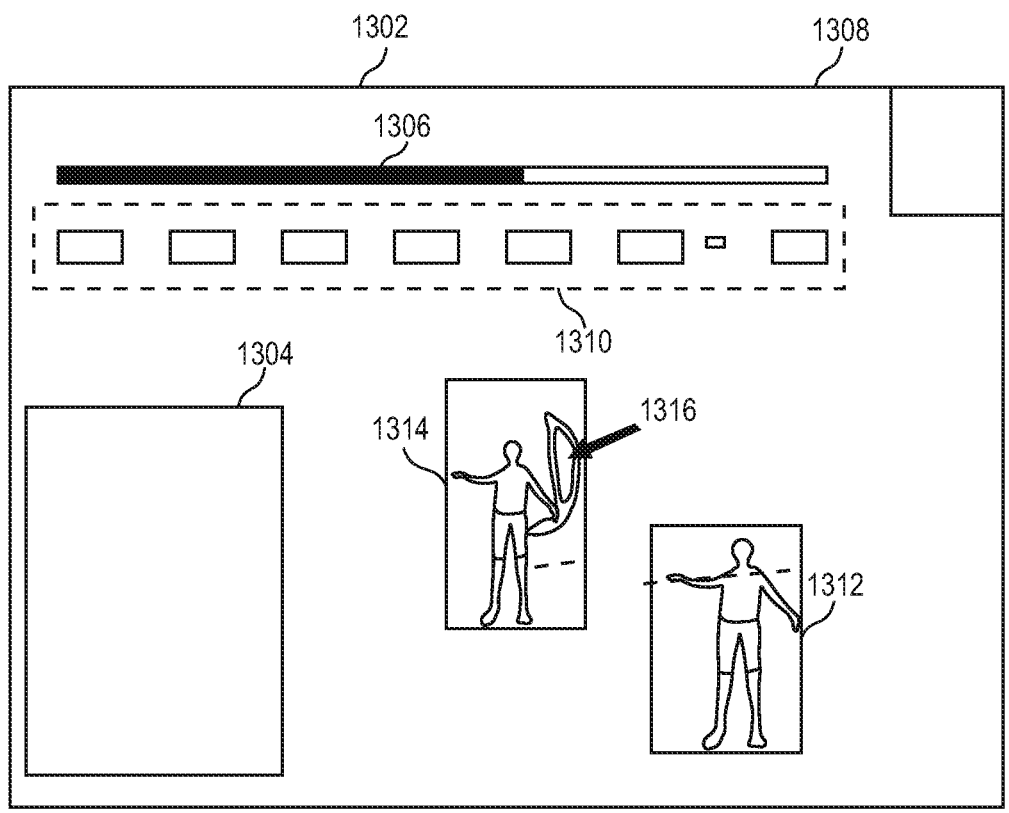
FIG. 13a-FIG. 13c are exemplary schematic representation of a user interface for setting pose recognition rules, according to the embodiments as disclosed herein.
Figure 13B:
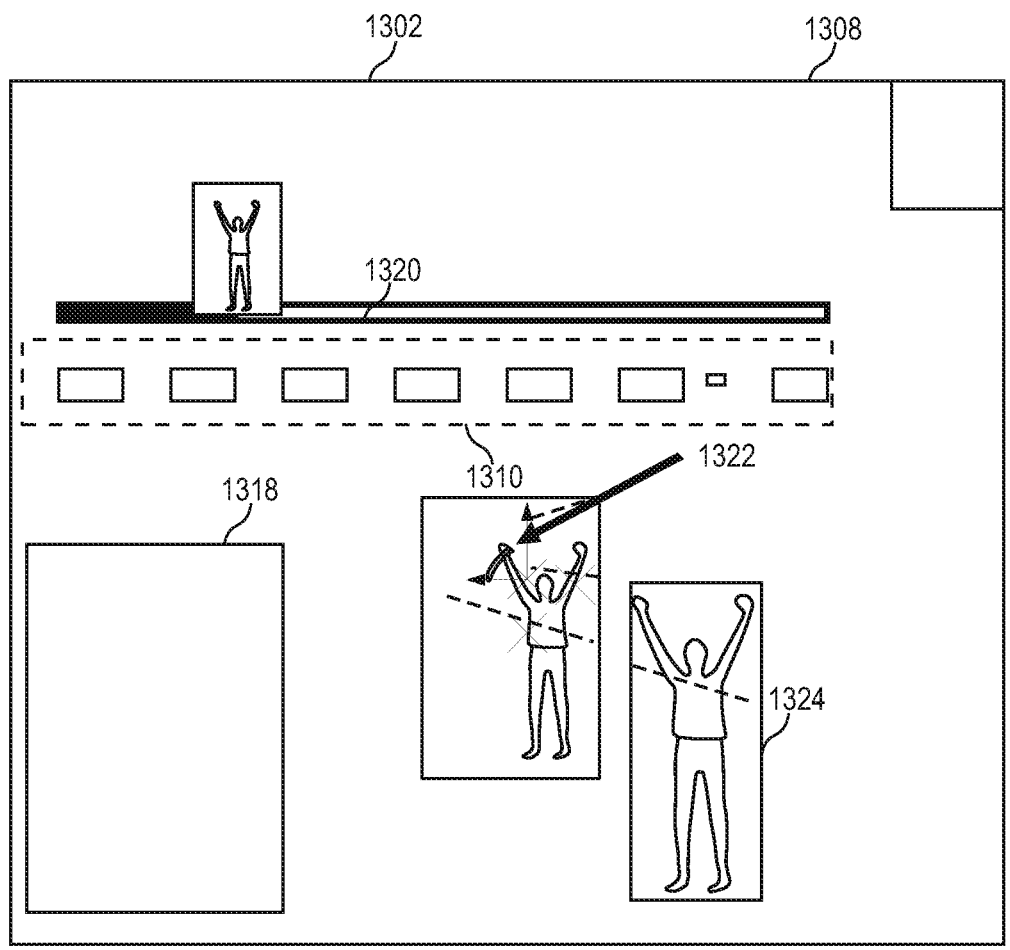
Figure 13C:
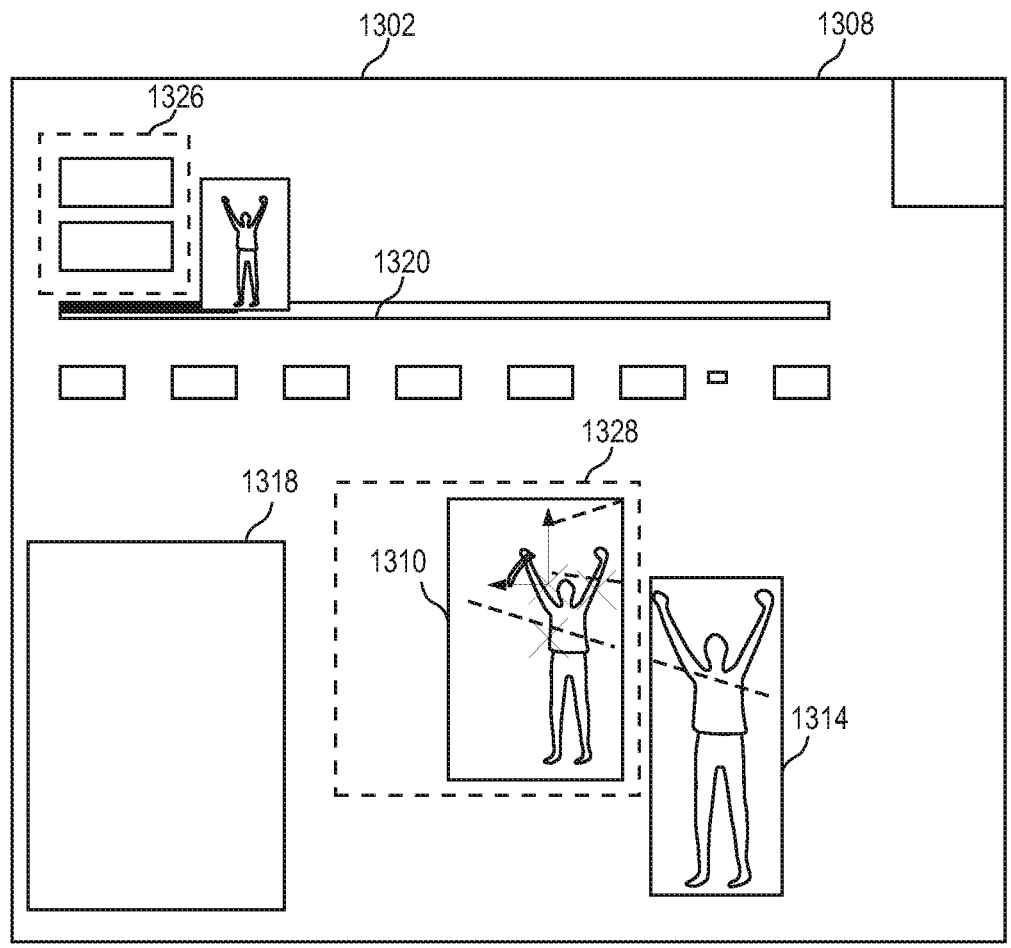

FIG. 13*a*-FIG. 13*c* are exemplary schematic representation of a user interface for setting pose recognition rules, according to the embodiments as disclosed herein.

FIG. 13*a* illustrates the user interface 1302 that displays a plurality of checkboxes for target and reference joints 1304. A timeline 1306 of recorded movement can be scrolled by the user using a mouse. The instructor's body size measurements 1308 are also displayed. The user interface 1302 displays a list of video player control buttons 1310, for instance back, undo, set segment, play segment, play and stop.

The instructor's 2D view 1312 is displayed along with a pannable 3D view of the instructor 1314. Further, 3D trajectories 1316 of the target and reference joints are displayed.

FIG. 13*b* illustrates the user interface 1302 that displays joint tracking metrics of the current segment 1318. A logical segment of the movement 1320 is displayed through a timeline. Further, direction descriptors (greater than/lesser than/off) are shown as arrows 1322. A scoring rule cube 1324 is also displayed along with resizing controls for X, Y, Z axes of the scoring rule cube.

FIG. 13*c* illustrate the user interface 1302 that displays a plurality of buttons 1326 for adding rules described by the Scoring ruling cube. The buttons allow the user to add a rule and remove a rule. Further, a textual description 1328 of pose recognition rules is also displayed.

Use Cases

FIG. 14a-FIG. 14f illustrates the creation of scoring rules for new standard movements by the SML creator, according to the embodiments as disclosed herein.

Figure 14A:
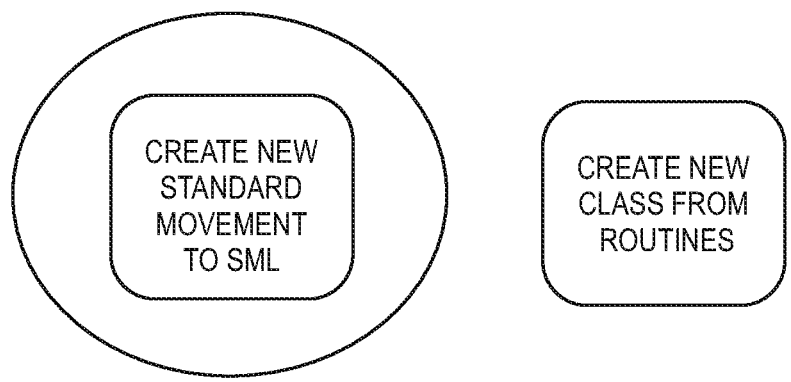

FIG. 14a depicts the main menu that provides two options to the user. The options are 1) to create new standard movement to SML and 2) create new class from routines. For the purpose of FIG. 14a-FIG. 14f, the first option is selected.

FIG. 14b illustrates the user interface wherein the user is allowed to record a new movement 1402 or edit an existing SML movement 1406.

Figure 14C:
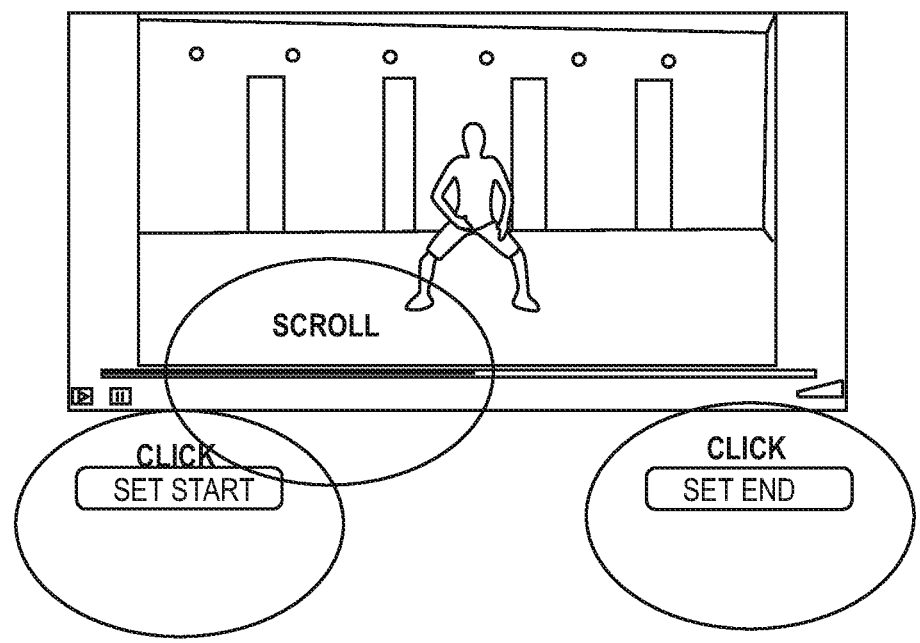

FIG. 14c illustrates an exemplary class. The user can view a desired position in the class by scrolling through a timeline.

FIG. 14d and FIG. 14e illustrates the exemplary class along with the start of recording a new SML movement.

FIG. 14f illustrates the end of recording the new SML movement.

FIG. 15a-FIG. 15g illustrate the segmentation of an SML movement, according to the embodiments as disclosed herein.

FIG. 15a illustrates an existing SML movement 1502. The user is allowed to edit the SML movement 1504 or again record a new movement 1506.

Figure 15B:
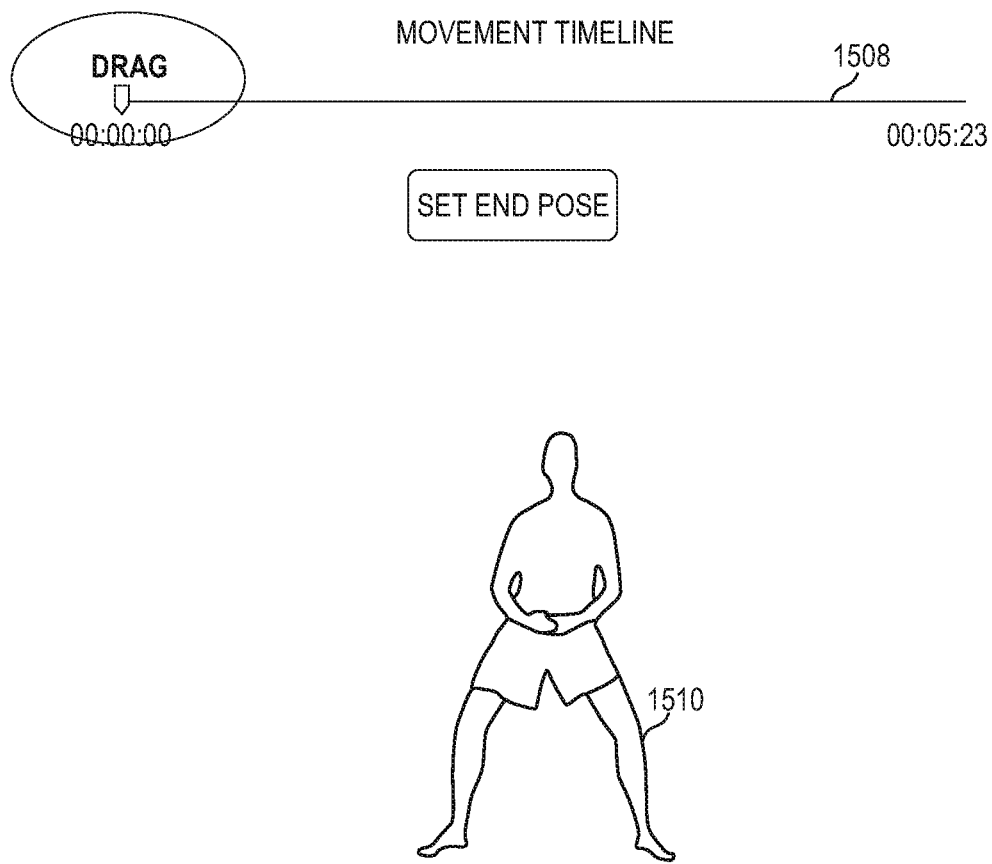
Figure 15D:
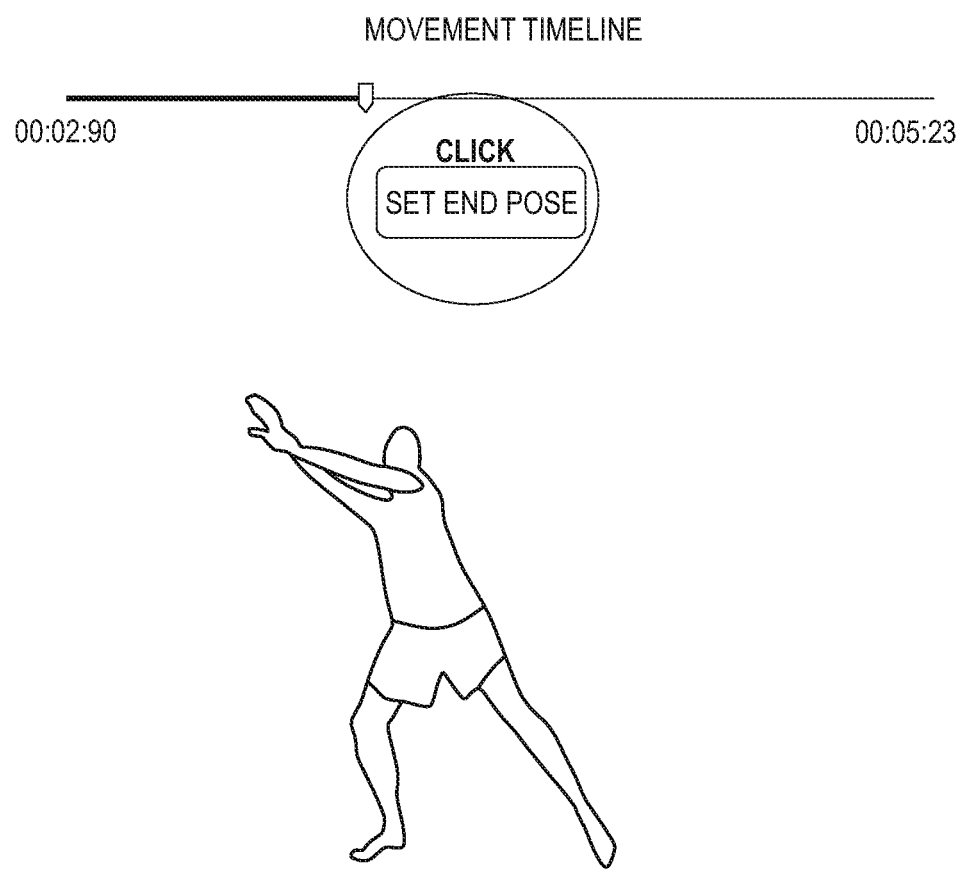
Figure 15E:
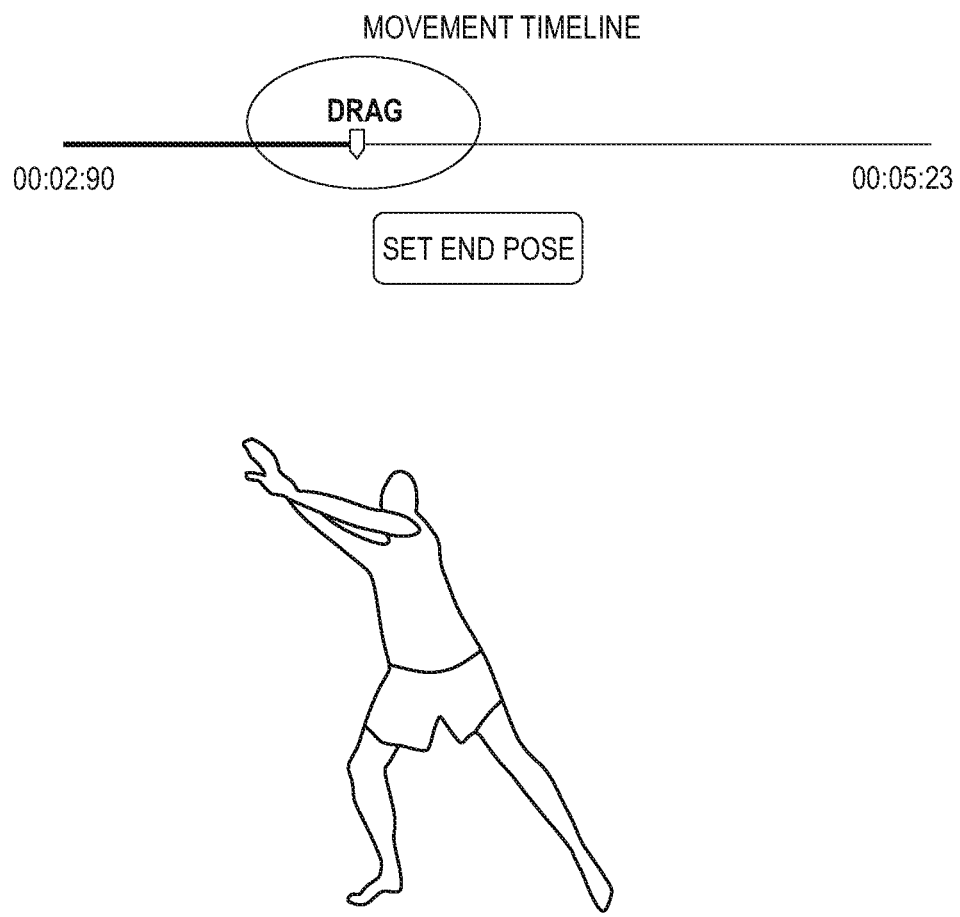
Figure 15F:
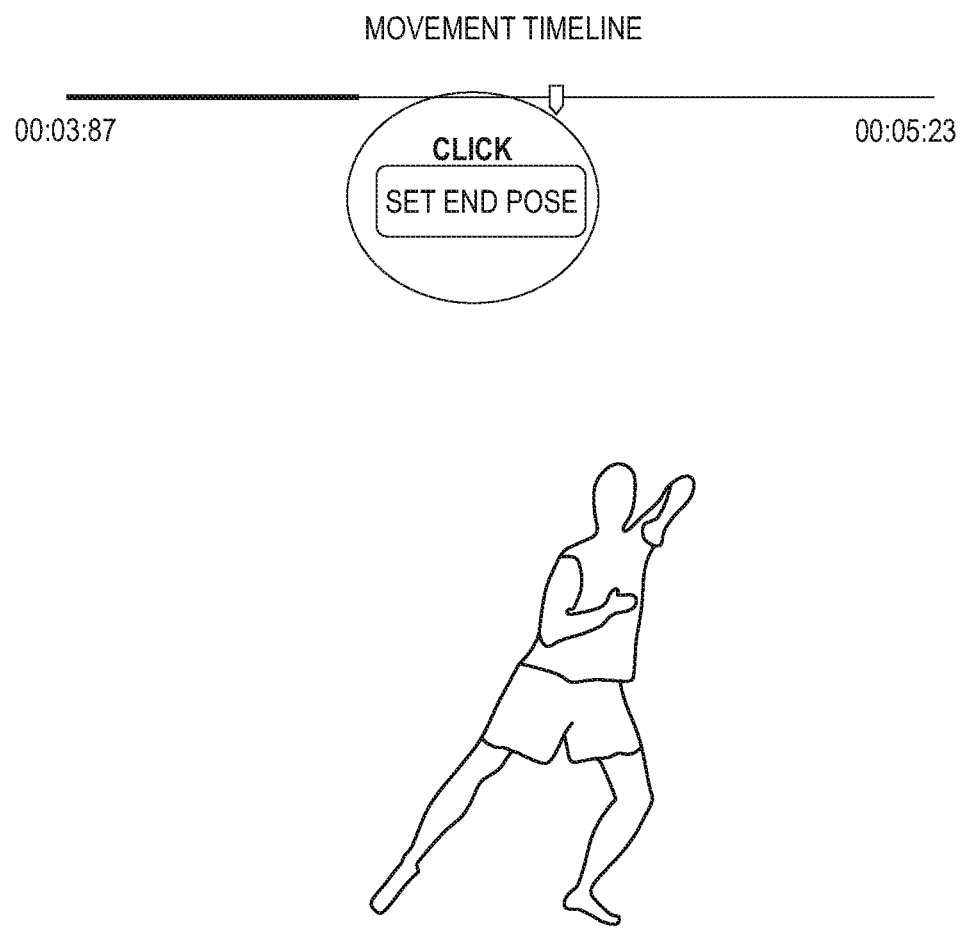
Figure 15G:
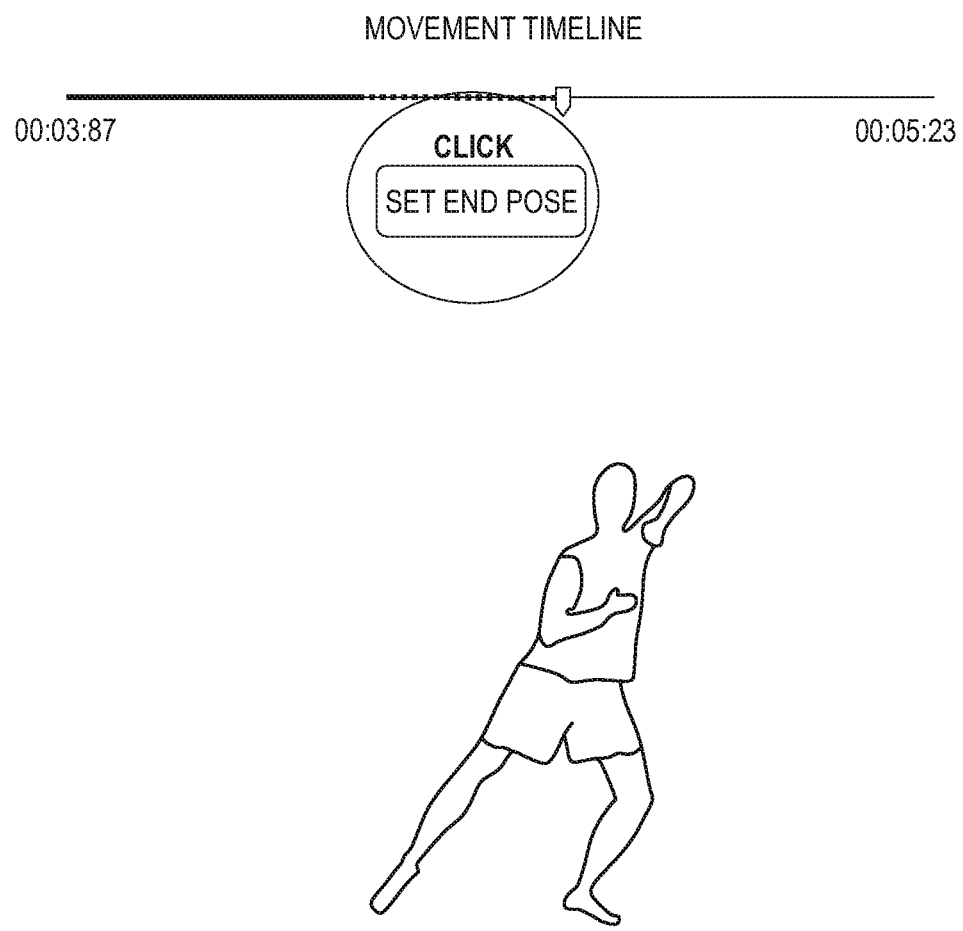

FIG. 15b illustrates a movement timeline 1508. The timeline depicts the start and end time. The user can drag along the timeline to view a particular movement. Movement corresponding to the time is then displayed 1510.

FIG. 15c-FIG. 15g illustrates movements at several different time frames on the timeline.

Figure 16B:
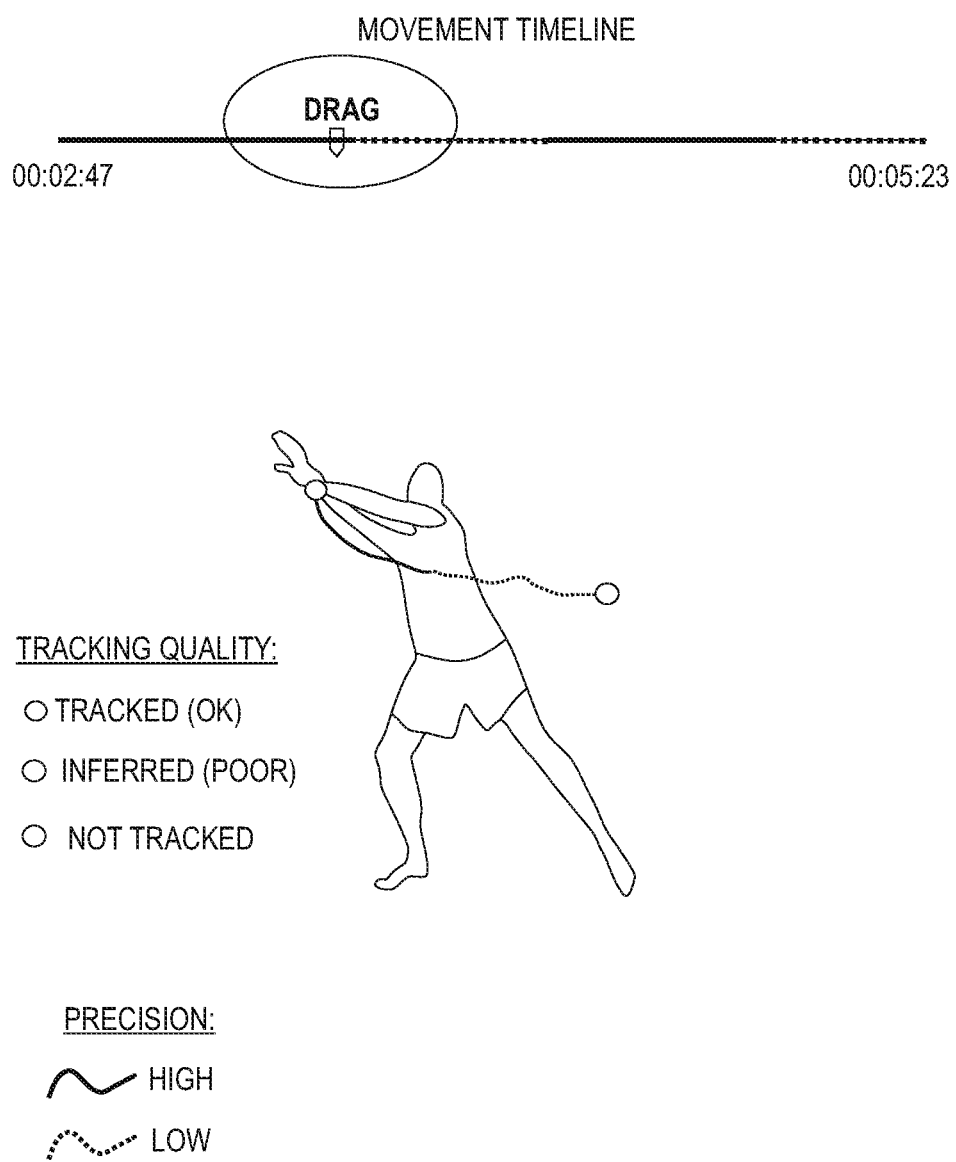
Figure 17C:
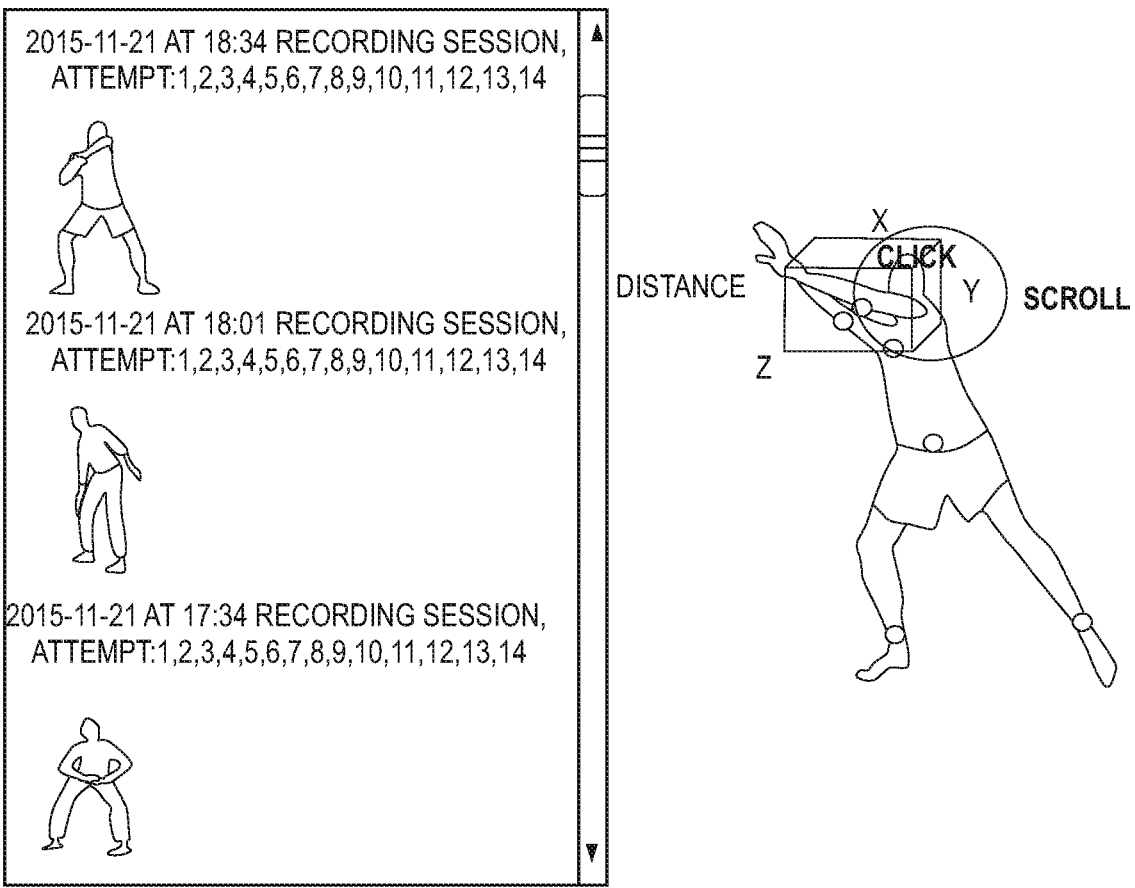
Figure 17G:
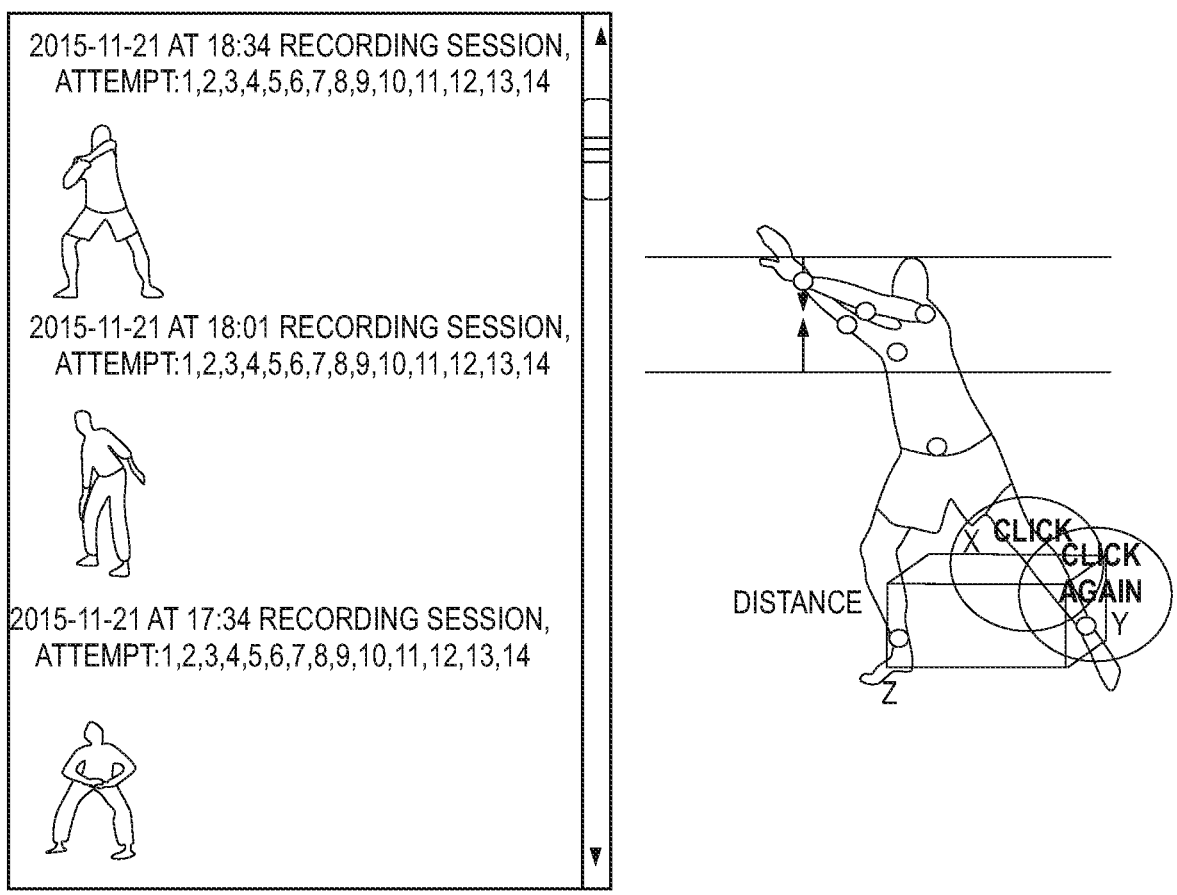

FIG. 16a-FIG. 16c illustrates a timeline with several segments. The segments can be identified with shaded portions on the timeline. The movement corresponding to the time is displayed. The tracking quality to design scoring rules is represented on the movement with the help of colored circles. For instance, green circles signify tracked (ok), yellow circles signify inferred (poor) and red circles signify that the movement is not tracked.

Further, precision of high and low is also illustrated on the movement.

FIG. 17a-FIG. 17l illustrate adding scoring rules for each segment.

FIG. 17a illustrates that once the movement is recorded, scoring rules can be defined for each component segments.

FIG. 17b-FIG. 17k show how the rules can be set using a reference point and a target point. The reference point is the "starting point" or point (0,0,0) on a 3D graph. The target point is the "end point" or point (X, Y, Z) on a 3D graph. Using these two points, the program can calculate the relative distance between the points based on the measurement stick as illustrated in FIG. 7 and described in paragraph 0091.

FIG. 17l illustrates that the scoring rule can now be tested.

FIG. 18a-FIG. 18e illustrates a process to test the movement with scoring rules.

Figure 18A:
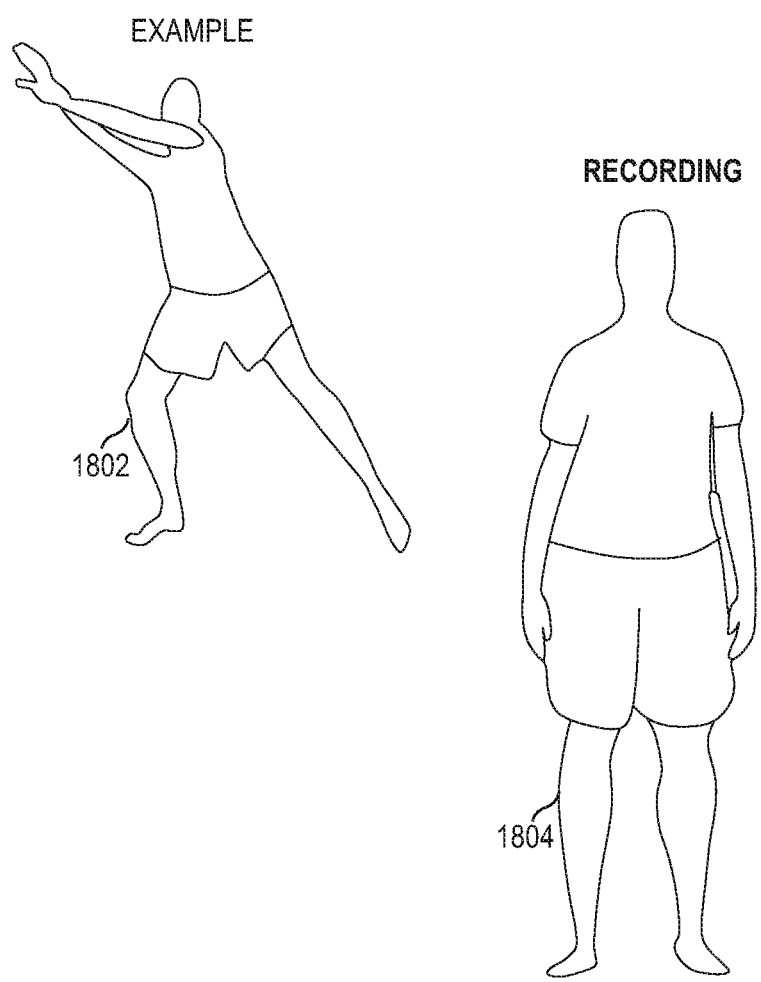

FIG. 18a displays an exemplary movement 1802. The users' position is also displayed 1804.

Figure 18B:
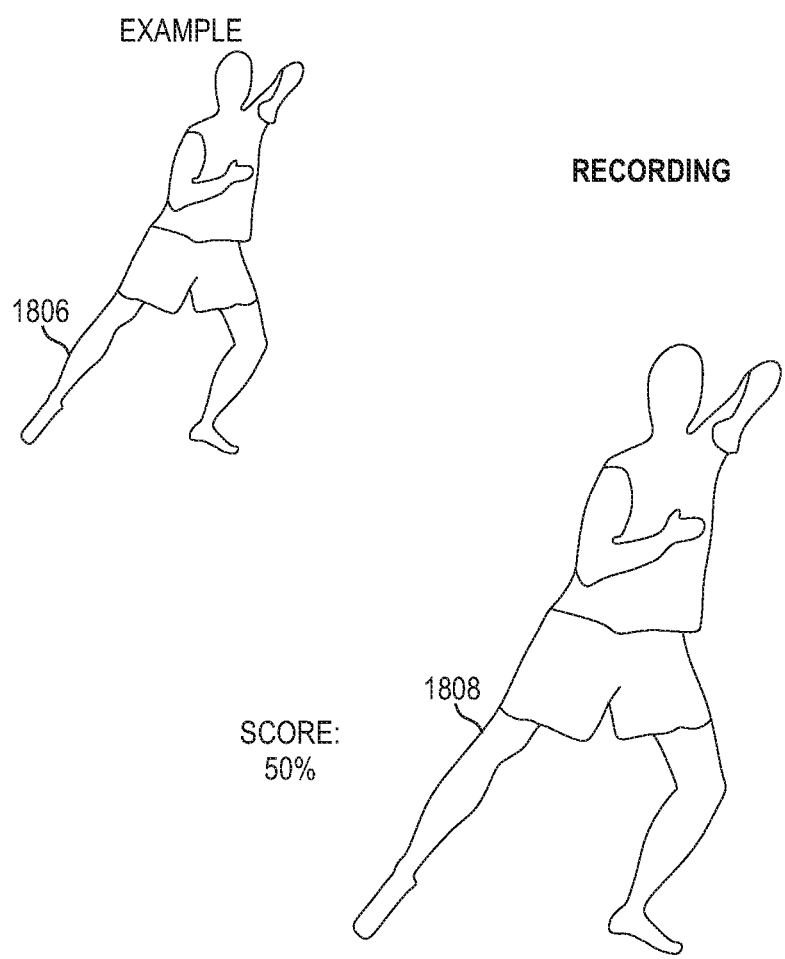

FIG. 18b illustrates an exemplary movement 1806. The users' movement 1808 is compared with the exemplary movement 1806. The score is displayed on the screen, for instance score=50%.

Figure 18C:
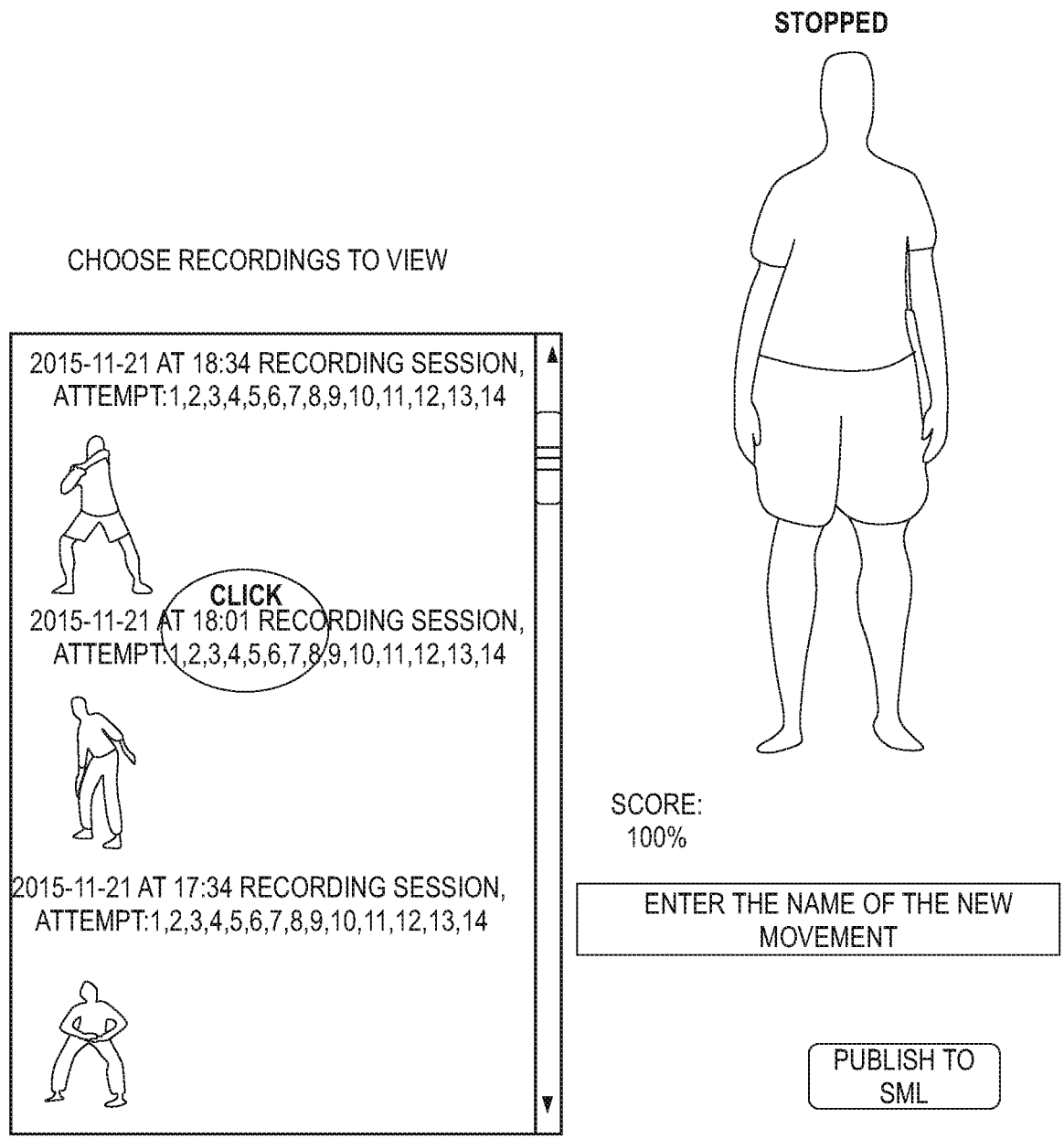

FIG. 18c illustrates a movement of score 100%. The user can enter a new movement and publish the same to the SML.

Figure 18D:
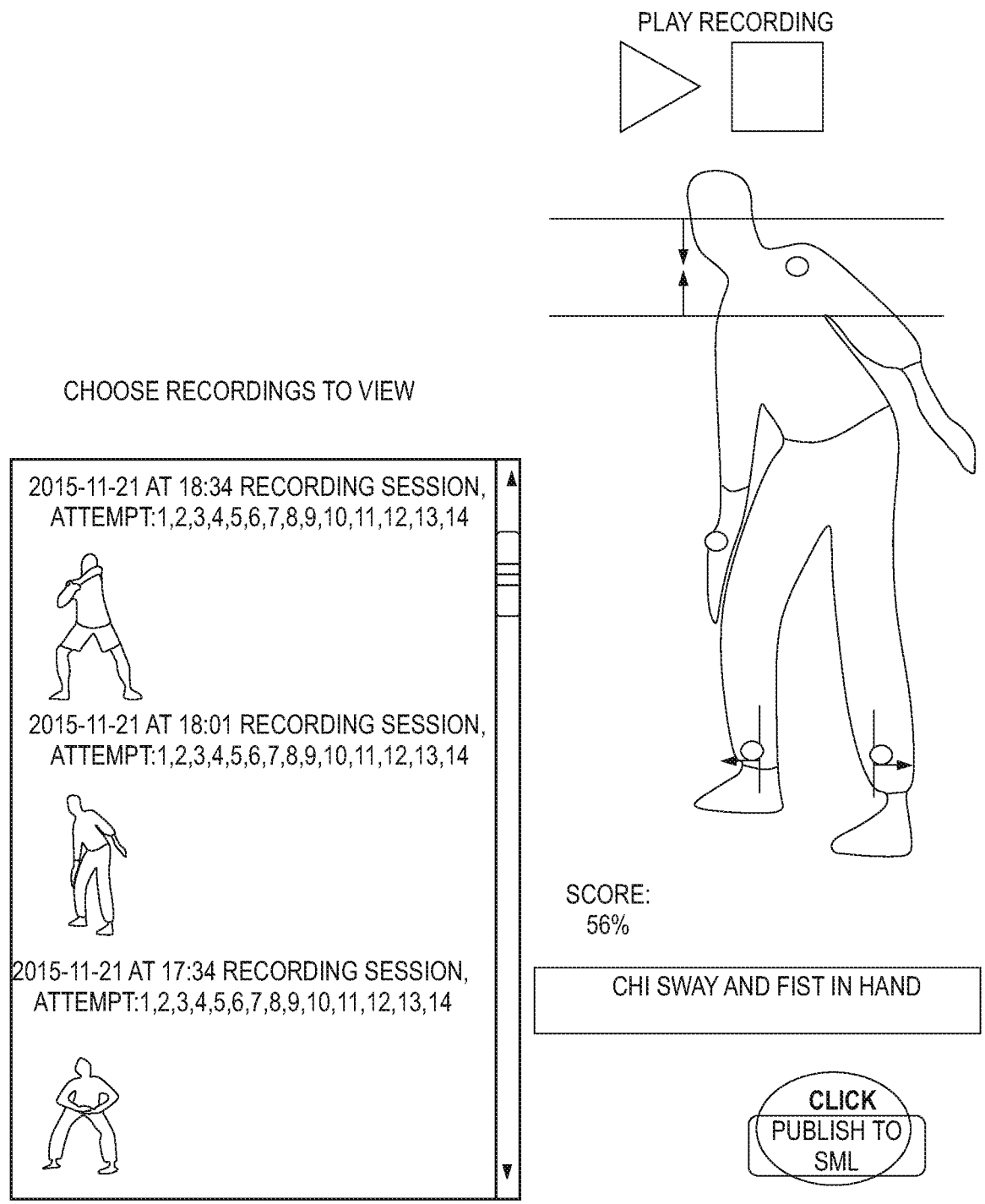

FIG. 18d illustrates a movement of score 56%.

FIG. 18e illustrates a new movement that is recorded.

FIG. 19a-FIG. 19f illustrate the post-processing phase of fitness instructor's class.

Each routine is divided into individual movements.

Figure 19A:
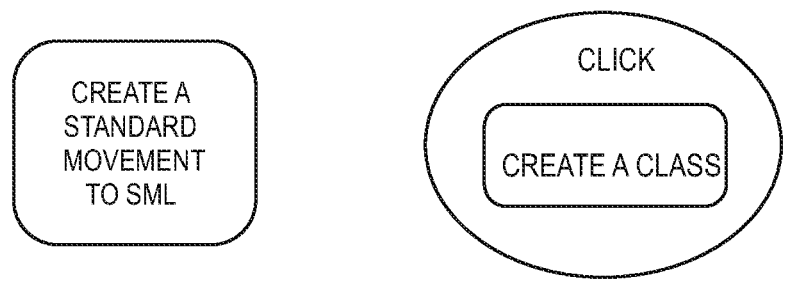

FIG. 19a illustrates the option of creating a class.

FIG. 19b illustrates an exercise editor. The user is allowed to select a new content for a class.

FIG. 19c illustrates a routine timeline.

Figure 19D:
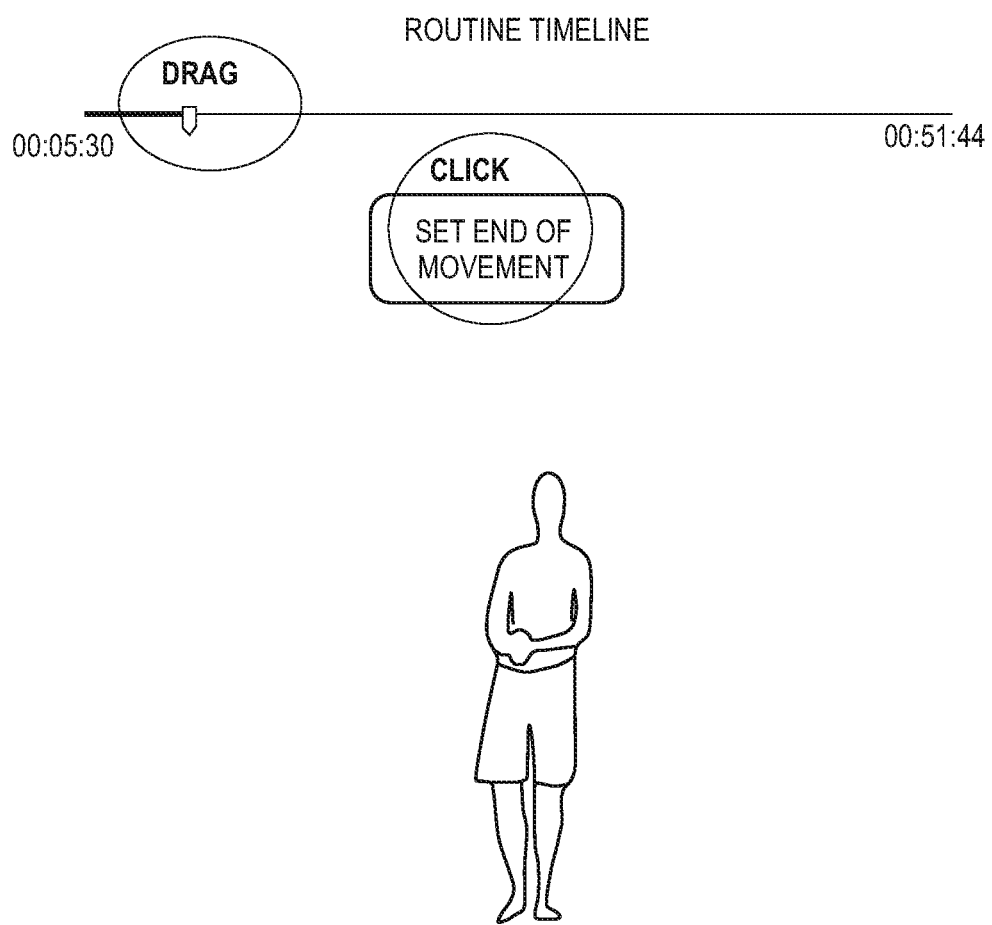
Figure 20C:
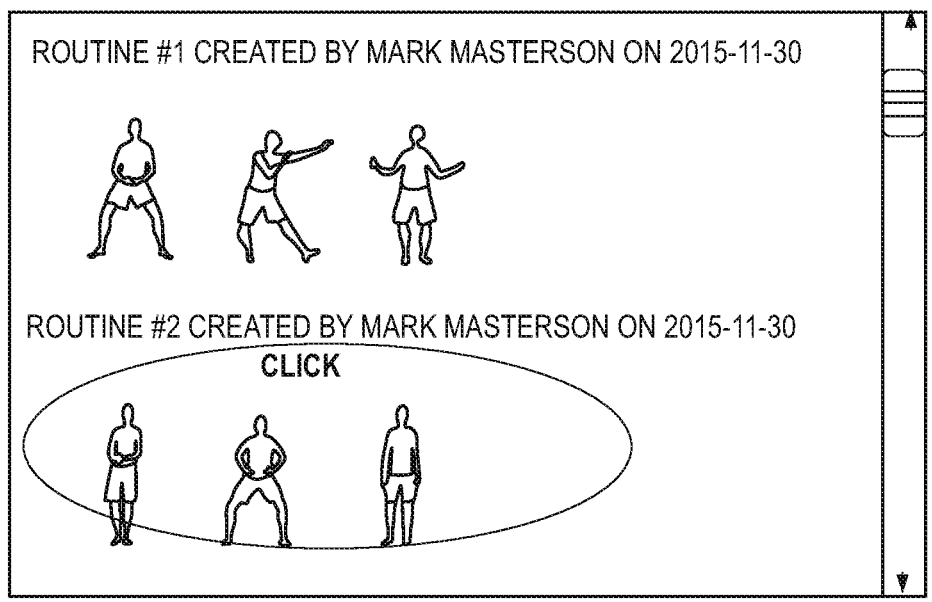
Figure 21C:
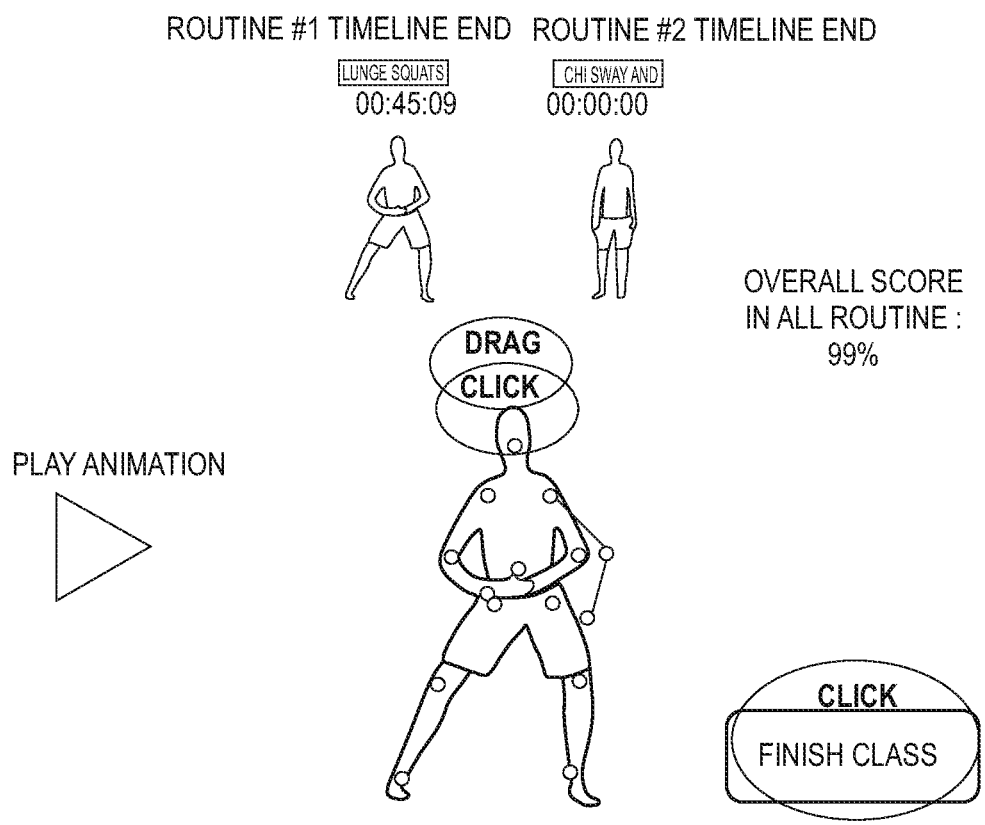
Figure 21D:
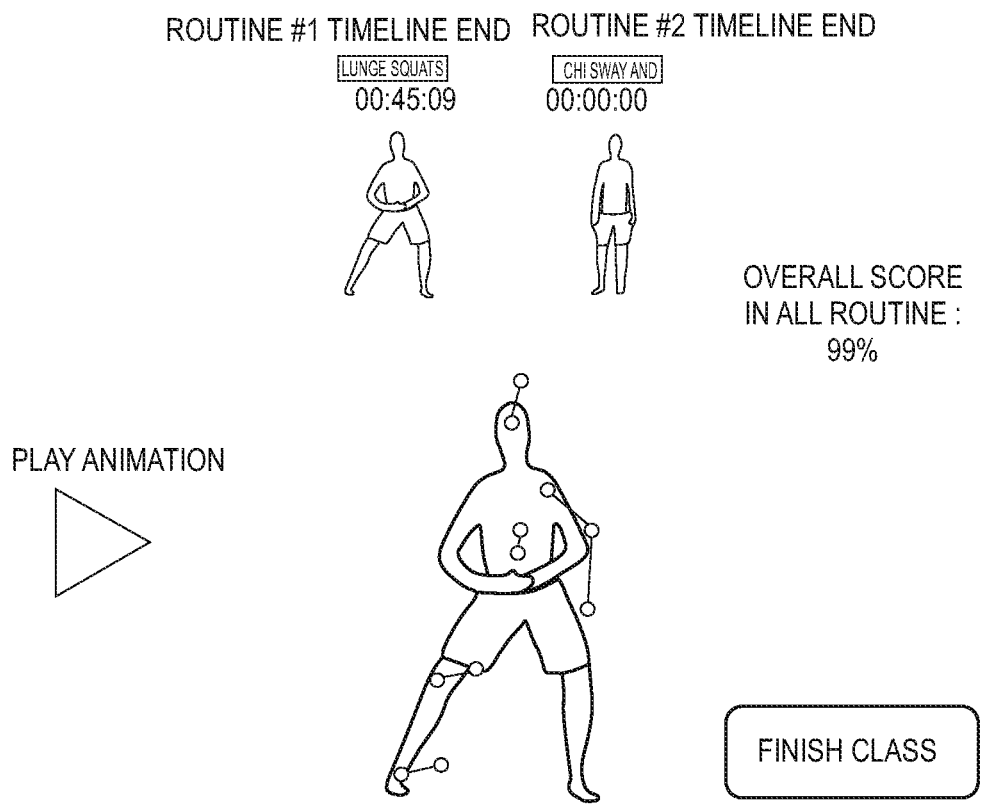

FIG. 19d-FIG. 19f illustrates a specific point in the routine timeline along with the corresponding movement.

FIG. 20a-FIG. 20d illustrates matching of each fitness instructor's movement with SML movements and adjusting time constraints.

FIG. 21a-FIG. 21e illustrates the process of composing/animating transitions between routines.

FIG. 22 illustrates the process of testing the post-produced class.

FIG. 23 illustrates the process of adding the audio clips to the recording.

System Block Diagram

Figure 24:
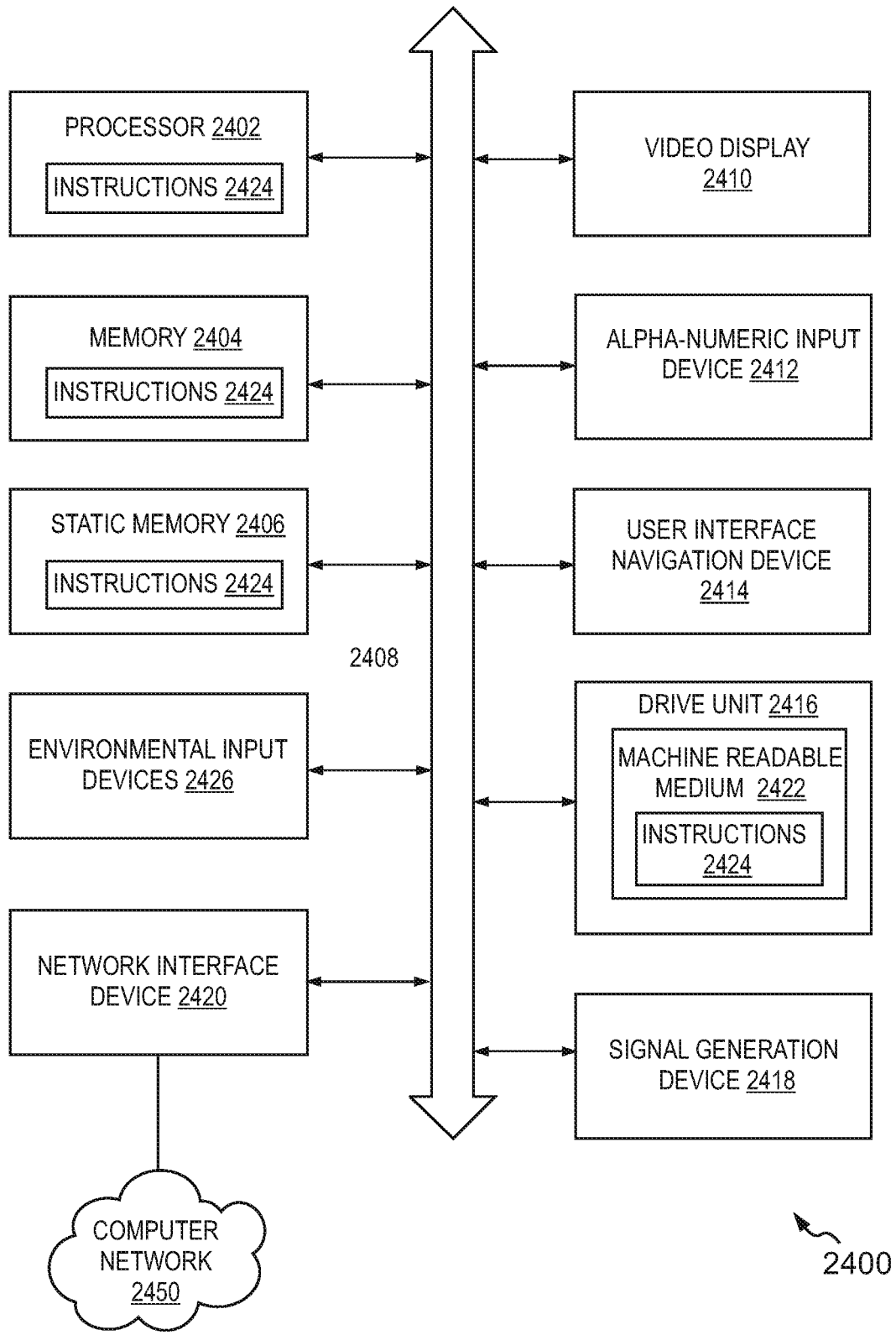
FIG. 24 is a block diagram of a machine in the example form of a computer system within which instructions for causing the machine to perform any one or more of the methodologies discussed herein may be executed.

FIG. 24 is a block diagram of a machine in the example form of a computer system within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2400 includes a processor 2402 (e.g., a central processing unit (CPU), a graphics processing unit (GPU), or both), a main memory 2404, and a static memory 2406, which communicate with each other via a bus 2408. The computer system 2400 may further include a video display unit 2410 (e.g., a liquid crystal display (LCD) or a cathode ray tube (CRT)). The computer system 2400 also includes an alphanumeric input device 2412 (e.g., a keyboard), a user interface (UI) navigation device 2414 (e.g., a mouse), a disk drive unit 2416, a signal generation device 2418 (e.g., a speaker), and a network interface device 2420. The computer system 2400 may also include an environmental input device 2426 that may provide a number of inputs describing the environment in which the computer system 2400 or another device exists, including, but not limited to, any of a Global Positioning Sensing (GPS) receiver, a temperature sensor, a light sensor, a still photo or video camera, an audio sensor (e.g., a microphone), a velocity sensor, a gyroscope, an accelerometer, and a compass.

Machine-Readable Medium

The disk drive unit 2416 includes a machine-readable medium 2422 on which is stored one or more sets of data structures and instructions 2424 (e.g., software) embodying or utilized by any one or more of the methodologies or functions described herein. The instructions 2424 may also reside, completely or at least partially, within the main memory 2404 and/or within the processor 2402 during execution thereof by the computer system 2400, the main memory 2404 and the processor 2402 also constituting machine-readable media.

While the machine-readable medium 2422 is shown in an example embodiment to be a single medium, the term "machine-readable medium" may include a single medium or multiple media (e.g., a centralized or distributed database, and/or associated caches and servers) that store the one or more instructions 2424 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

Transmission Medium

The instructions 2424 may further be transmitted or received over a computer network 2450 using a transmission medium. The instructions 2424 may be transmitted using the network interface device 2420 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

As described herein, computer software products can be written in any of various suitable programming languages, such as C, C++, C #, Pascal, Fortran, Perl, Matlab (from MathWorks), SAS, JavaScript, AJAX, and Java. The computer software product can be an independent application with data input and data display modules. Alternatively, the computer software products can be classes that can be instantiated as distributed objects. The computer software products can also be component software, for example Java Beans or Enterprise Java Beans. Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standard 802.11 including its substandards a, b, e, g, h, i, n, et al.). In one example, signals from the computer can be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Accordingly, the disclosure of the present invention is intended to be illustrative, but not limiting, of the scope of the invention, which is set forth in the following claims.

The invention claimed is:

1. A computer-implemented method for authoring animated human movement examples with scored movement segments, the computer-implemented method comprises:
   pre-processing with a pre-segmented movement, wherein start and end frames of a movement segment have been defined automatically to create a Standard Movement Library (SML), wherein the pre-processing comprises:

designing and adding one or more scoring rules for each movement segment in the Standard Movement Library (SML), wherein the one or more scoring rules define how different joints of a player should relate to each other in order to make a logical scorable pose;

post-processing with a routine of one or more routines, and wherein start and end frames of each individual movement associated with the routine have been defined to produce a virtual exercise class;

segmenting a new routine of a plurality of new routines into individual movements to create a timeline of movements that produces a score for one or more players using the one or more scoring rules, wherein the new routine is recorded by an instructor;

concatenating the plurality of new routines in any order to create a full exercise class;

creating scorable virtual exercise classes in the pre-processing and post-processing phases;

verifying the virtual exercise class; and finalizing the virtual exercise class.

2. The computer-implemented method of claim 1 and further comprising:

counting a total score of a performance of the one or more players in the virtual exercise class by using the one or more scoring rules; and matching the new routine with a plurality of scored movements in the Standard Movement Library (SML) thereby producing the total score that is counted later in a game.

3. The computer-implemented method of claim 1, wherein the pre-processing further comprises:

recording a single movement of the instructor using a 3D sensor;

segmenting the single movement into a plurality of segments;

designing and adding the one or more scoring rules for each segment of the plurality of segments;

adding samples of variable movement to a database; and testing a scorable movement against the database.

4. The computer-implemented method of claim 1, wherein the post-processing further comprises:

recording the one or more routines using a 3D sensor;

segmenting each routine of the one or more routines into movements;

matching scorable movements in a database with each routine;

selecting the one or more routines to construct an exercise class timeline;

synthesizing one or more 4D frames between the one or more routines;

adding audio clips to the exercise class timeline; and publishing the virtual exercise class.

5. The computer-implemented method of claim 1 and further comprising:

producing pose recognition rules that constitute a scoring system for all movements in the Standard Movement Library (SML).

6. The computer-implemented method of claim 1 and further comprising:

creating visual example movements by interpolating transitions between individual movement clips.

7. The computer-implemented method of claim 1 and further comprising:

recognizing velocity peaks that indicate direction of a limb change through signal processing.

8. The computer-implemented method of claim 1 and further comprising:

creating content in the Standard Movement Library (SML) by creating the one or more scoring rules.

9. The computer-implemented method of claim 1 and further comprising:

comparing the plurality of new routines of a plurality of movements against pose recognition rules and the one or more scoring rules in the Standard Movement Library (SML).

10. A computer program product stored on a non-transitory computer-readable medium that when executed by a processor, performs a method for authoring animated human movement with scored movement segments, the computer program product comprising:

pre-processing with a pre-segmented movement, wherein start and end frames of a movement segment have been defined automatically to create a Standard Movement Library (SML), wherein the pre-processing comprises:

designing and adding one or more scoring rules for each movement segment in the Standard Movement Library (SML), wherein the one or more scoring rules define how different joints of a player should relate to each other in order to make a logical scorable pose;

post-processing with a routine of one or more routines, wherein start and end frames of each individual movement associated with the routine have been defined to produce a virtual exercise class;

segmenting a new routine of a plurality of new routines into individual movements to create a timeline of movements that produces a score for one or more players using the one or more scoring rules, wherein the new routine is recorded by an instructor;

concatenating the plurality of new routines in any order to create a full exercise class;

creating scorable virtual exercise classes in the pre-processing and post-processing phases;

verifying the virtual exercise class; and finalizing the virtual exercise class.

11. The computer program product of claim 10 and further comprising:

counting a total score of a performance of the one or more players in the virtual exercise class by using the one or more scoring rules; and matching the new routine with a plurality of scored movements in the Standard Movement Library (SML) thereby producing the total score that is counted later in a game.

12. The computer program product of claim 10, wherein the pre-processing further comprises:

recording a single movement of the instructor using a 3D sensor;

segmenting the single movement into a plurality of segments;

designing and adding the one or more scoring rules for each segment of the plurality of segments;

adding samples of variable movement to a database; and testing a scorable movement against the database.

13. The computer program product of claim 10, wherein the post-processing further comprises:
   recording the one or more routines using a 3D sensor;
   segmenting each routine of the one or more routines into movements;
   matching scorable movements in a database with each routine;
   selecting the one or more routines to construct an exercise class timeline;
   synthesizing one or more 4D frames between the one or more routines;
   adding audio clips to the exercise class timeline; and
   publishing the virtual exercise class.

14. The computer program product of claim 10 and further comprising:
   producing pose recognition rules that constitute a scoring system for all movements in the Standard Movement Library (SML).

15. The computer program product of claim 10 and further comprising:
   creating visual example movements by interpolating transitions between individual movement clips.

16. The computer program product of claim 10 and further comprising:
   recognizing velocity peaks that indicate direction of a limb change through signal processing.

17. The computer program product of claim 10 and further comprising:
   creating content in the Standard Movement Library (SML) by creating the one or more scoring rules.

18. The computer program product of claim 10 and further comprising:
   comparing the plurality of new routines of a plurality of movements against pose recognition rules and the one or more scoring rules in the Standard Movement Library (SML).

19. A system for authoring animated human movement with scored movement segments, the system comprising:
   a computing device;
   a 3D sensor to recognize different segments of movements;
   a network;
   a database to store scorable models of a single movement and its segments, scorable routines and scorable classes; and
   a processor configured within the computing device and operable to:
   pre-process with a pre-segmented movement, wherein start and end frames of a movement segment have been defined automatically to create a Standard Movement Library (SML);
   design and add one or more scoring rules for each movement segment in the Standard Movement Library (SML), wherein the one or more scoring rules define how different joints of a player should relate to each other in order to make a logical scorable pose;
   post-process with a routine of one or more routines, wherein start and end frames of each individual movement associated with the routine have been defined to produce a virtual exercise class;
   segment a new routine of a plurality of new routines into individual movements to create a timeline of movements that produces a score for a plurality of players using the one or more scoring rules, wherein the new routine is recorded by an instructor;
   concatenate the plurality of new routines in any order to create a full exercise class;
   create scorable virtual exercise classes in the pre-processing and post-processing phases;
   verify the virtual exercise class; and
   finalize the virtual exercise class.

20. The system of claim 19 wherein the computing device further comprises:
   a user interface to enable define pose recognition rules in various movement segments for Standard Movement Library (SML) movements;
   a scoring rule matcher user interface to identify which movements of the new routine recorded by another instructor match with scored movements in the Standard Movement Library (SML); and
   a Content Creator to find the start and end frames of example movements automatically.

21. The system of claim 19 and further comprising:
   a scoring rule matcher user interface for identifying and matching movements of the new routine with scored movements in the Standard Movement Library (SML); and
   a visual user interface for interpolating transitions between movement clips.

22. The system of claim 19 and further comprising:
   a Standard Movement Library (SML) Editor to create content; and
   an Exercise Class Editor to produce a plurality of routines.

* * * * *